US012756353B2

(12) United States Patent
Platte et al.

(10) Patent No.: US 12,756,353 B2
(45) Date of Patent: Oct. 6, 2026

(54) BRACKET ASSEMBLY FOR PHOTOVOLTAIC SYSTEM

(71) Applicant: Sukup Manufacturing Co., Sheffield, IA (US)

(72) Inventors: Dustin Platte, Sheffield, IA (US); Nick Sukup, Clear Lake, IA (US); Brad Poppen, Sheffield, IA (US); Matt Swanson, Klemme, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 10 days.

(21) Appl. No.: 18/644,386

(22) Filed: Apr. 24, 2024

(65) Prior Publication Data

US 2024/0364256 A1 Oct. 31, 2024

Related U.S. Application Data

(60) Provisional application No. 63/498,070, filed on Apr. 25, 2023.

(51) Int. Cl.
*H02S 30/10* (2014.01)
*H02S 20/10* (2014.01)

(52) U.S. Cl.
CPC .............. *H02S 30/10* (2014.12); *H02S 20/10* (2014.12)

(58) Field of Classification Search
CPC .... F16B 2/10; F16B 2/065; F16B 2/06; E04B 2001/2644; E04B 2001/389; E04B 1/2608;

(Continued)

(56) References Cited

U.S. PATENT DOCUMENTS

| | | | | |
|---|---|---|---|---|
| D31,083 S | | 6/1899 | Seng | |
| 2,605,806 A | * | 8/1952 | Tinnerman ............ | F16B 37/044 248/27.3 |

(Continued)

FOREIGN PATENT DOCUMENTS

WO WO-2016198305 A1 * 12/2016 .............. F24S 25/16

OTHER PUBLICATIONS

Opsun, "GMx-xxD-x-x-x-mxn-xF Installation Manual", Feb. 11, 2022, Version 1.4, Opsun, United States.

(Continued)

*Primary Examiner* — Patrick D Hawn
(74) *Attorney, Agent, or Firm* — Christopher A. Proskey; BrownWinick Law Firm

(57) ABSTRACT

In one or more arrangements a system, method, and bracket assembly for installing photovoltaic panels is presented. The system includes one or more photovoltaic panels and a support structure to mount the photovoltaic panels on and one or more bracket assemblies. The bracket assembly includes a first section, a second section, and a living hinge operably connecting the first section and the second section. The living hinge is configured to move the first section and the second section between an unclamped position, where first section and second section are positioned at a greater angle with respect to each other, and a clamped position, where first section and second section are positioned at a lesser angle with respect to each other to secure the photovoltaic panel to the support structure. The brackets may self-square the photovoltaic panel to the cross bar when the bracket is clamped.

25 Claims, 66 Drawing Sheets

(58) Field of Classification Search
CPC .......... H02S 20/00; H02S 20/10; H02S 30/00; H02S 30/10; F16M 13/02
See application file for complete search history.

(56) References Cited

U.S. PATENT DOCUMENTS

| | | | | |
|---|---|---|---|---|
| 3,177,542 | A * | 4/1965 | James | H02G 7/10 24/535 |
| D230,827 | S | 3/1974 | Brown | |
| 3,796,405 | A * | 3/1974 | Rystad | E06B 3/02 248/316.7 |
| 4,221,355 | A | 9/1980 | Hoop | |
| 4,455,716 | A * | 6/1984 | Leonardo | H02G 7/05 24/703.1 |
| D331,358 | S | 12/1992 | Sachs | |
| D341,075 | S | 11/1993 | Quinkert | |
| D473,124 | S * | 4/2003 | Wu | D8/356 |
| D492,888 | S * | 7/2004 | Wilson | D8/349 |
| 7,097,141 | B2 * | 8/2006 | Heath | F16B 2/10 248/62 |
| 7,204,666 | B2 * | 4/2007 | Hullman | F16B 37/067 411/432 |
| D621,691 | S | 8/2010 | Tezak et al. | |
| D679,575 | S | 4/2013 | Chiu et al. | |
| 8,671,747 | B1 | 3/2014 | Falkenborg | |
| 8,702,335 | B2 | 4/2014 | Young | |
| D730,157 | S * | 5/2015 | Buchman | D8/349 |
| 9,559,633 | B2 * | 1/2017 | Shu | F24S 25/13 |
| 9,650,780 | B2 * | 5/2017 | Tan | E04B 1/2608 |
| 10,053,854 | B2 * | 8/2018 | Hildestad | E04B 1/3205 |
| 10,100,508 | B1 * | 10/2018 | Fox | E04B 1/2604 |
| 10,202,766 | B1 * | 2/2019 | Fox | E04B 7/063 |
| 10,358,811 | B1 * | 7/2019 | Fox | E04B 1/2604 |
| D874,249 | S * | 2/2020 | Stekr | D8/354 |
| 10,907,373 | B2 | 2/2021 | Poppen et al. | |
| 11,118,727 | B2 * | 9/2021 | McKechnie | F16M 13/02 |
| 11,396,747 | B1 * | 7/2022 | Getz | E04B 1/2612 |
| D959,240 | S | 8/2022 | Smith | |
| 11,732,737 | B2 * | 8/2023 | Basavaraj Hamasagar | F16B 2/10 24/359 |
| 11,949,373 | B1 * | 4/2024 | Jasmin | H02S 30/10 |
| 2003/0150968 | A1 | 8/2003 | Garassino | |
| 2018/0245716 | A1 * | 8/2018 | Nijdam | F16B 2/246 |
| 2024/0352735 | A1 * | 10/2024 | Moss | E04D 3/36 |

OTHER PUBLICATIONS

Trailer Frame Wire Clips, posted Aug. 18, 2022 [online], [retrieved Jul. 15, 2024]. Retrieved from internet, https://www,amazon.com/Zhengmy-Trailer-Stainless-Double-Clamps/dp/BOBB2C8L2J/ (Year:2022).

* cited by examiner

BRACKET ASSEMBLY FOR PHOTOVOLTAIC SYSTEM

CROSS REFERENCE TO RELATED APPLICATION

This application claims priority under 35 U.S.C. § 119 to provisional application Ser. No. 63/498,070 filed Apr. 25, 2023, and titled "Bracket Assembly for Photovoltaic System", which is hereby incorporated by reference in its entirety.

FIELD OF THE DISCLOSURE

This disclosure generally relates to mounting bracket hardware. More specifically and without limitation, this disclosure relates to mounting bracket hardware for mounting of photovoltaic panels.

OVERVIEW OF THE DISCLOSURE

Photovoltaic (solar) systems have become a cost competitive means for energy generation. Increasingly, photovoltaic systems are installed in large field deployed arrays. For example, many farmers have portions of land that may be unproductive for growing for various reasons (grade, soil characteristics, etc.). Increasingly, many farmers have found it advantageous to deploy arrays of photovoltaic panels on such portions of unproductive land.

For field based installation, photovoltaic systems are most typically constructed from a plurality of rectangular photovoltaic panels mounted on respective support structures and electrically inter-connected. Most typically, the support structures are designed to permit the panels to be oriented at an angle so they may collect the optimal amount of energy from sunlight.

Most commonly, multiple smaller panels are installed on each support structure and interconnected to form a lager panel. Use of smaller panels makes the heavy weight of panels more manageable for installers. Longer term, smaller panels permit damaged portions of a photovoltaic system to be replaced at less cost. However, installation of a larger number of smaller panels required a much larger number of mounting brackets. Due to the large number of mounting hardware that is required, installation of such hardware has become a bottleneck in the installation process.

Therefore, for all the reasons stated above, and all the reasons stated below, there is a need in the art for an improved mounting system for photovoltaic panels.

Thus, it is a primary object of the disclosure to provide a mounting system for photovoltaic panels that improves upon the state of the art.

Another object of the disclosure is to provide a mounting system for photovoltaic panels that uses an improved bracket assembly that improves on the state of the art.

Yet another object of the disclosure is to provide an improved bracket assembly for photovoltaic systems that is efficient for installation.

Another object of the disclosure is to provide a mounting system for photovoltaic panels that uses a universal bracket assembly to assemble support structures and also to mount photovoltaic panels to the support structures.

Yet another object of the disclosure is to provide an improved bracket assembly for photovoltaic systems that can be installed from the rear of a photovoltaic panel.

Another object of the disclosure is to provide an improved bracket assembly for photovoltaic systems that can be installed by a single person.

Yet another object of the disclosure is to provide an improved bracket assembly for photovoltaic systems that can be installed by a single tool.

Another object of the disclosure is to provide an improved bracket assembly for photovoltaic systems that is easy to use.

Yet another object of the disclosure is to provide an improved bracket assembly for photovoltaic systems that is pre-assembled.

Another object of the disclosure is to provide an improved bracket assembly for photovoltaic systems that is inexpensive to manufacture.

Yet another object of the disclosure is to provide an improved bracket assembly for photovoltaic systems that can be manufacture from sheet metal.

Another object of the disclosure is to provide an improved bracket assembly for photovoltaic systems that is a single unitary piece.

Yet another object of the disclosure is to provide an improved bracket assembly for photovoltaic systems that is configured to connect two perpendicular elongated members.

Another object of the disclosure is to provide an improved bracket assembly for photovoltaic systems that is configured to connect components in a self-squaring manner.

Yet another object of the disclosure is to provide an improved bracket assembly for photovoltaic systems that allows connected components to be repositioned relative to each other while remaining connected.

Another object of the disclosure is to provide an improved bracket assembly for photovoltaic systems that works effectively.

Yet another object of the disclosure is to provide an improved bracket assembly for photovoltaic systems that is robust.

Another object of the disclosure is to provide an improved bracket assembly for photovoltaic systems that is durable.

Yet another object of the disclosure is to provide an improved bracket assembly for photovoltaic systems that has a long useful life.

Another object of the disclosure is to provide an improved bracket assembly for photovoltaic systems that is high quality.

These and other objects, features, or advantages of the disclosure will become apparent from the specification, figures and claims.

SUMMARY OF THE DISCLOSURE

In one or more arrangements, a bracket assembly is presented for use with installation of photovoltaic systems. In one or more arrangements, the bracket assembly includes a first section, a second section, and a living hinge operably connecting the first section and the second section. In one or more arrangements, the living hinge is configured to move the first section and the second section between an unclamped position, where first section and second section are positioned at a greater angle with respect to each other, and a clamped position, where first section and second section are positioned at a lesser angle with respect to each other.

In one or more arrangements, the first section has a first clamp channel and the second section has a second clamp channel. In one or more arrangements, the first clamp channel is oriented perpendicular to the second clamp channel. In one or more arrangements, the bracket assembly includes an actuator operably connected to the first section and the second section. The actuator is configured to, when engaged, move the first section and second section closer to each other to facilitate clamping of components in the first clamp channel and the second clamp channel.

DETAILED DESCRIPTION OF THE DISCLOSURE

Figure 1:
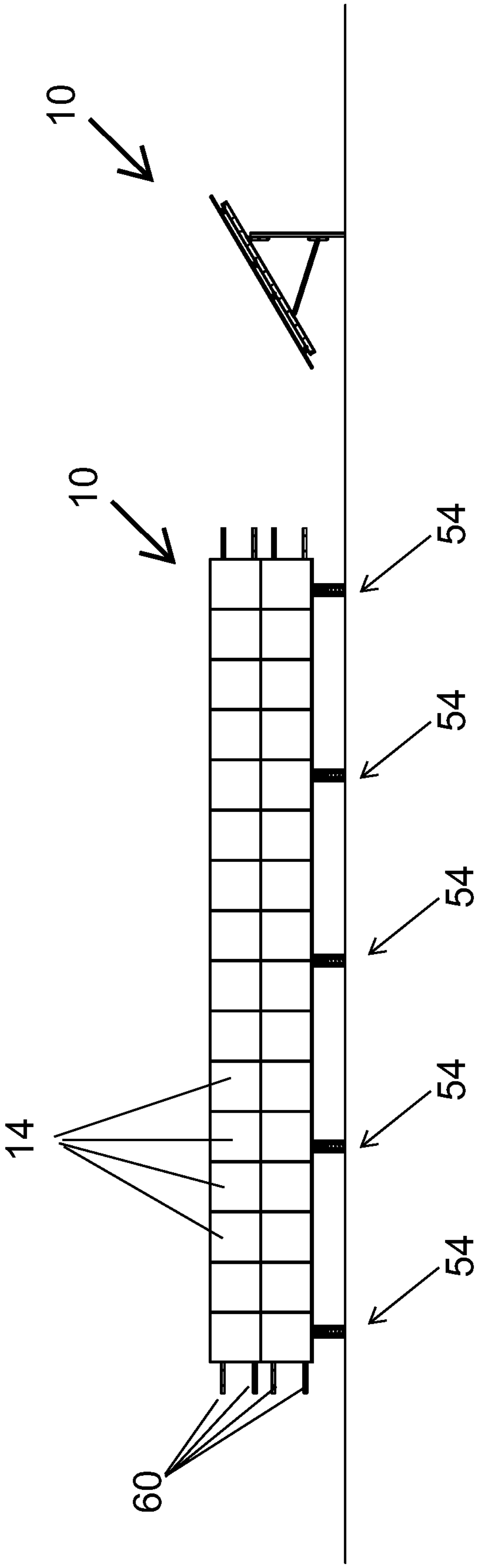
FIG. 1 is a perspective view of the photovoltaic system, the view showing a front view and a side view of the photovoltaic panels, posts, and crossbars.
Figure 2:
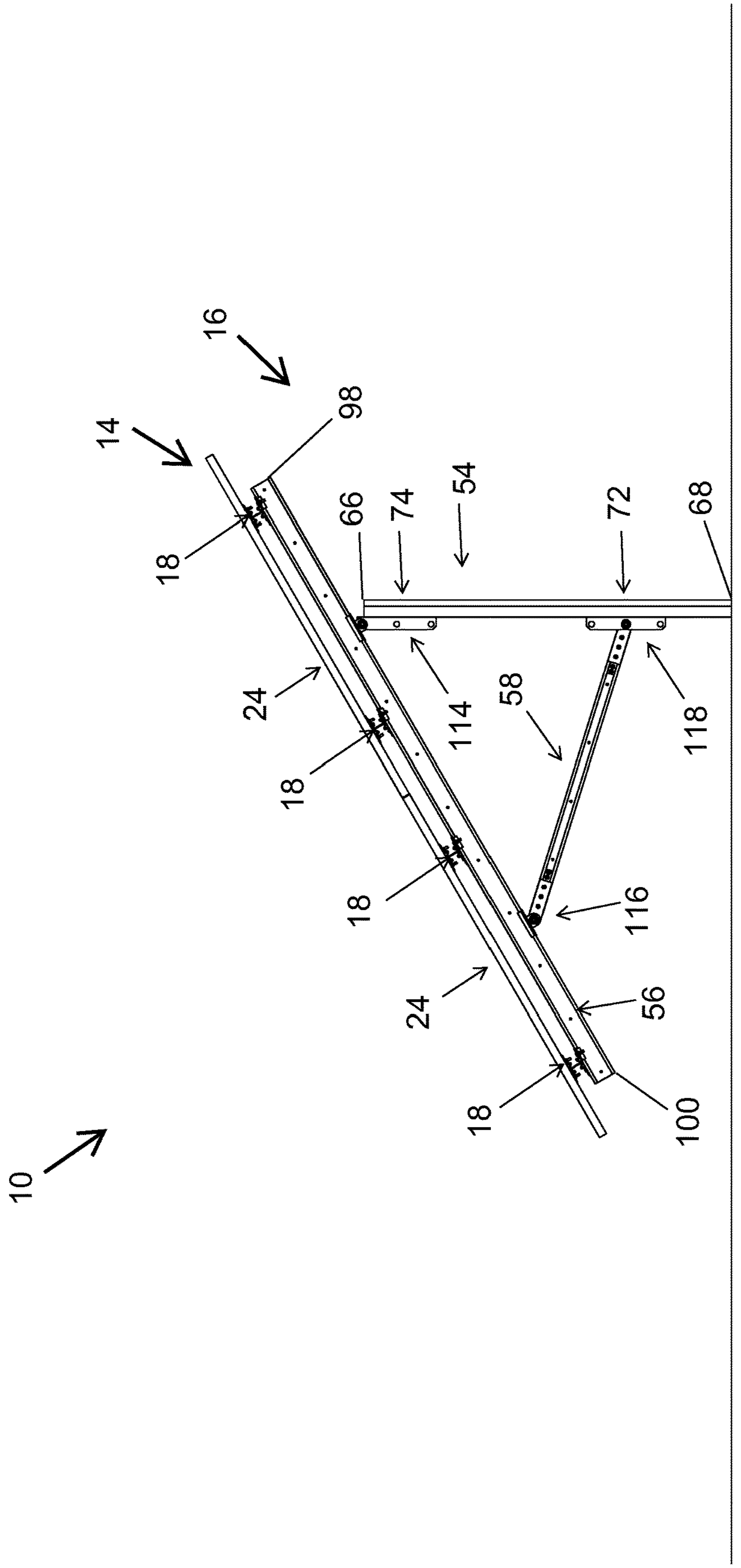
FIG. 2 is another perspective view of the photovoltaic system, the view showing a side view of the photovoltaic panels, support structure, cantilever assemblies, and bracket assemblies.
Figure 3:
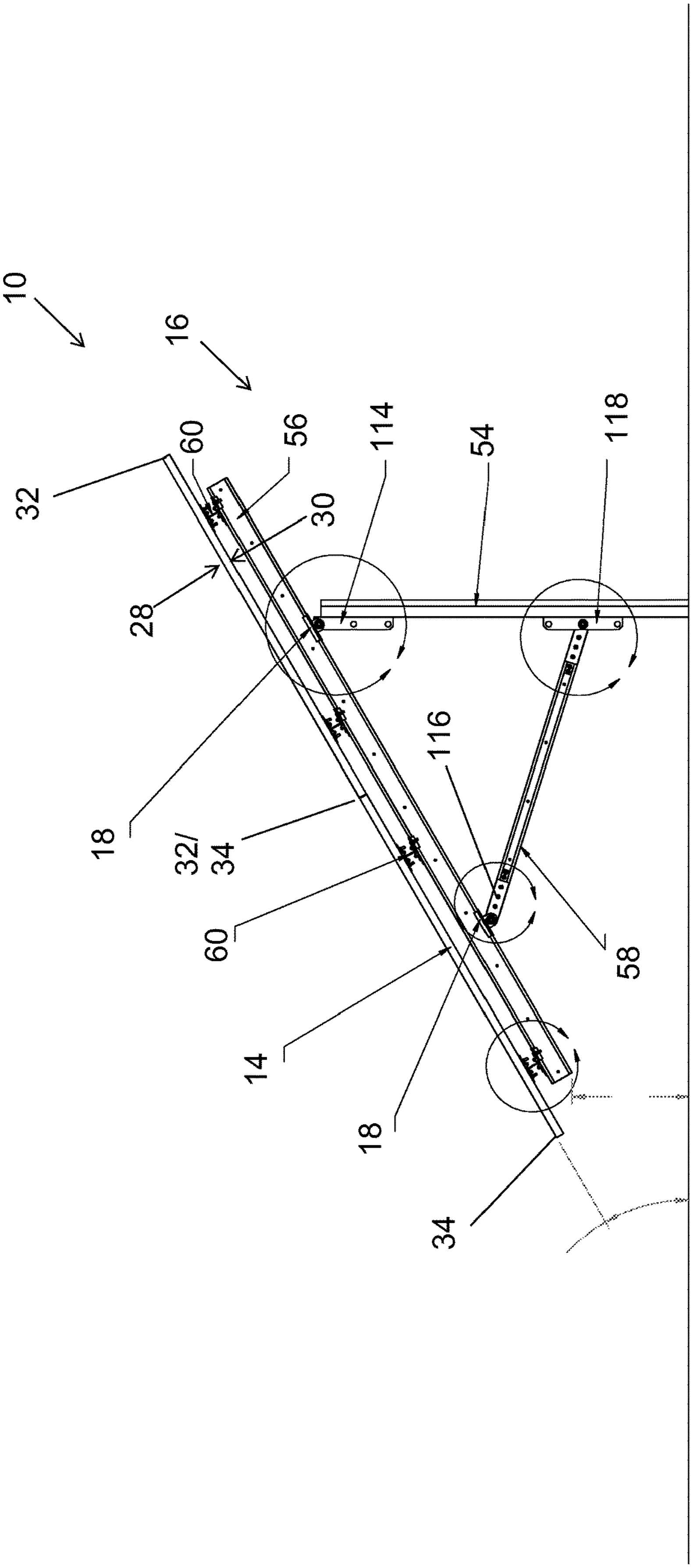
FIG. 3 is another perspective view of the photovoltaic system, the view showing a side view of the photovoltaic panels, support structure, cantilever assemblies, and bracket assemblies, the view showing the rotation of the connection assemblies and movement of the photovoltaic panel relative to the ground.
Figure 4:
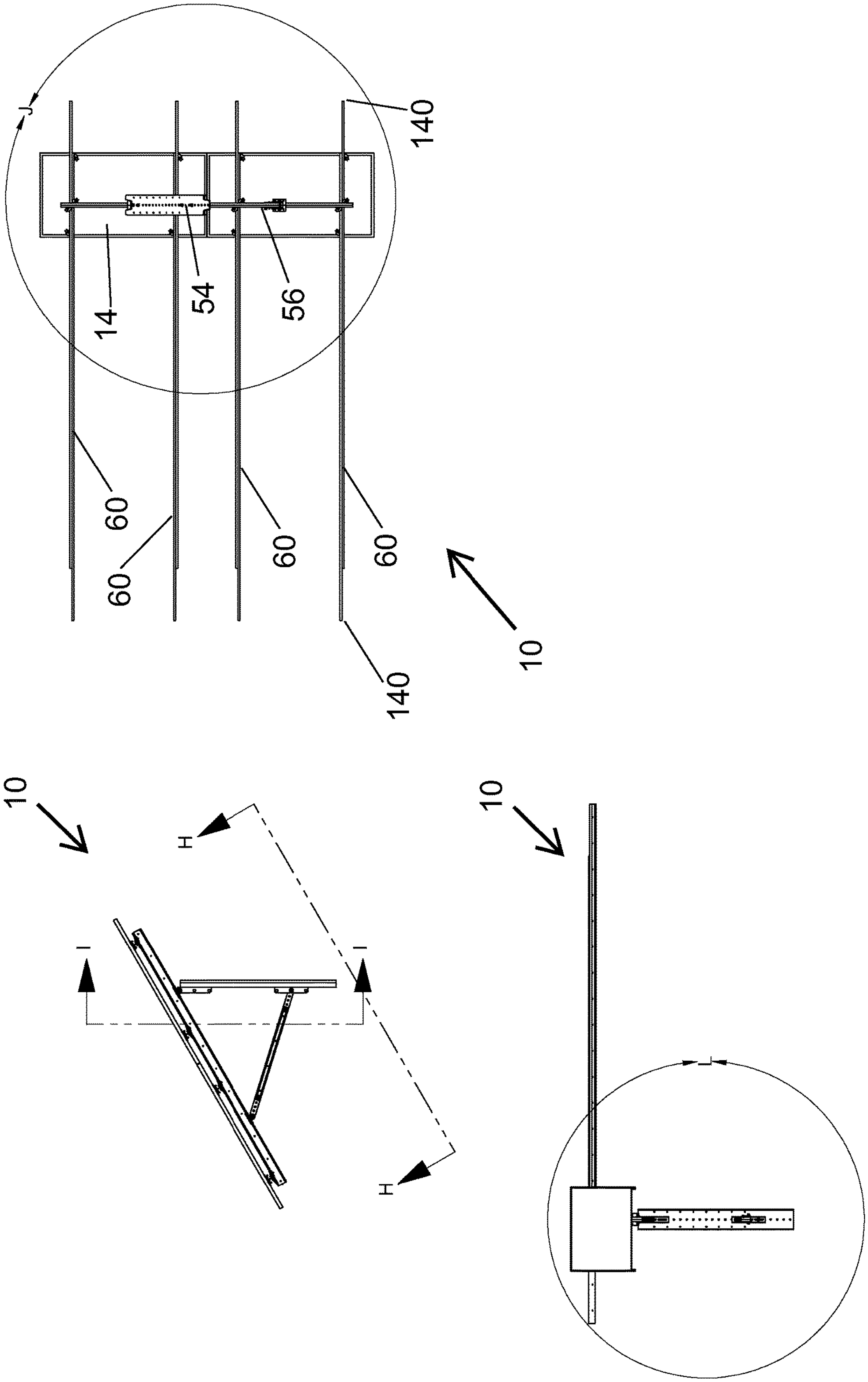
FIG. 4 is perspective view of the crossbars of the photovoltaic system, the view showing the crossbars, cantilever assemblies, posts, and the photovoltaic panel.
Figure 5:
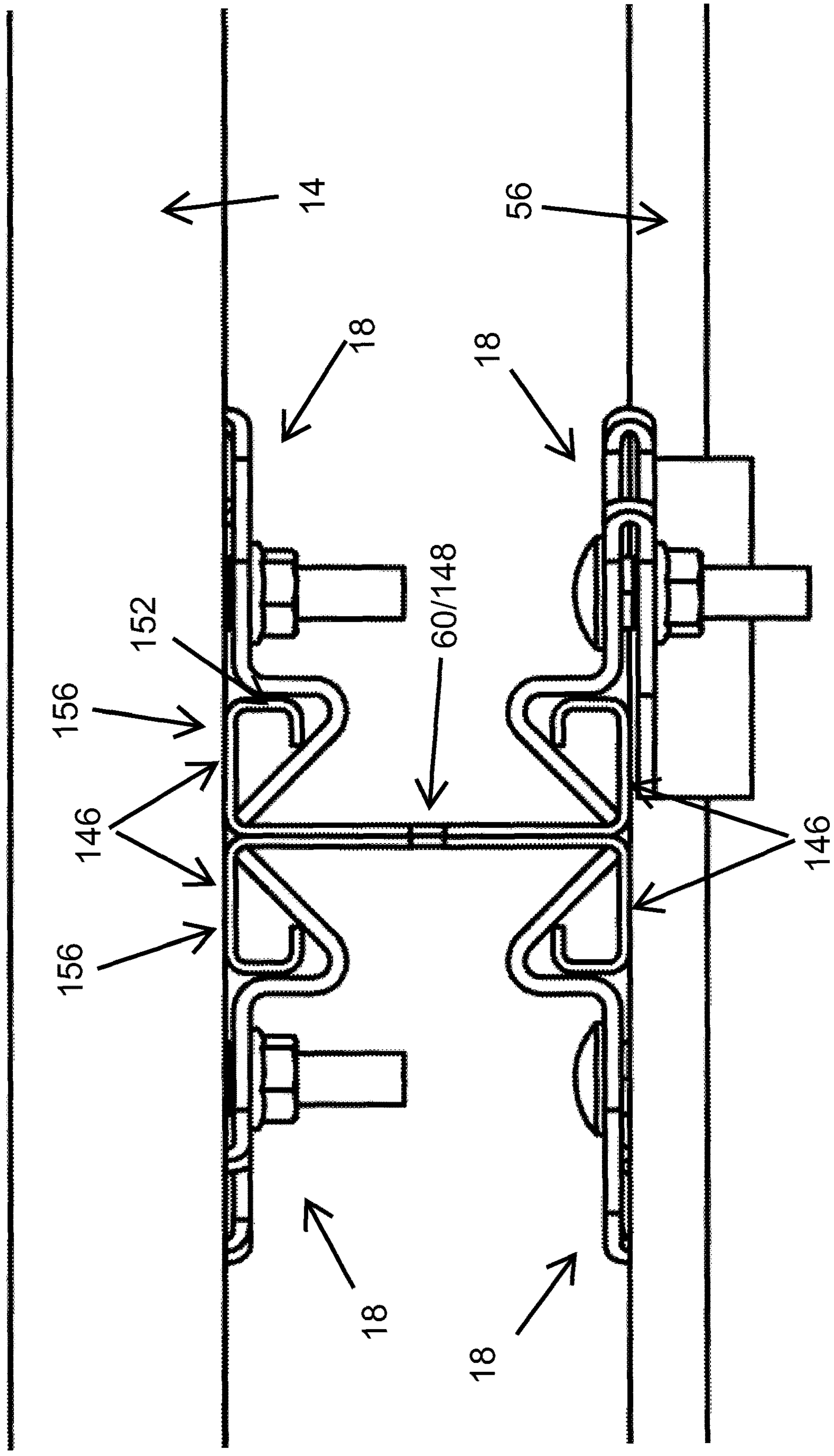
FIG. 5 is an elevation view of the photovoltaic system, the view showing the bracket assemblies clamped onto the crossbar and the photovoltaic panel the view showing the flanges, web, lips, and c-shaped members of the crossbar.
Figure 6:
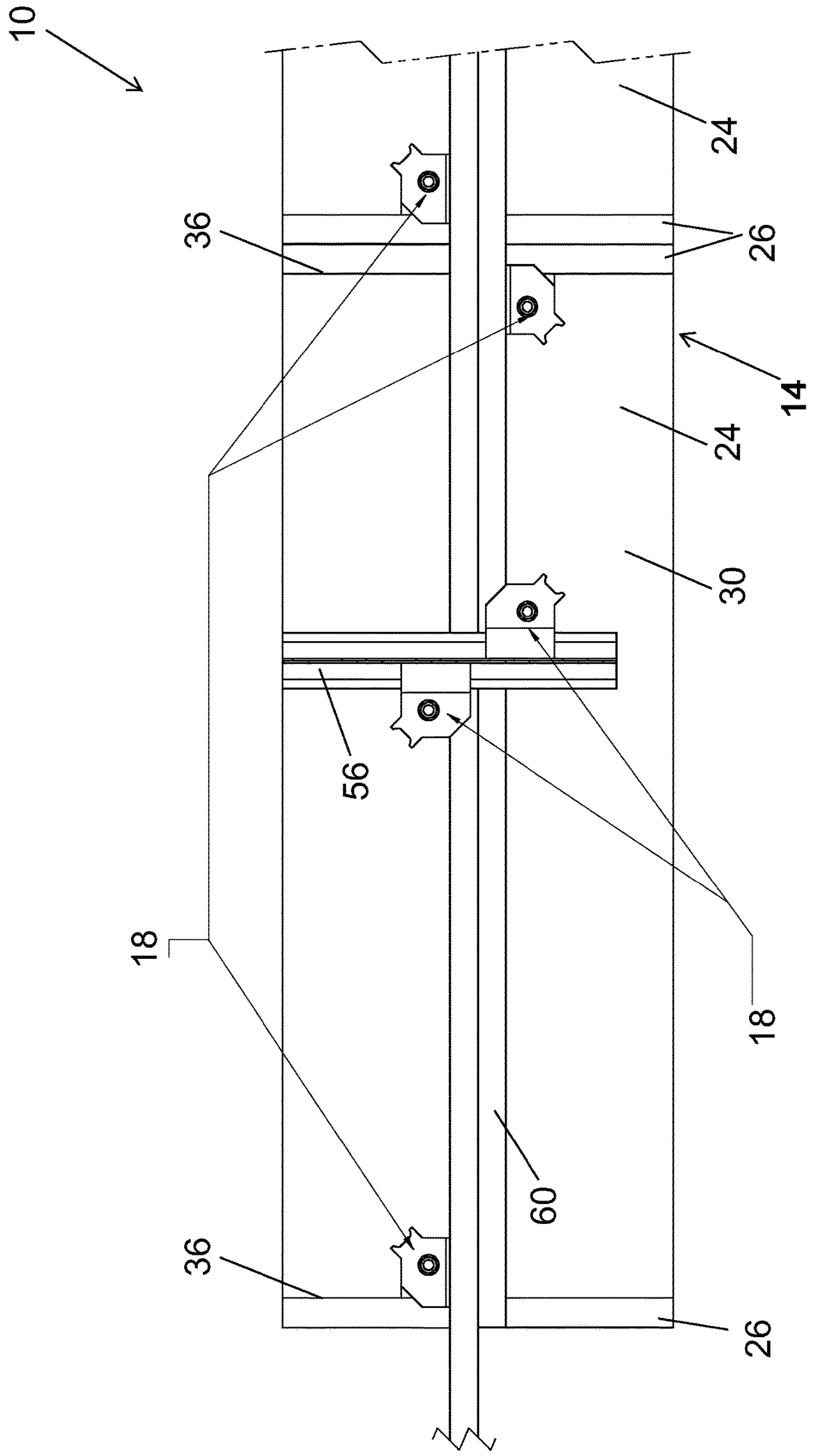
FIG. 6 is another elevation view of the photovoltaic system, the view showing the rear surface of the sheet of photovoltaic cells, the crossbar, the bracket assemblies connecting the sheet of photovoltaic cells to the crossbar, the joints and the cantilever assemblies.
Figure 7:
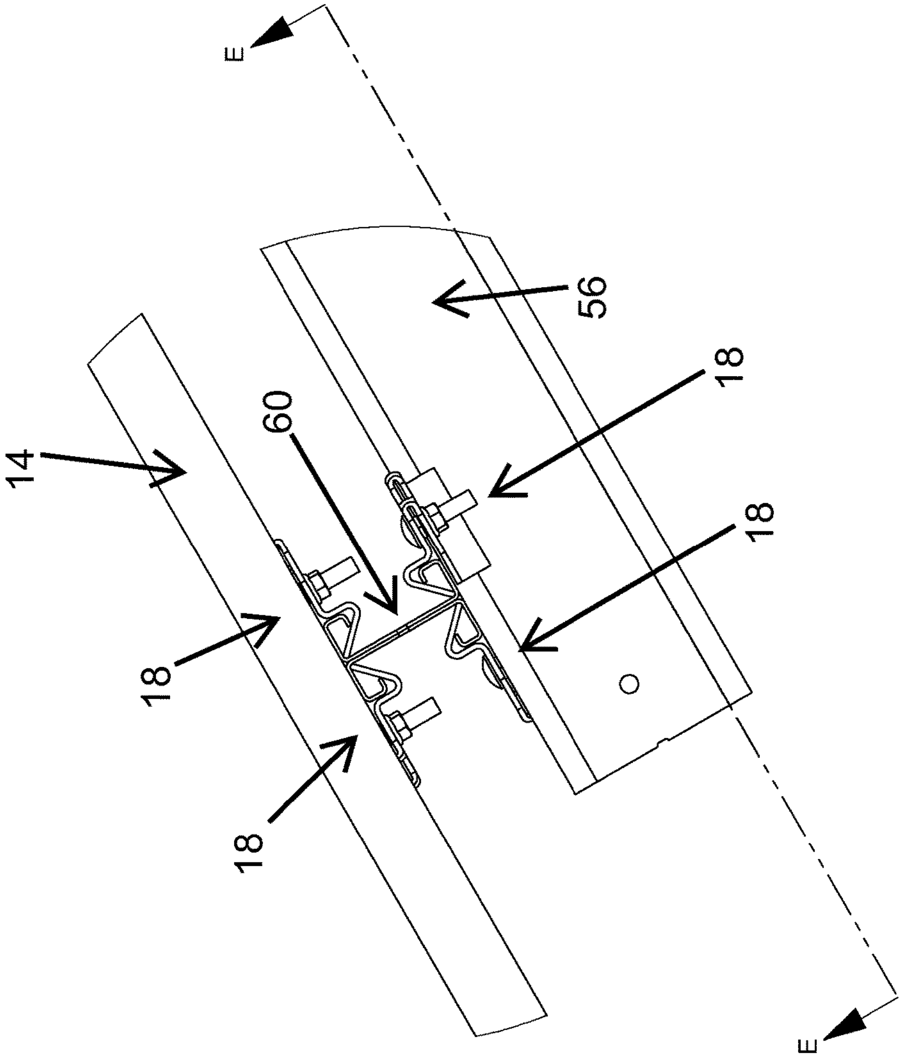
FIG. 7 is another elevation view of the photovoltaic system, the view showing the photovoltaic panels, the bracket assemblies and the crossbar, the bracket assemblies connecting the photovoltaic panels to the crossbar, the view showing the cantilever assemblies connected to the crossbar by the bracket assemblies.
Figure 8:
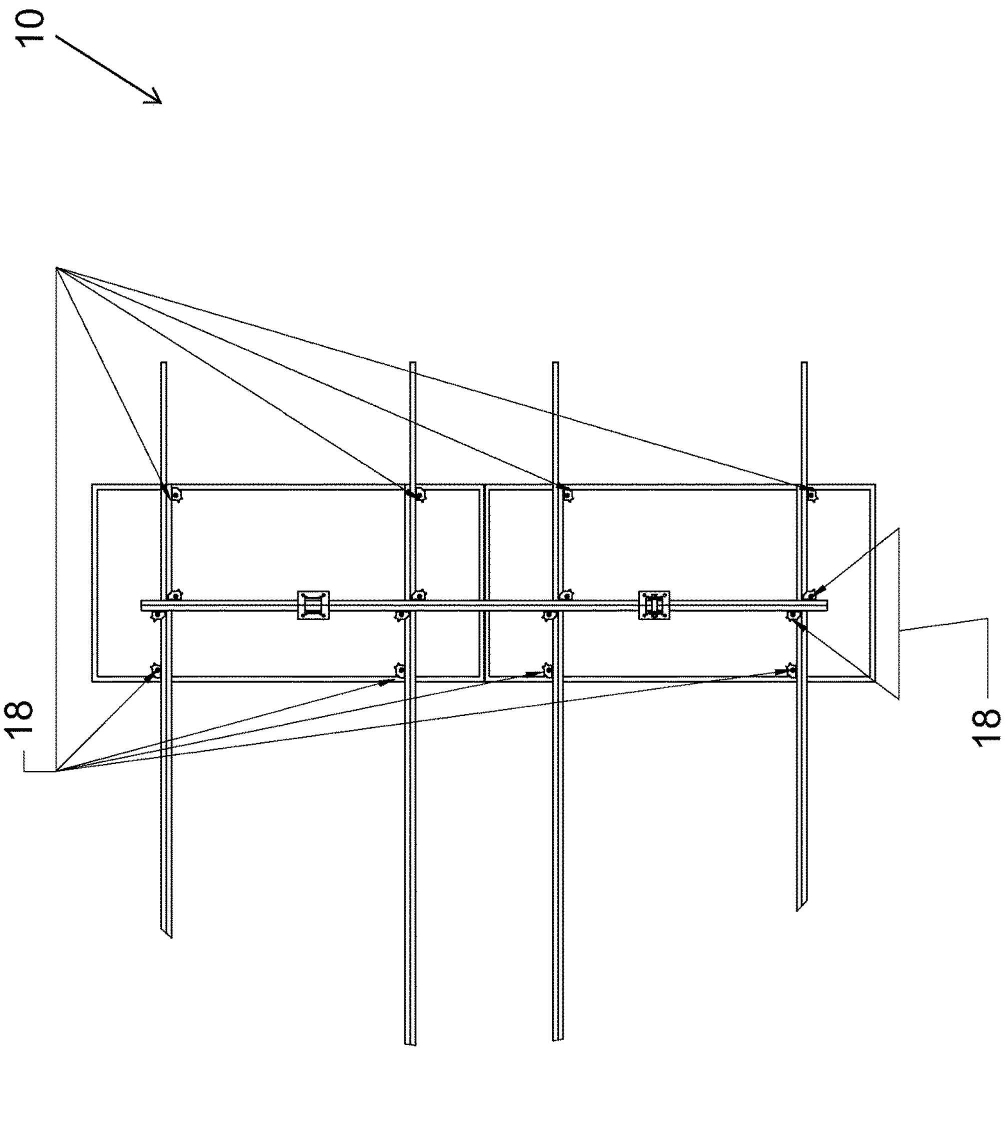
FIG. 8 is another elevation view of the photovoltaic system, the view showing the bracket assemblies, the sheet of photovoltaic cells, and the crossbar.
Figure 9:
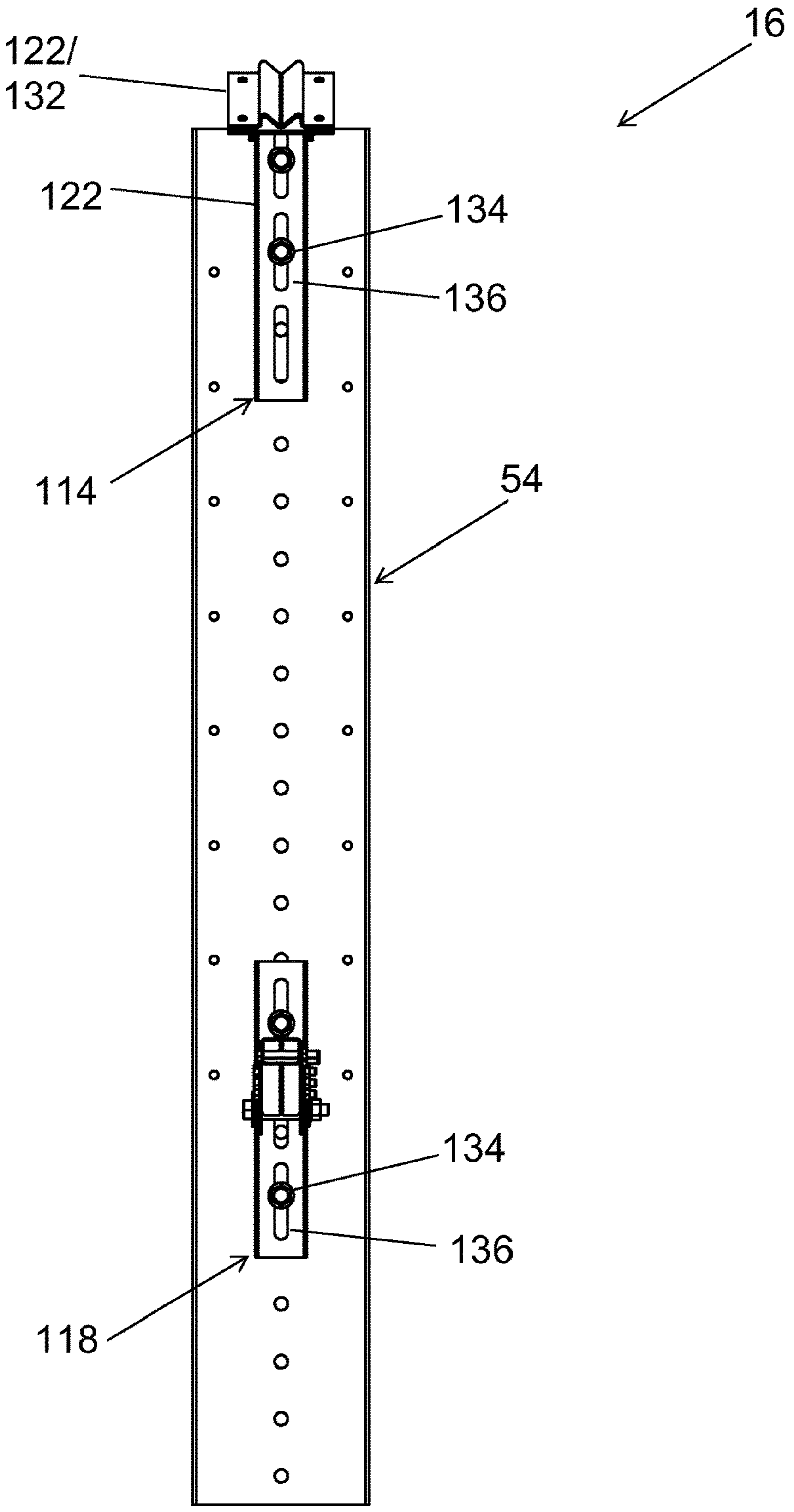
FIG. 9 is an elevation view of the support structure, the view showing the posts and the brackets, clamp, fasteners, and slots of the connection assembly.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

It should be understood that any advantages and/or improvements discussed herein may not be provided by various disclosed embodiments, and/or implementations thereof. The contemplated embodiments are not so limited and should not be interpreted as being restricted to embodiments that provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments that address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure. Moreover, although some disclosed embodiments may be described in the context of window treatments, the embodiments are not so limited. In is appreciated that the embodiments may be adapted for use in other applications which may be improved by the disclosed structures, arrangements and/or methods.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments and/or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of photovoltaic systems. However, the embodiments are not so limited. It is appreciated that the embodiments may be adapted for use in other applications which may be improved by the disclosed structures, arrangements and/or methods. The system is merely shown and described as being used in the context of photovoltaic systems for ease of description and as one of countless example applications.

Turning now to the figures, a system for connecting various components of a photovoltaic system is presented, as is shown as one example.

System 10

With reference to the figures, a system connecting various connecting components is presented (or simply system 10). In the example context of photovoltaic systems 10, in one or more arrangements system 10 includes a set of photovoltaic panels 14, a support structure 16, and a plurality of bracket assemblies 18, for example, to facilitate interconnection of various components of a support structure 16 and/or to facilitate mounting of photovoltaic panels 14 on the assembled support structure 16, among other components.

Photovoltaic Panels 14

Photovoltaic panels 14 are formed of any suitable size, shape, and design and are configured to generated electricity from light. In the arrangement, shown, as one example, photovoltaic panels 14 include a sheet of photovoltaic cells 24 and joints 26 among other components.

Sheet of Photovoltaic Cells 24

In this example arrangement, the sheet of photovoltaic cells 24 has a generally rectangular planar shape having a front surface 28 and a rear surface 30 extending from an upper edge 32, a lower edge 34, and opposing side edges 36. However, the arrangements are not so limited. Rather, it is contemplated that in some various arrangements, the sheet of photovoltaic cells 24 may have various different shapes including but not limited to: square, rectangular, circular, triangular, pentagonal, hexagonal, octagonal, other polygonal, or any other shape. In this example arrangement, light incident on front surface 28 causes the sheet of photovoltaic cells 24 to generate an electric current across a set of output electric terminals (not shown).

Joints 26

In the arrangement shown, sheet of photovoltaic cells 24 is framed by a set of joints 26. Joints 26 are formed of any suitable size, shape, and design and are configured to operably connect with the sheet of photovoltaic cells 24 and facilitate connection of photovoltaic panel 14 with support structure 16. In the arrangement shown, as one example, joints 26 are elongated members extending along edges 32/34/36 of the sheet of photovoltaic cells 24. In this example arrangement, joints 26 have a sidewall 40 extending rearward from a forward edge 42, where joints 26 are operably connected to sheet 24, to a rearward edge 44. In this example arrangement, joints 26 have a flange 46 extending along rearward edge 44 to facilitate connection with support structure 16 by bracket assemblies 18.

However, the arrangements are not so limited. Rather, it is contemplated that in some various arrangements, joints 26 may have various different arrangements and/or configurations to facilitate operably connection with the sheet of photovoltaic cells 24 and/or support structure 16.

Support Structure 16

Support structure 16 is formed of any suitable size, shape, and design and is configured to facilitate mounting and support of photovoltaic panels 14 for operation. In the arrangement shown, as one example, support structure 16 is configured to facilitate ground mount installation of one or more photovoltaic panels 14. However, the arrangements are not so limited. Rather, it is contemplated that in some various arrangements, support structure 16 may be adapted to facilitate mounting of photovoltaic panels 14 in various locations including but not limited to, for example, installation on the ground and/or on installation on roofs, walls, doors, or other components of various different structures (e.g., homes, retail/industrial buildings, barns, grain bins, and/or any other structure). In the arrangement shown, as one example, support structure 16 includes a set posts 54, a cantilever assembly 56 connected to each post 54, a set of braces 58 configured to support the cantilever assemblies 56, and a set of crossbars 60 extending laterally between the cantilever assemblies 56, among other components.

Posts 54

Posts 54 are formed of any suitable size, shape, and design and are configured to provide a fixed rigid foundation and facilitate connection with and support of other components of support structure 16. In the arrangement shown, posts 54 are rigid elongated members extending from an upper end 66, where post 54 operably connects with a cantilever assembly 56, to a lower end 68, which is driven deep into the ground (e.g., 6 ft) to provide a secure foundation for support structure 16. However, the arrangements are not so limited. Rather, it is contemplated that depending on the location, some various different arrangements, may utilize various different procedures to install posts 54 including but not limited to, driving posts into the ground, setting posts in concreate, and/or any other method of installation. In one or more arrangements, posts 54 have a folded cross section providing superior rigidity and support while permitting easy driving of posts 54 into the earth.

Figure 10:
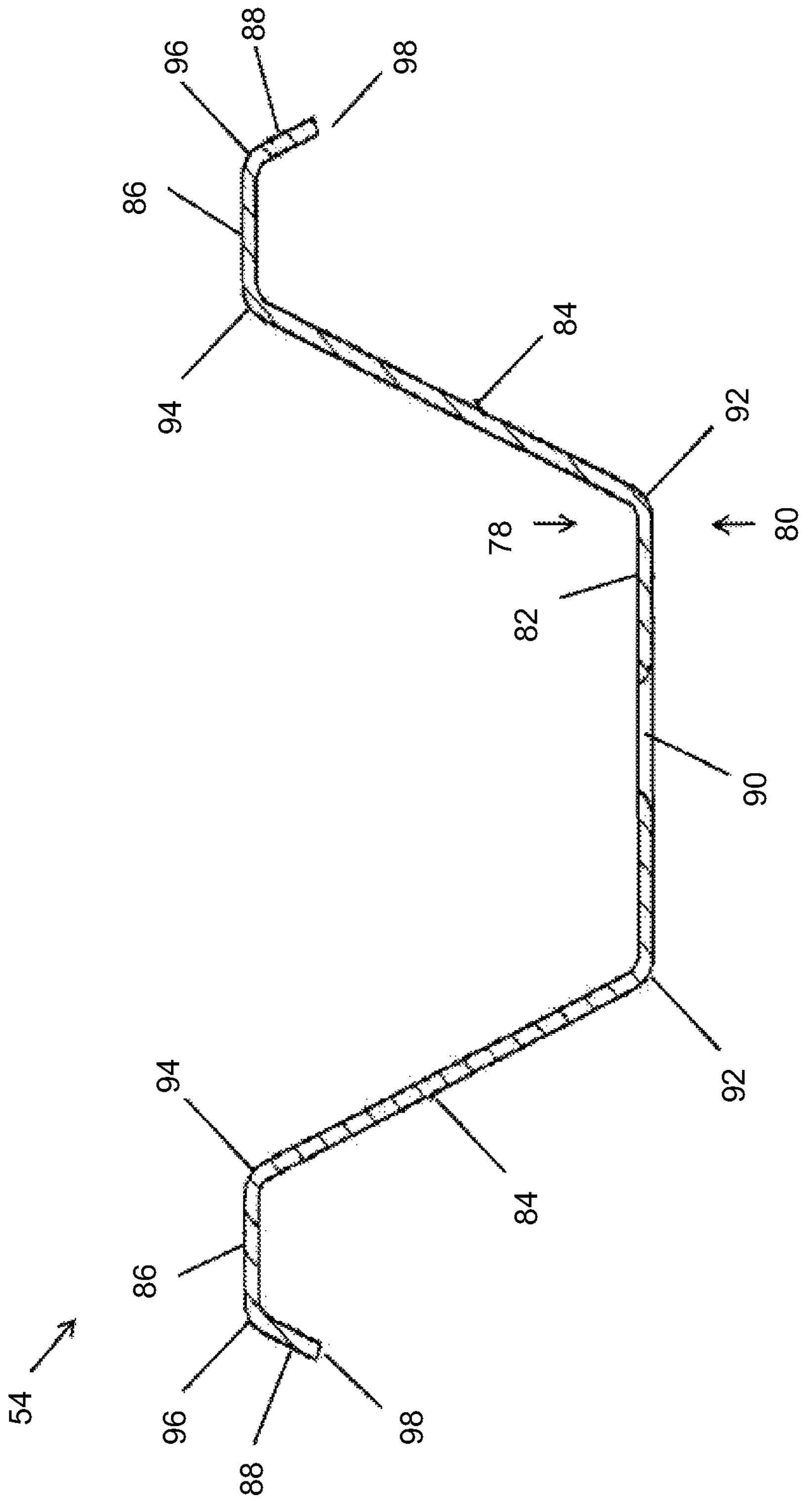
FIG. 10 is an elevation view of the posts, the view showing the rearward edge, the forward walls, the front surface and the second surface, the sidewall, tables, holes, forward edge and outward edge of the posts, the view showing the upper end of the cantilever assembly.
Figure 11:
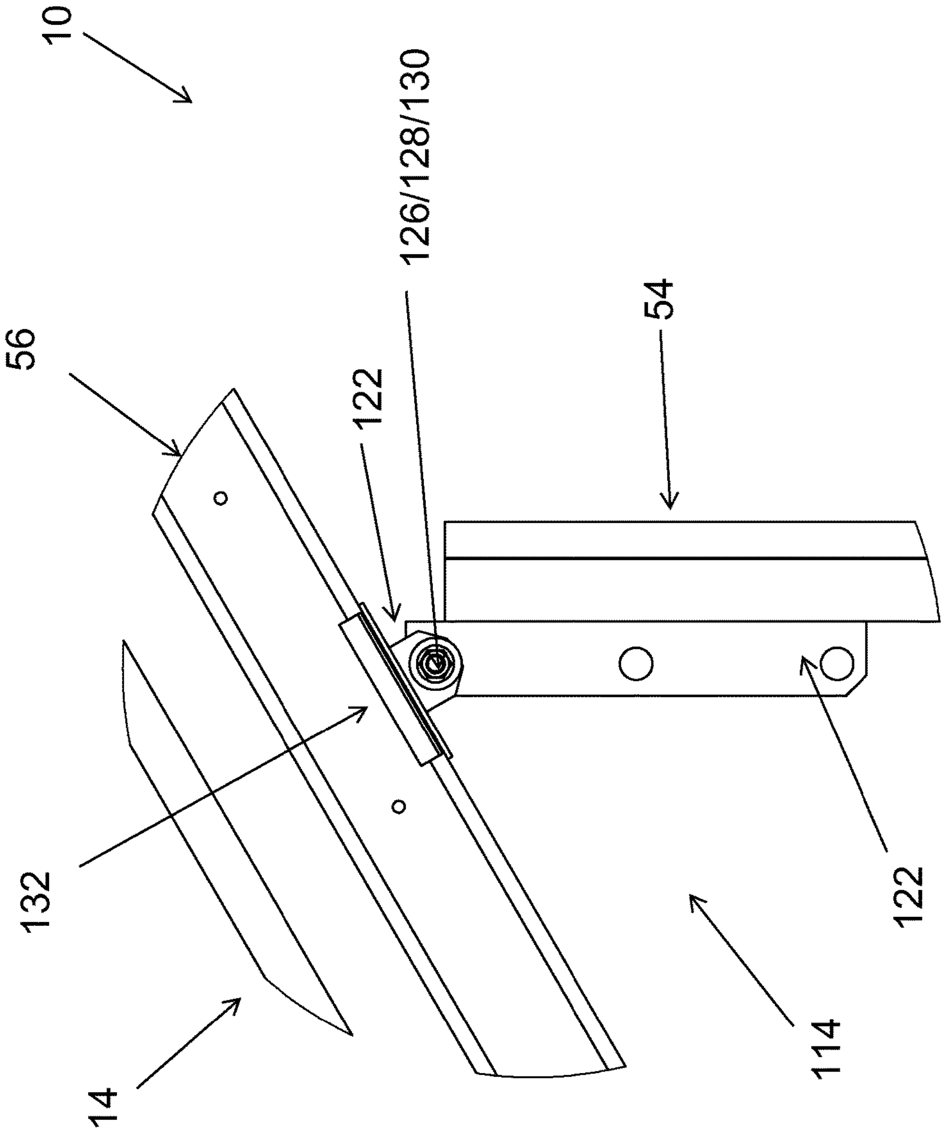
FIG. 11 is an elevation view of the photovoltaic system, the view showing the cantilever assembly, the photovoltaic panel, the upper connection assembly clamps and brackets, and the posts.
Figure 12:
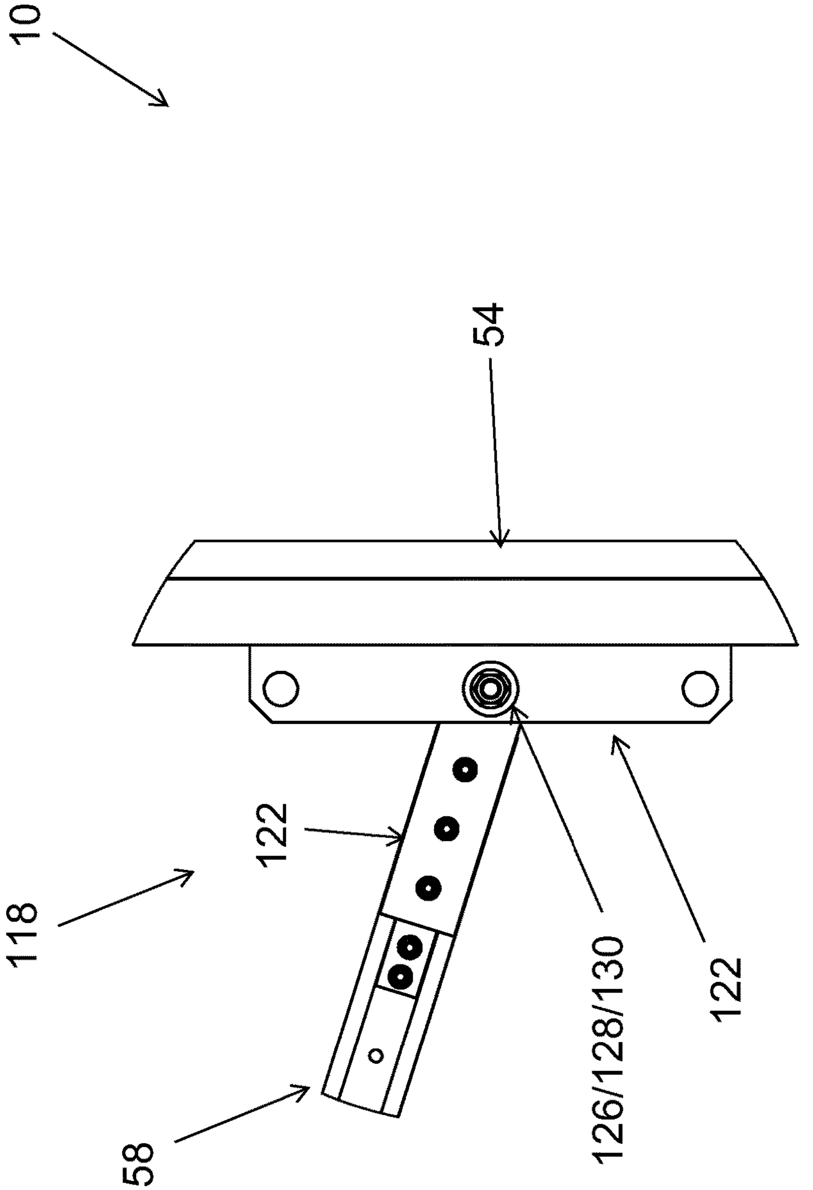
FIG. 12 is an elevation view of the photovoltaic system, the view showing the posts, brace, and rearward connection assembly; the view showing the brackets, fasteners, holes, and hinge connection of the rearward connection assembly.
Figure 13:
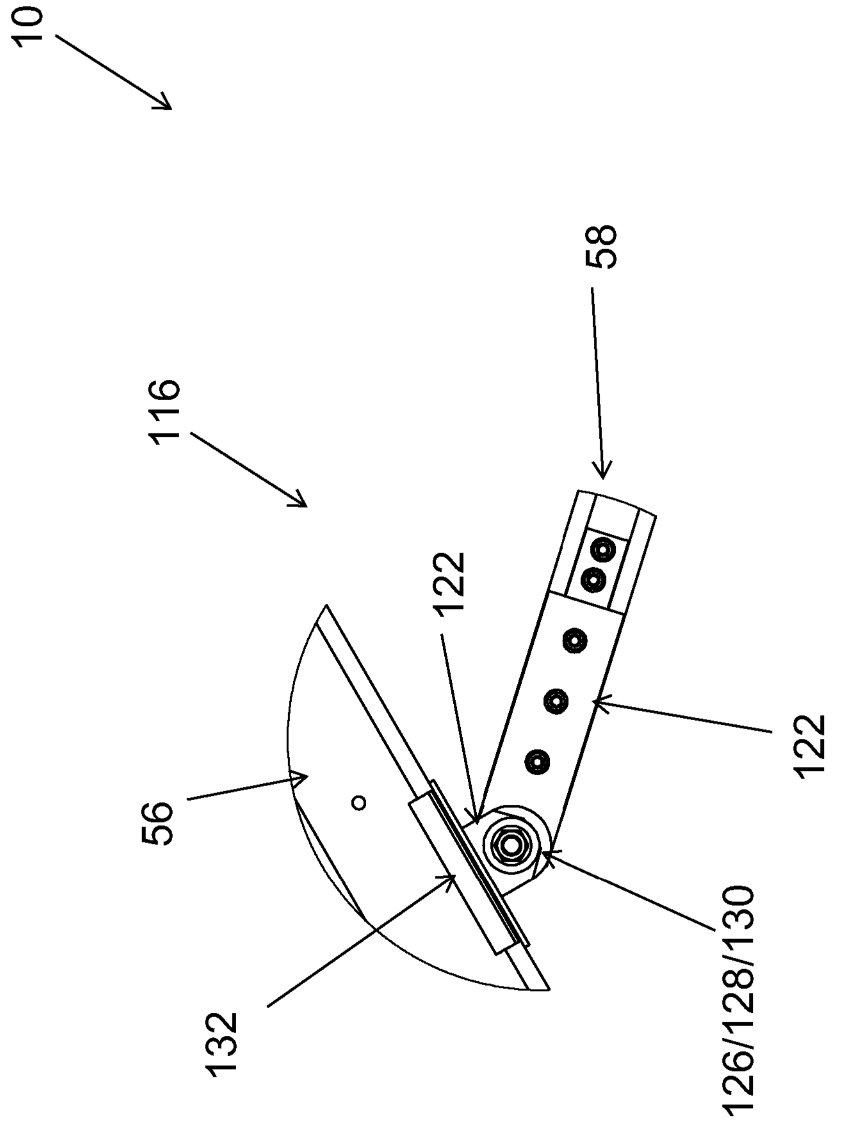
FIG. 13 is an elevation view of the photovoltaic system, the view showing the brace, cantilever assembly, and forward connection assembly; the view showing the brackets, fasteners, clamps, holes, and hinge connection of the rearward connection assembly.
Figure 14:
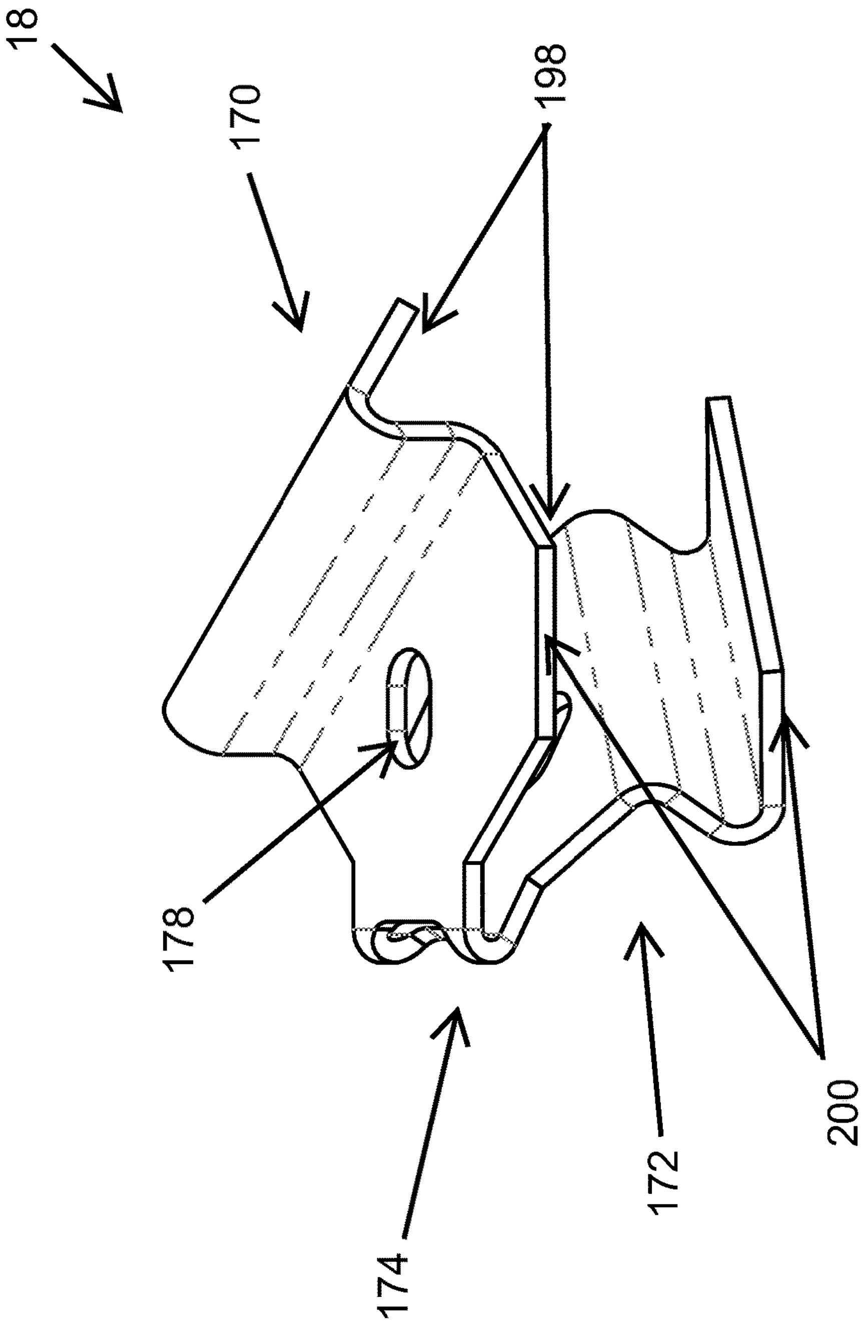
FIG. 14 is a perspective view of the bracket assembly, the view showings the first section, the second section, the hole, the living hinge, the first clamp and the second clamp.
Figure 15:
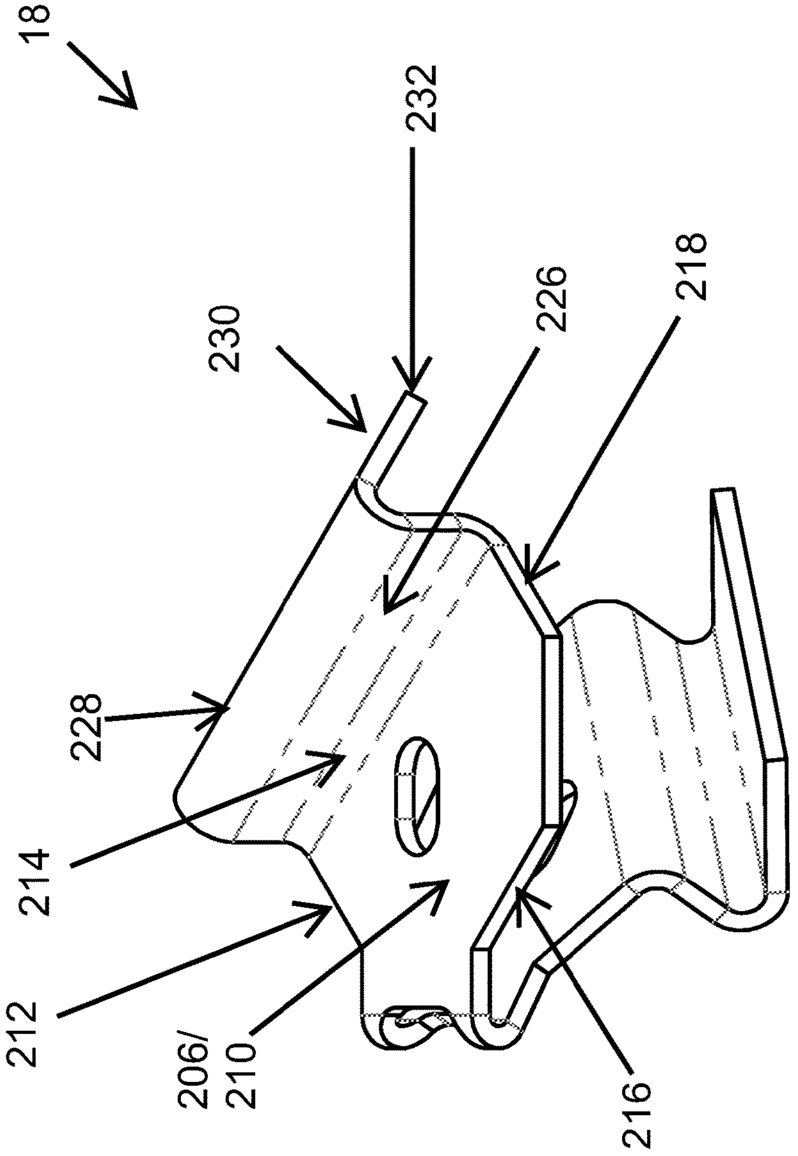
FIG. 15 is another perspective view of the bracket assembly, the view showing the main body, the outward facing surface, the first and second inner edges, the first and second outward edges, the first and second flanges, the corner edge, and the free edge.
Figure 16:
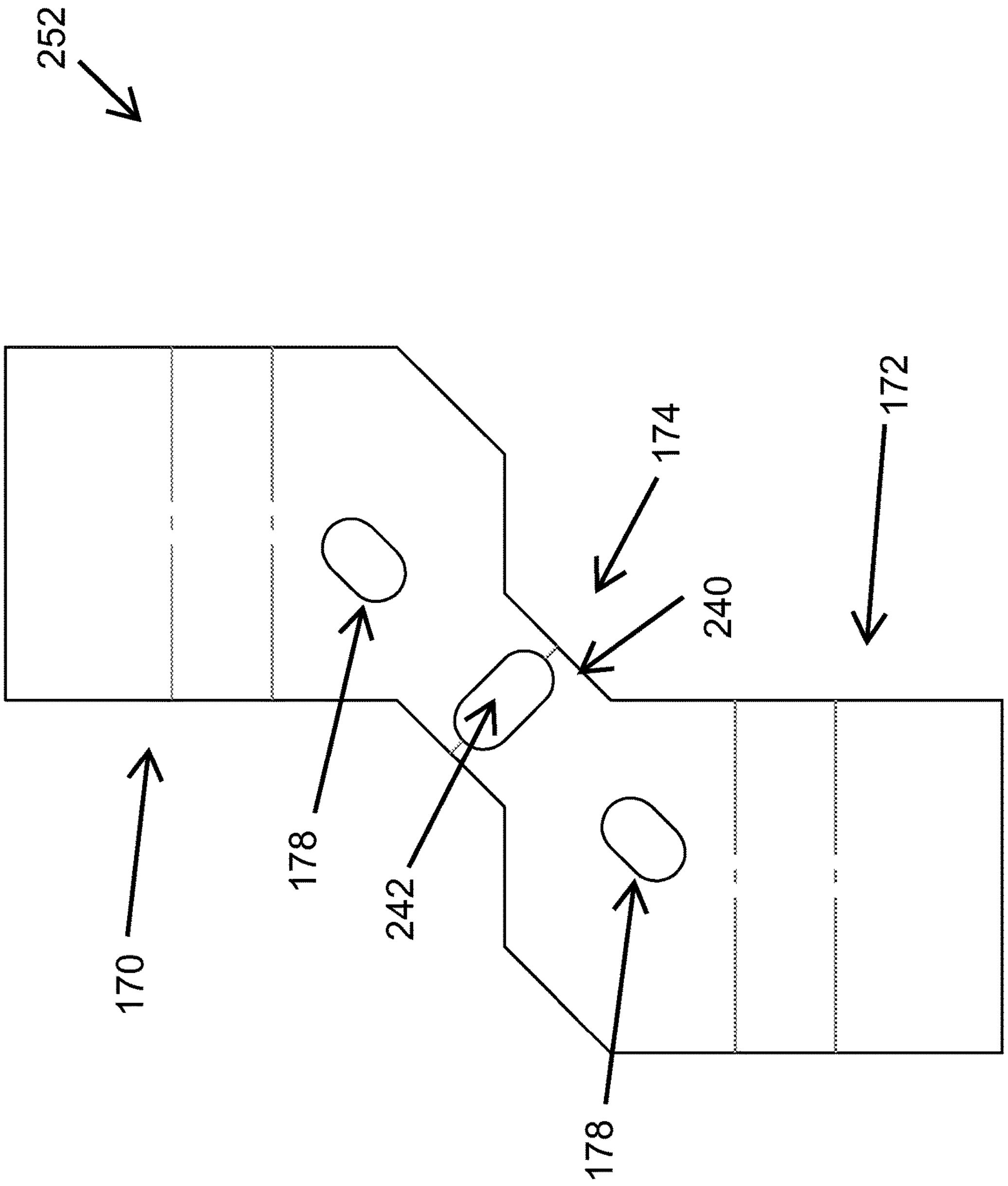
FIG. 16 is a perspective view of the primary component of the bracket assembly, the view showing the first section and second section, the holes, and the living hinge.
Figure 17:
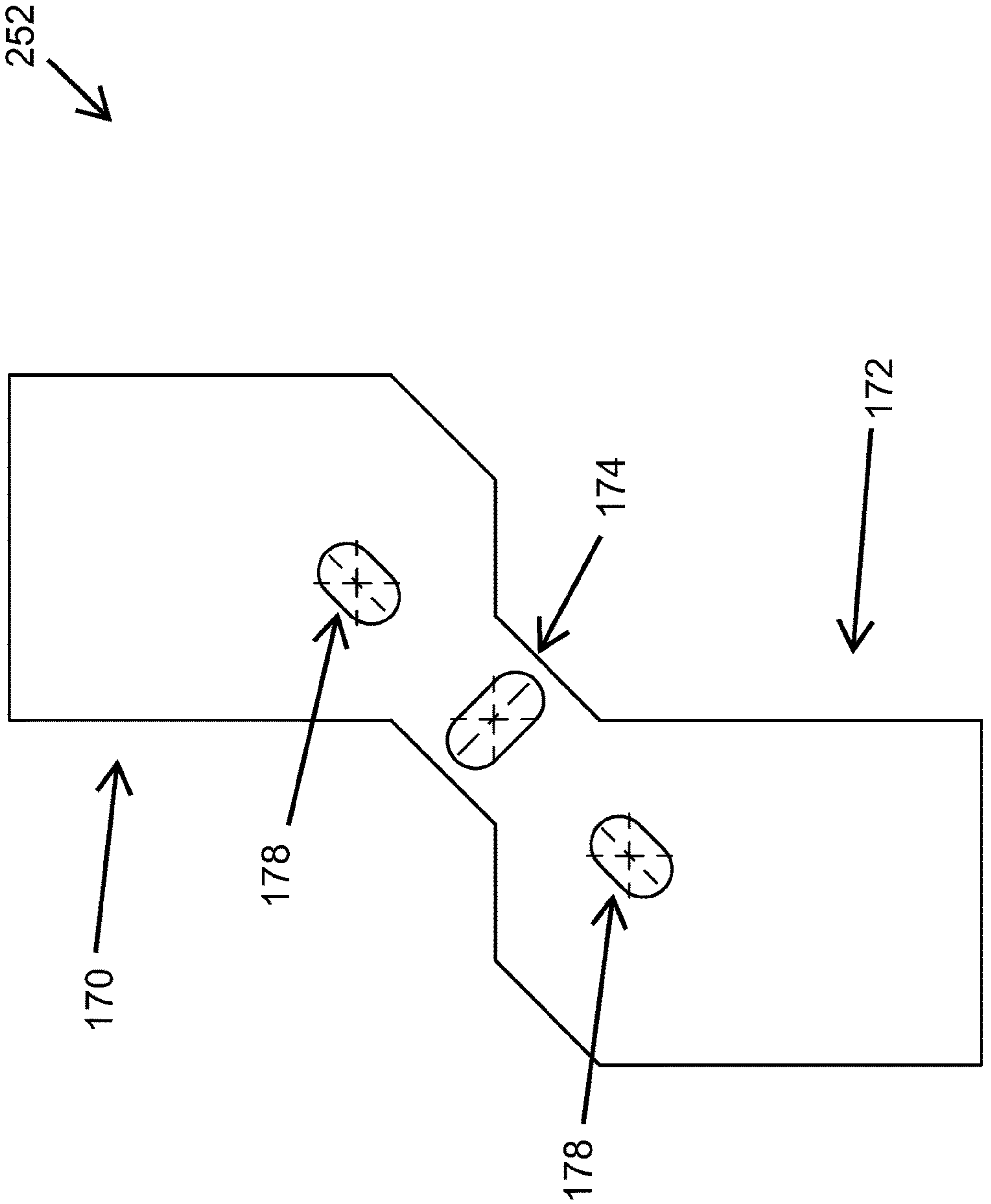
FIG. 17 is another perspective view of the primary component of the bracket assembly, the view showing the first section and second section, the holes, the living hinge, the weak point of the living hinge, and the length of material of the living hinge.
Figure 18:
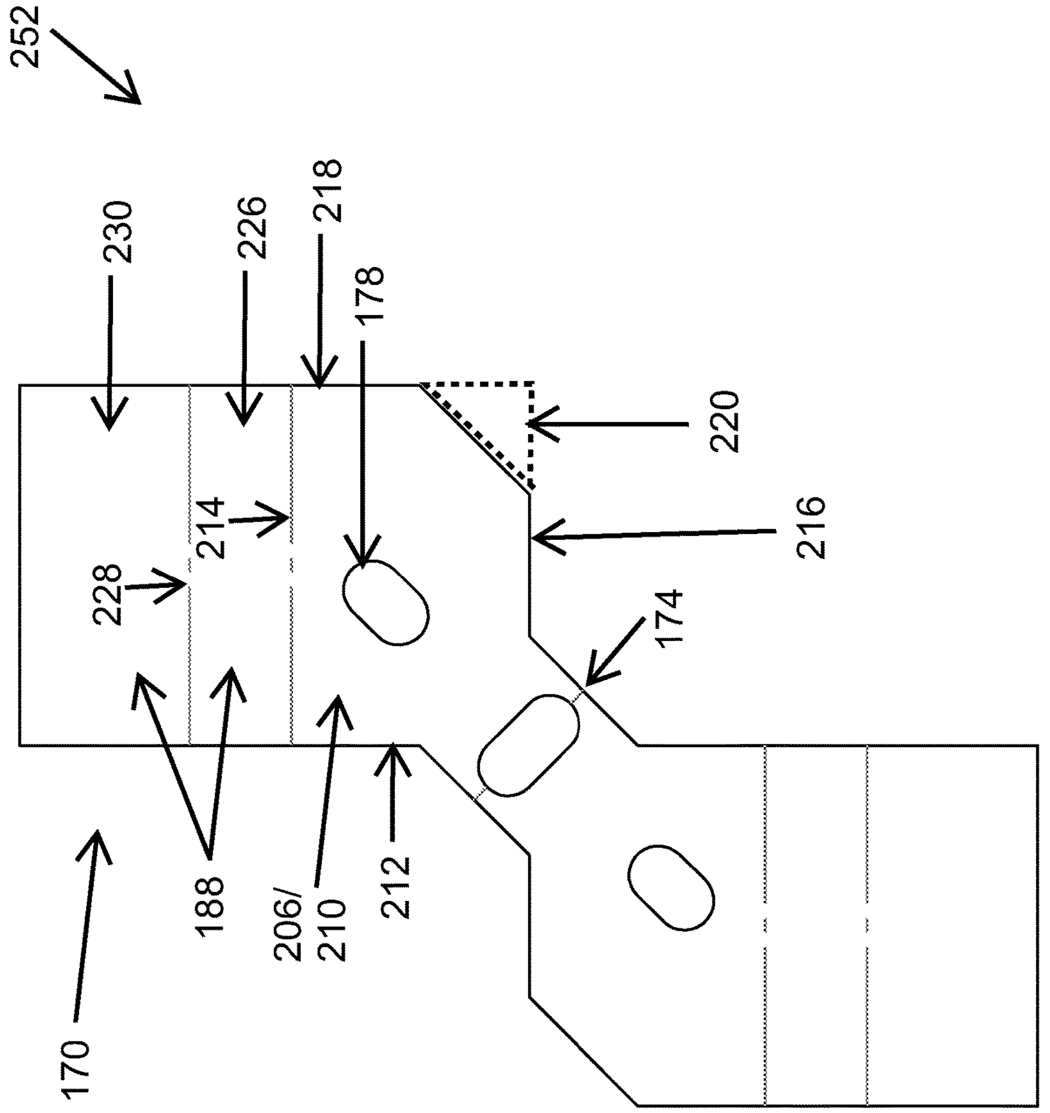
FIG. 18 is another perspective view of the primary component of the bracket assembly, the view showing the main body, the outward facing surface, the first and second inner edges, the first and second outward edges, the first and second flanges, the corner edge, and the free edge, the first claim channel, and the cutaway.
Figure 19:
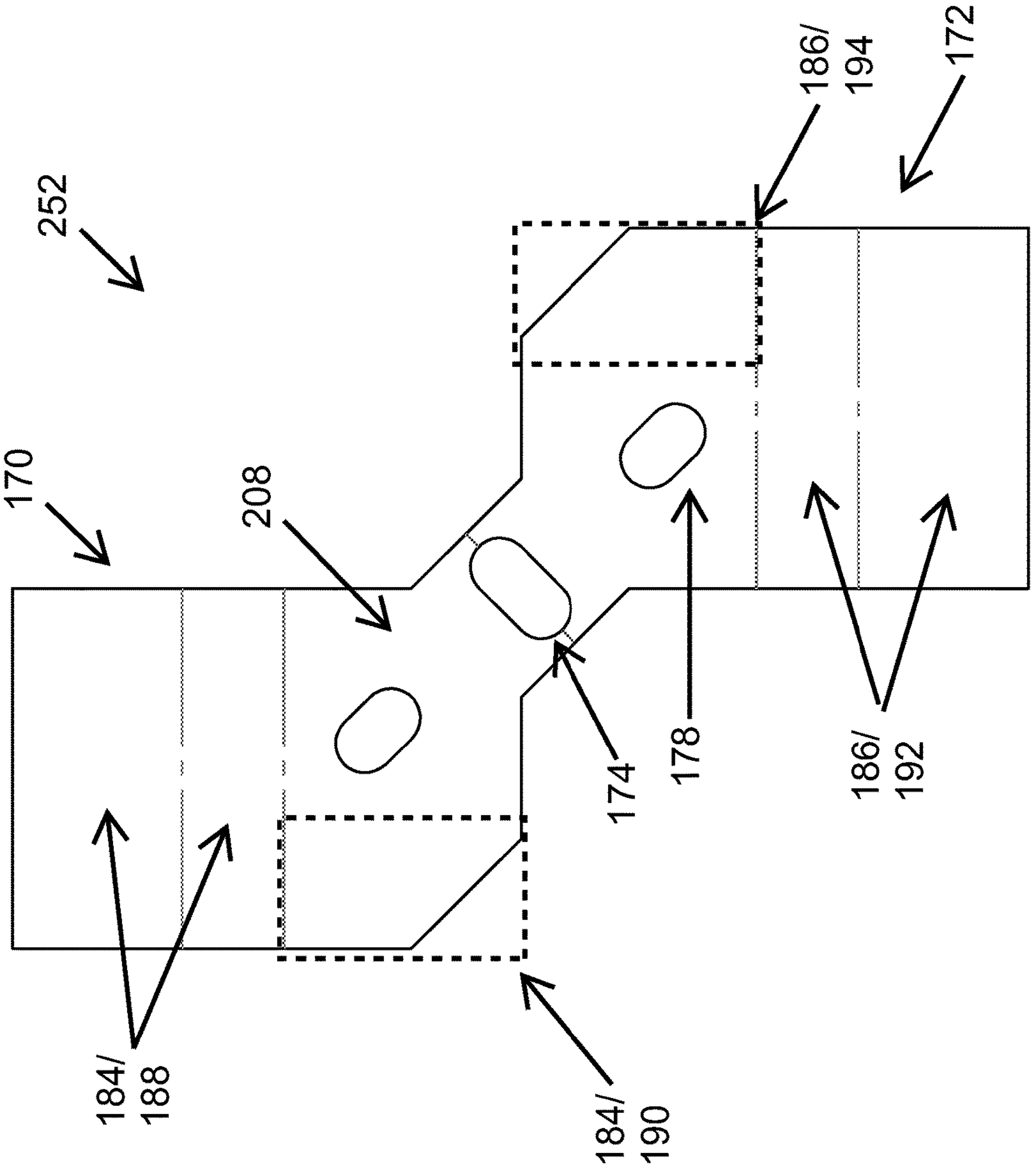
FIG. 19 is another elevation view of the primary component of the bracket assembly, the view showing the inward facing surface, the holes, the living hinge, the first set and second set of clamping surfaces, and the first and second claim channel, the first section and the second section.
Figure 20:
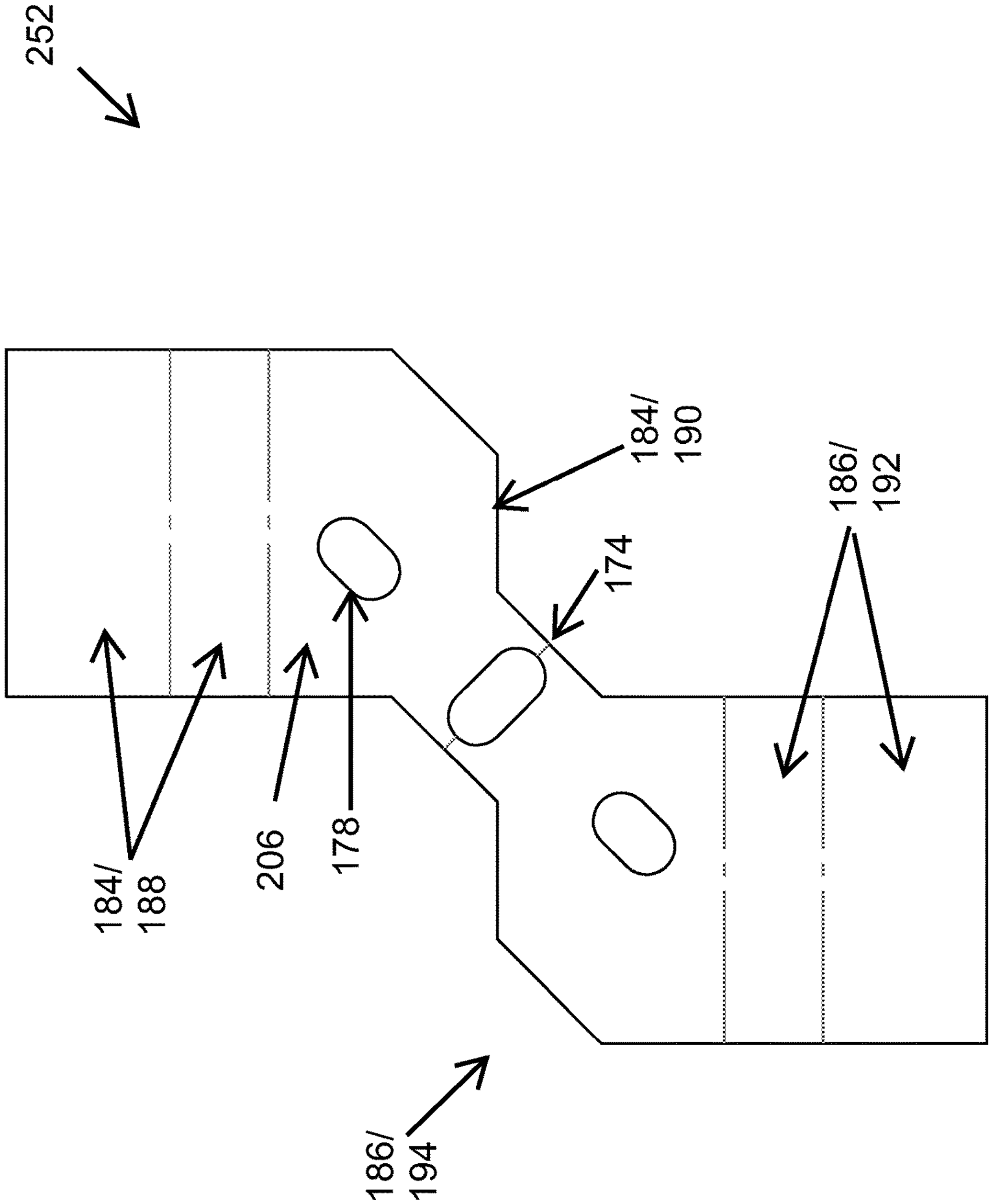
FIG. 20 is another elevation view of the primary component of the bracket assembly, the view showing the main body, the living hinge, the holes, the first set and second set of clamping surfaces, and the first and second claim channel.
Figure 21:
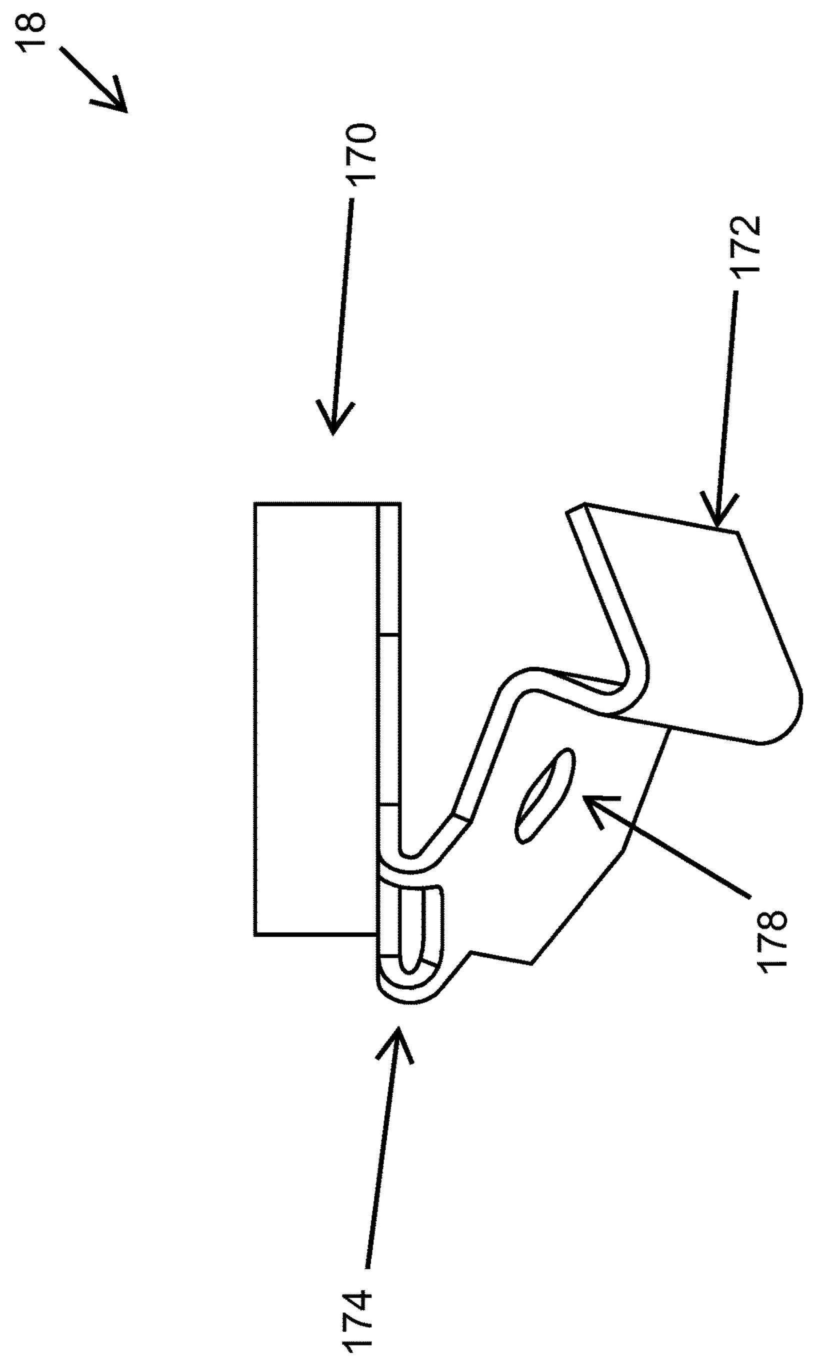
FIG. 21 is a perspective view of the bracket assembly, the view showing the living hinge, the hole, the first section and the second section.
Figure 22:
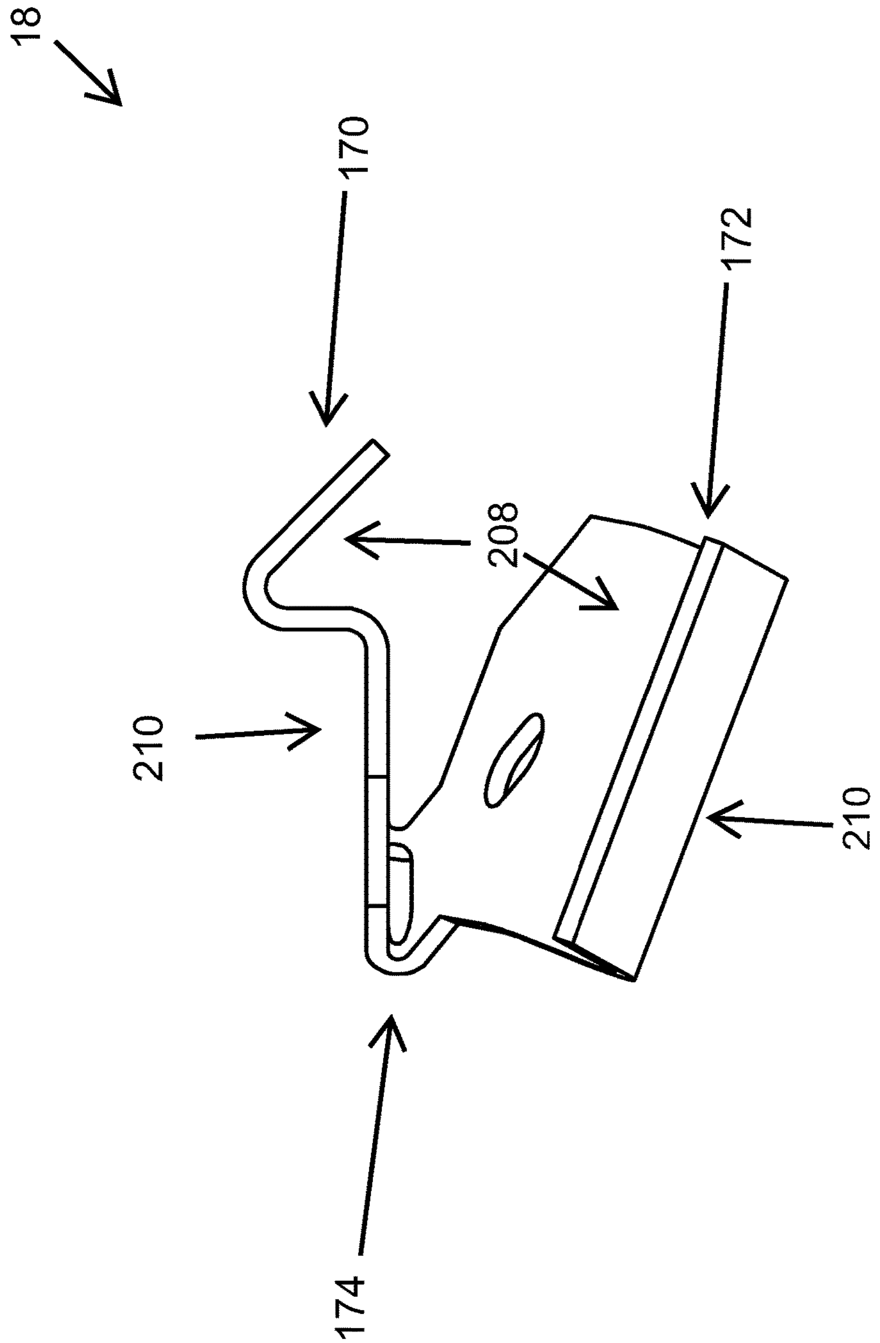
FIG. 22 is a perspective view of the bracket assembly, the view showing the living hinge, the actuator, the first section and the second section, and the inward facing surface and the outward facing surface.
Figure 23:
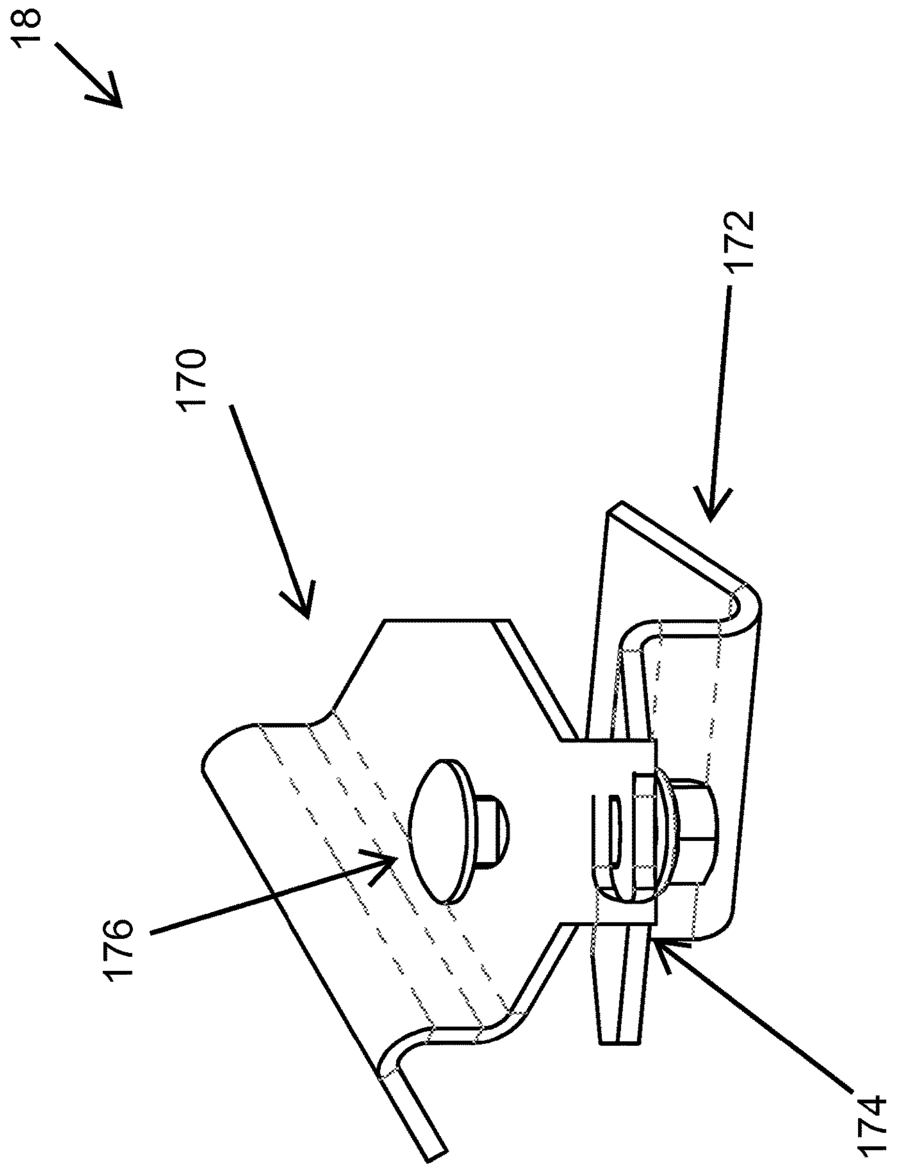
FIG. 23 is an elevation view of the bracket assembly, the view showing the living hinge, the actuator, the first section and the second section, the view showing the bracket assembly in an unclamped position.
Figure 24:
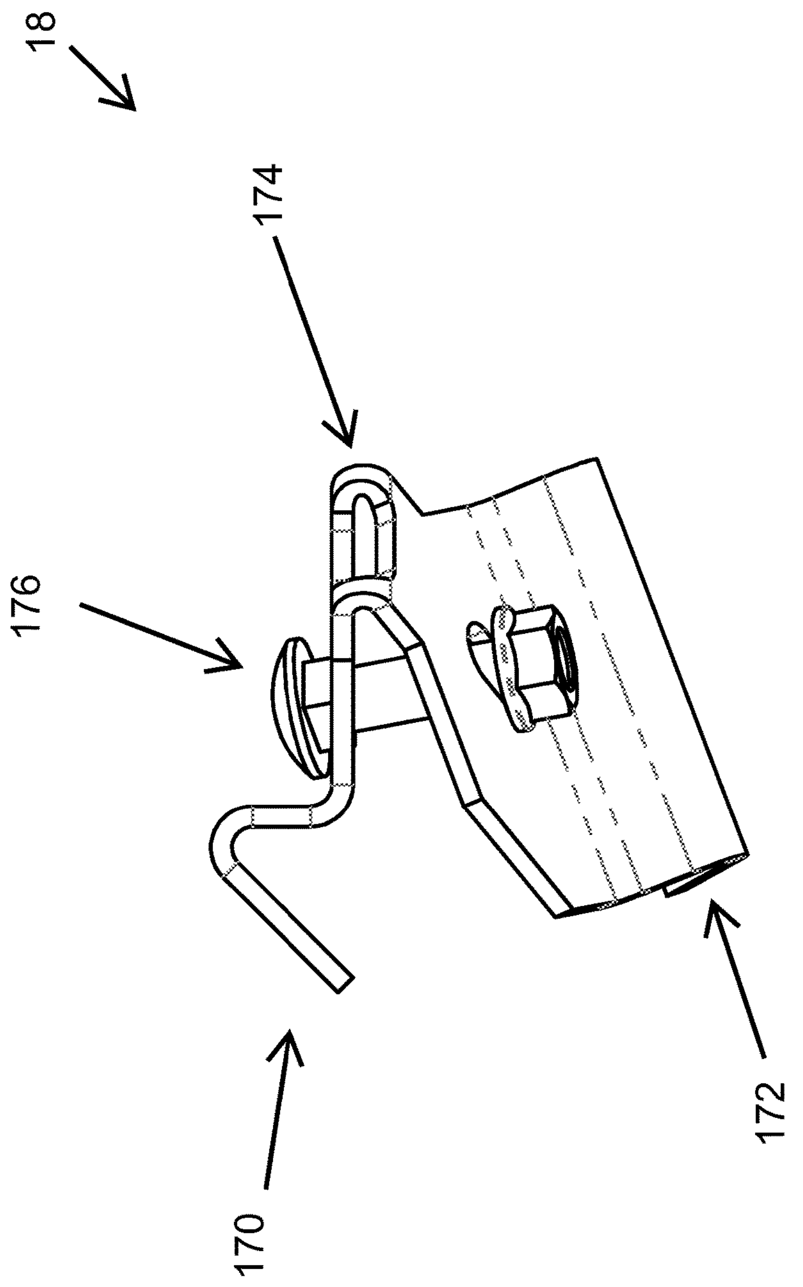
FIG. 24 is an elevation view of the bracket assembly, the view showing the living hinge, the actuator, the first section and the second section, the view showing the bracket assembly in an unclamped position.
Figure 25:
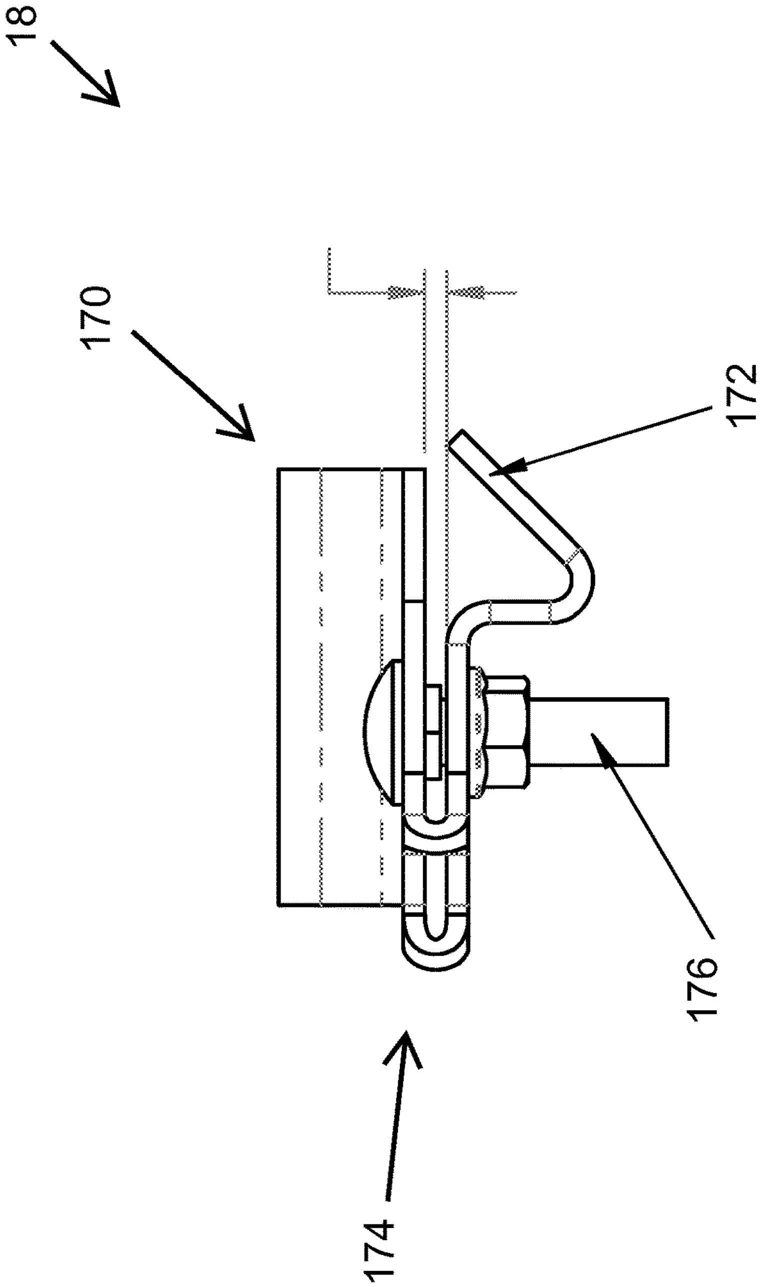
FIG. 25 is an elevation view of the bracket assembly, the view showing the living hinge, the actuator, the first section and the second section, the view showing the bracket assembly in a clamped position.
Figure 26:
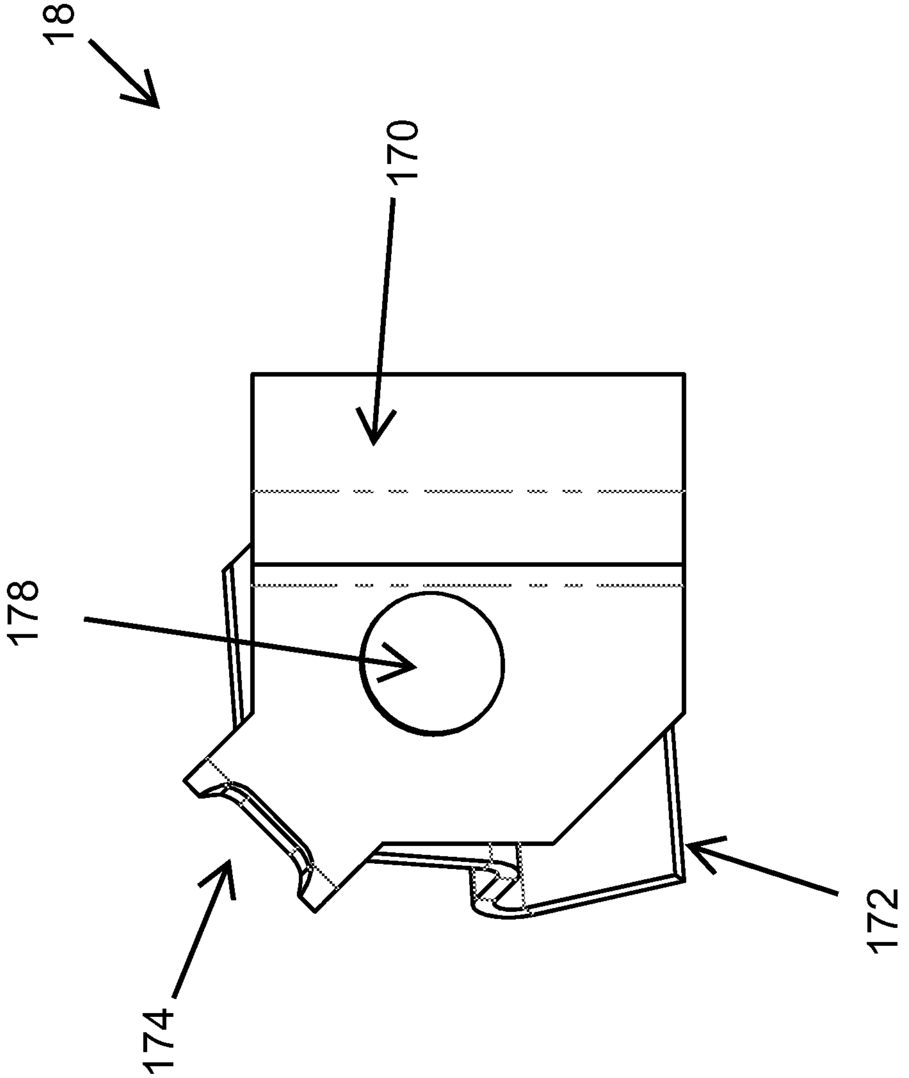
FIG. 26 is another elevation view of the bracket assembly, the view showing the living hinge, the hole, the first section and the second section.
Figure 27:
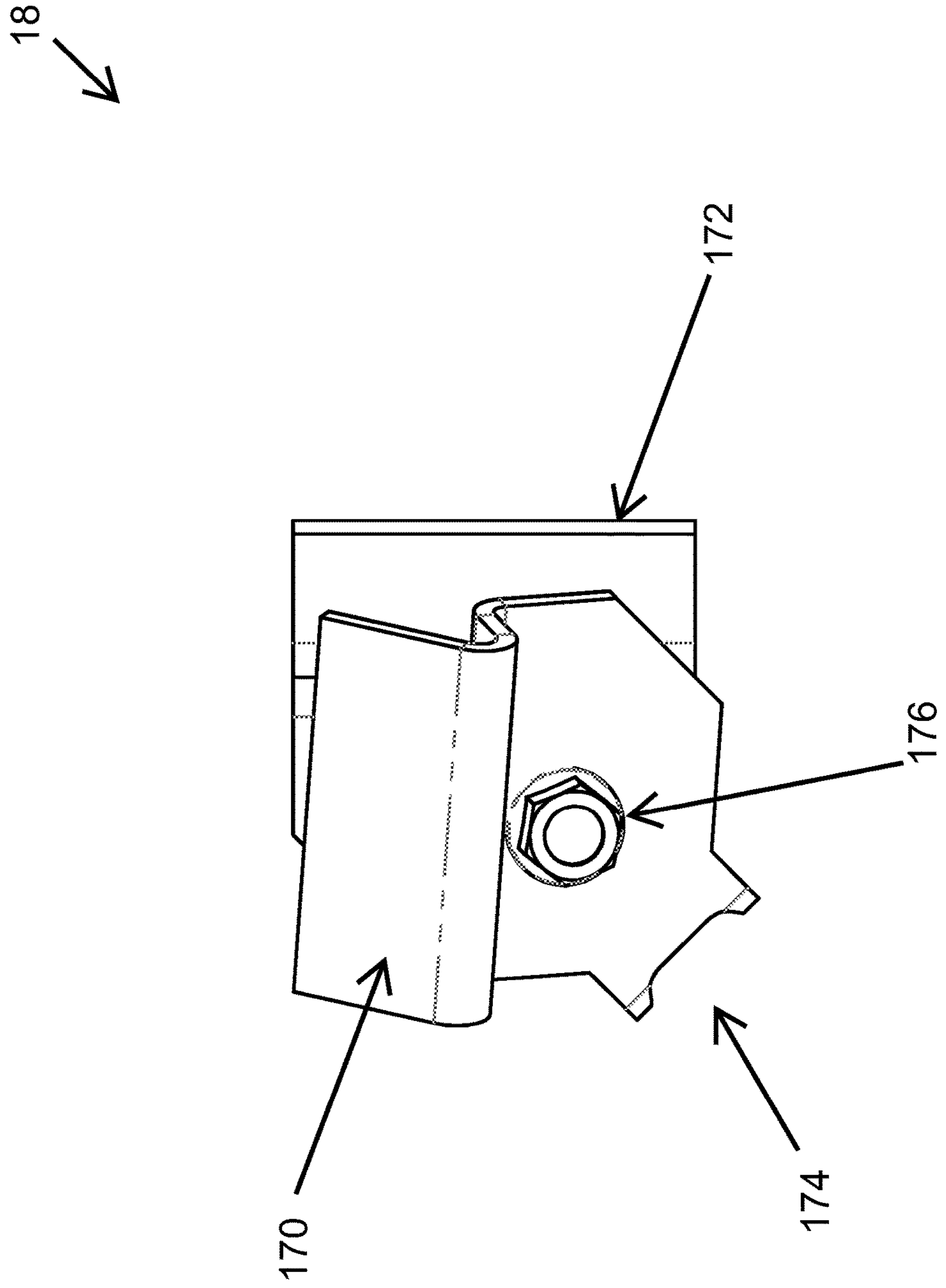
FIG. 27 is a perspective view of the bracket assembly, the view showing the living hinge, the actuator, the first section and the second section.
Figure 28:
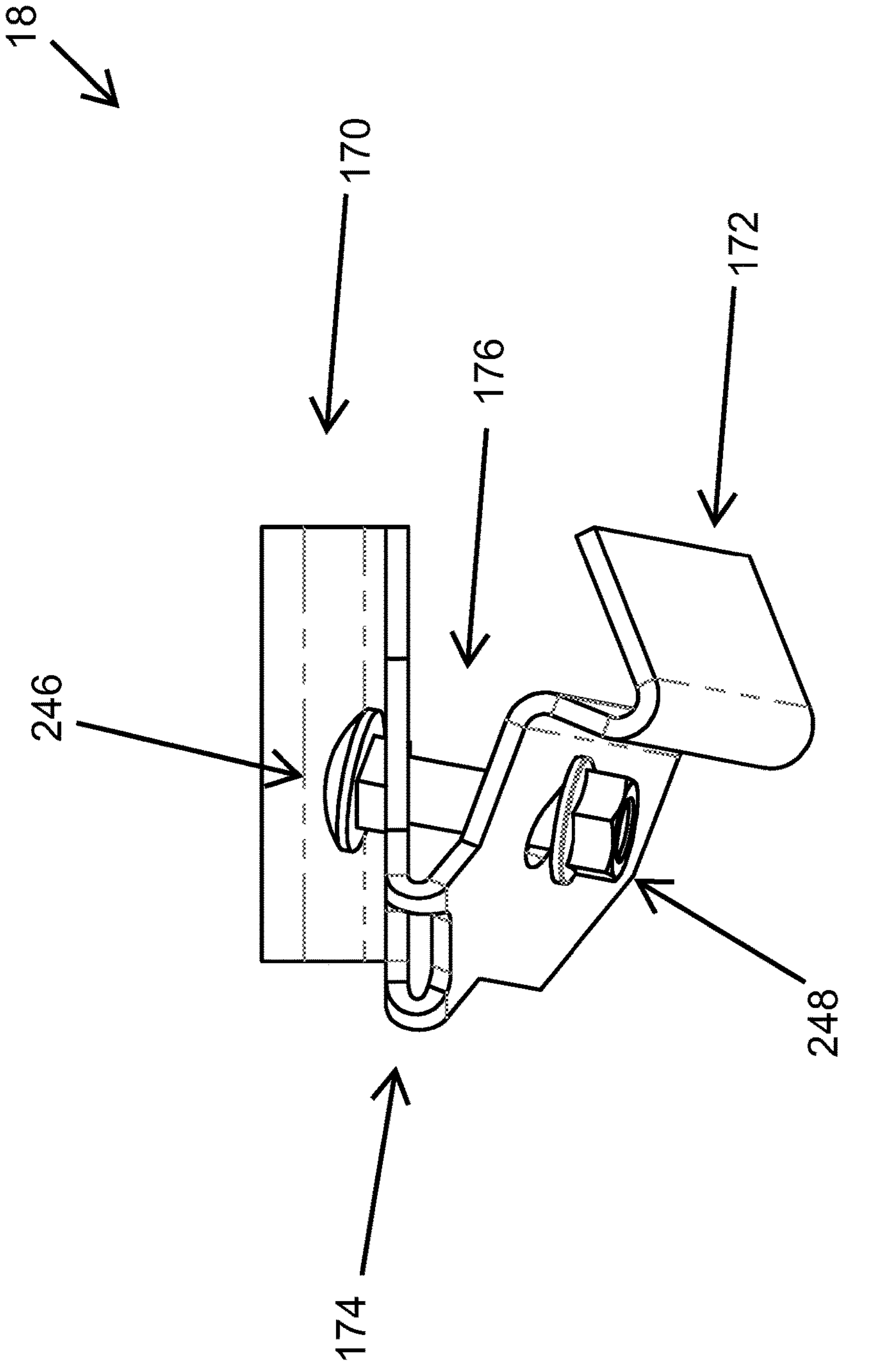
FIG. 28 is a perspective view of the bracket assembly, the view showing the living hinge, the actuator, the first section and the second section; the view showing the carriage bolt, and the nut of the actuator, the view showing the bracket assembly in an unclamped position.
Figure 29:
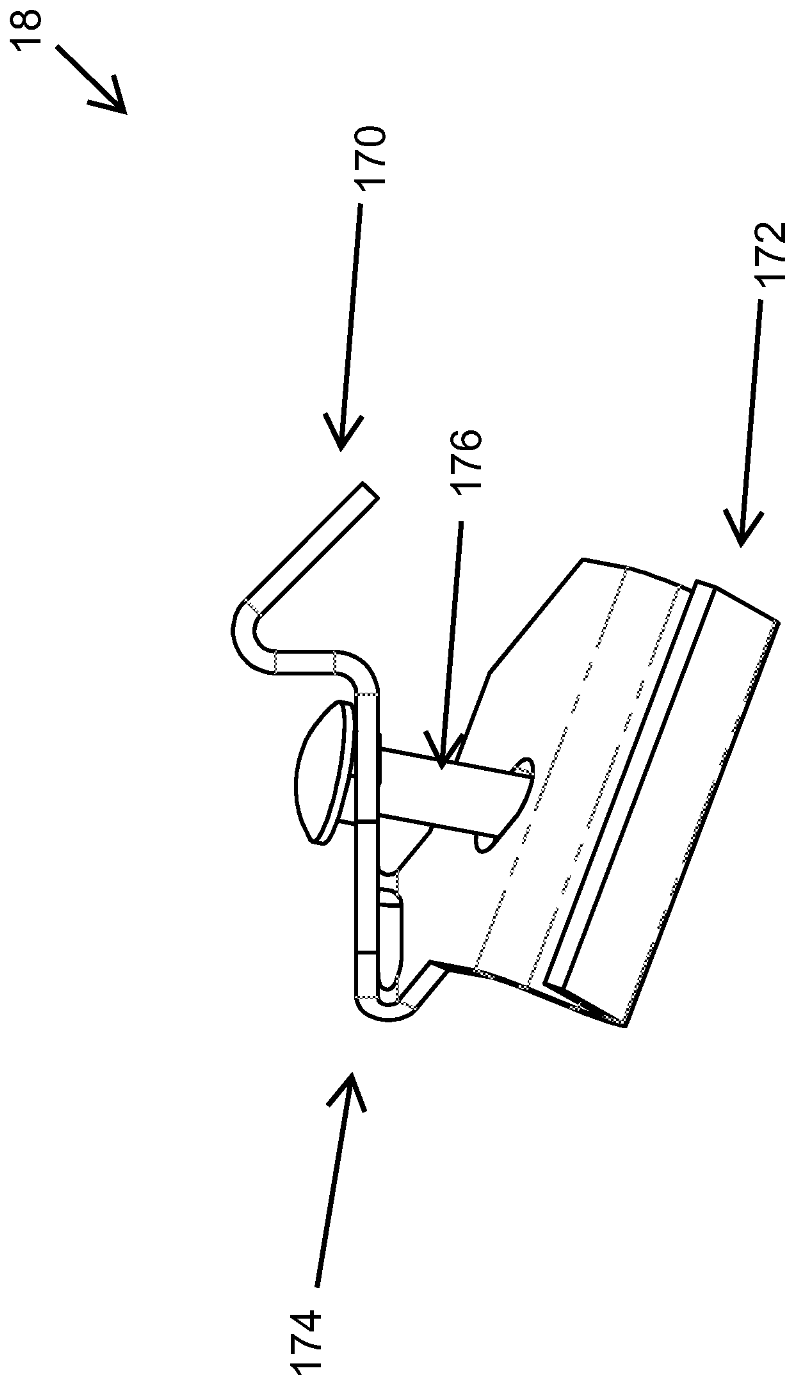
FIG. 29 is an elevation view of the bracket assembly, the view showing the living hinge, the actuator, the first section and the second section.
Figure 30:
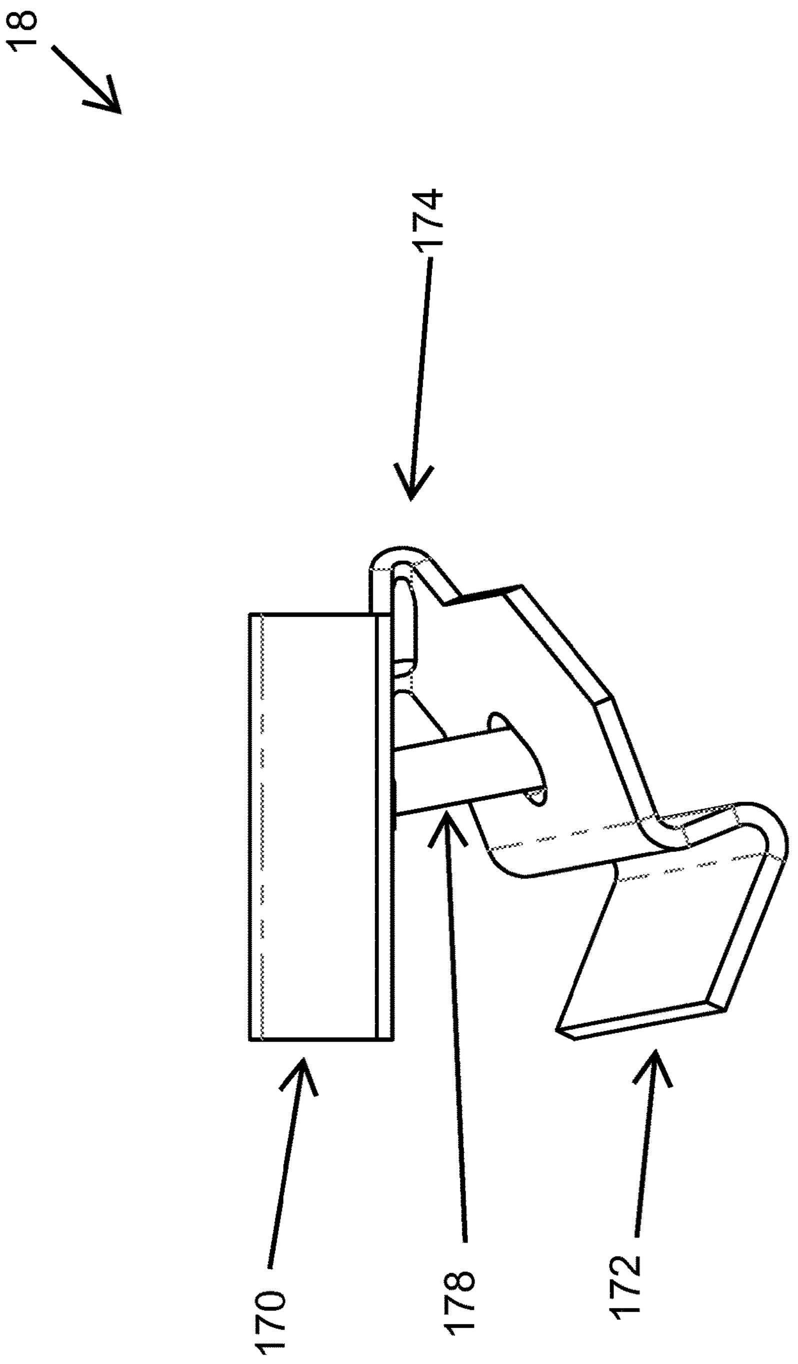
FIG. 30 is an elevation view of the bracket assembly, the view showing the living hinge, the actuator, the first section and the second section.
Figure 31:
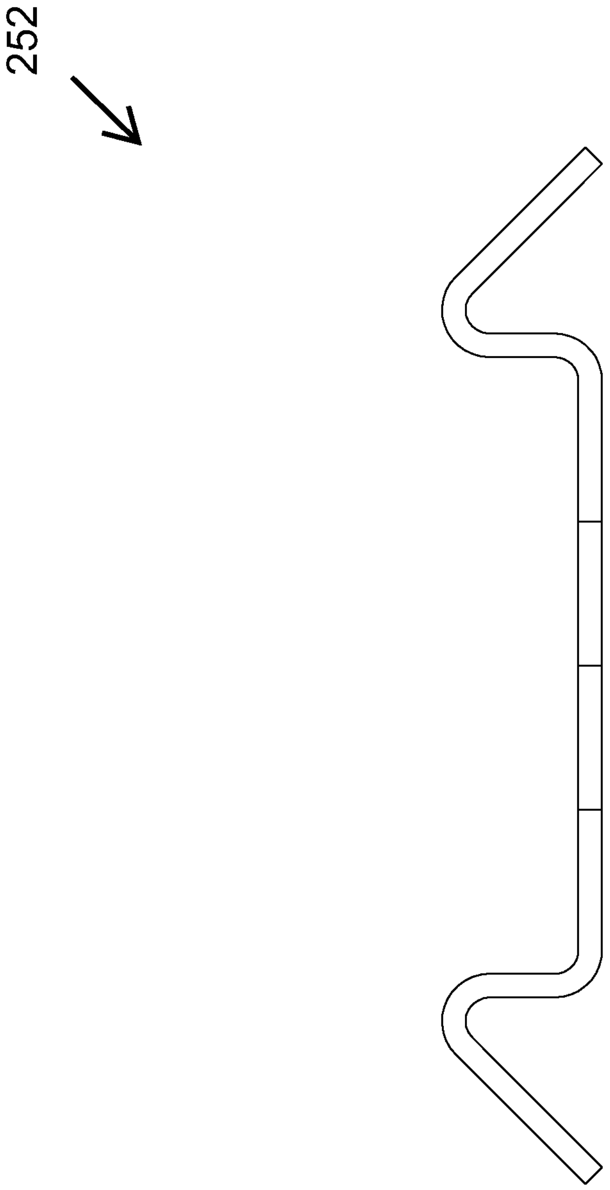
FIG. 31 is an elevation view of the primary component of the bracket assembly.
Figure 32:
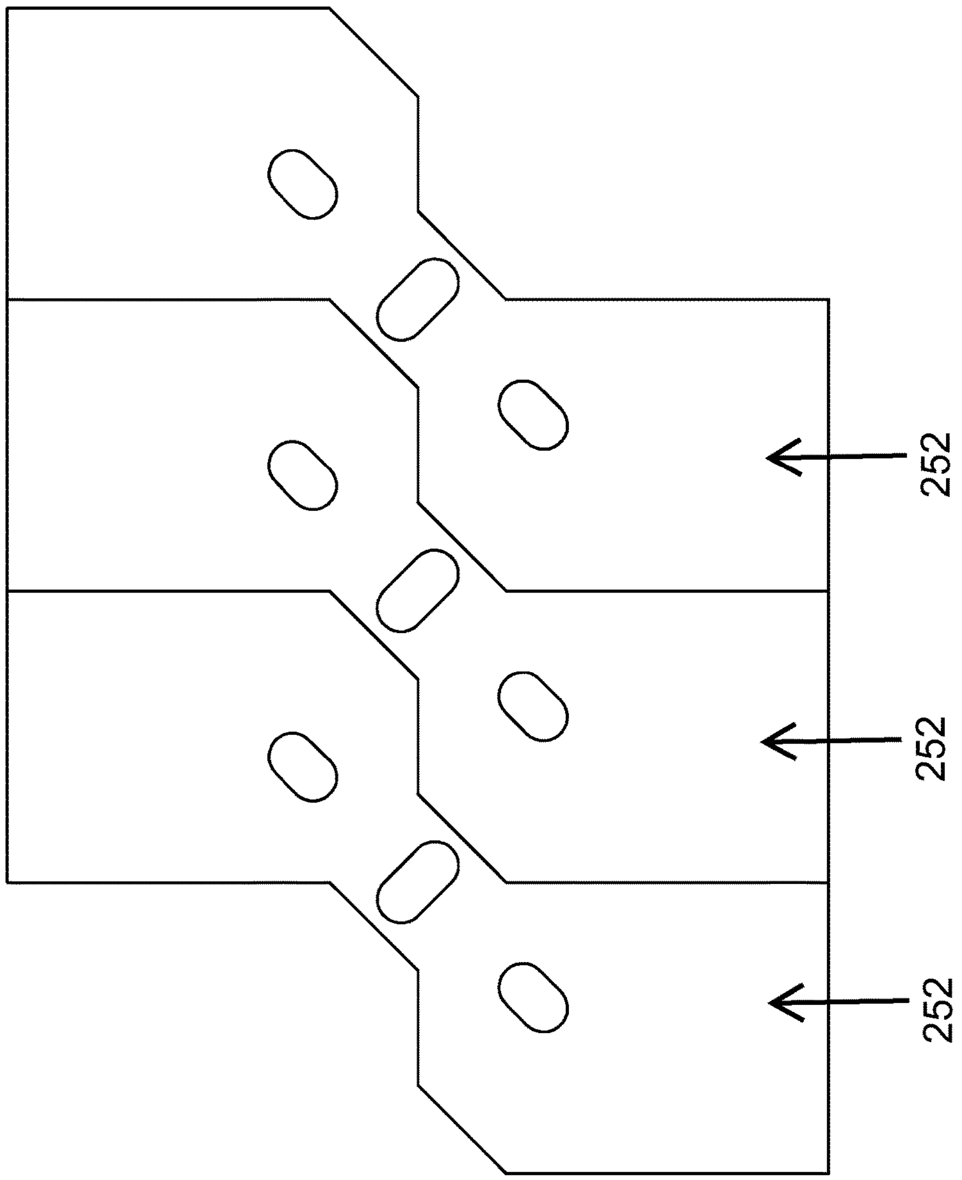
FIG. 32 is another elevation view of the primary component of the bracket assembly.
Figure 33:
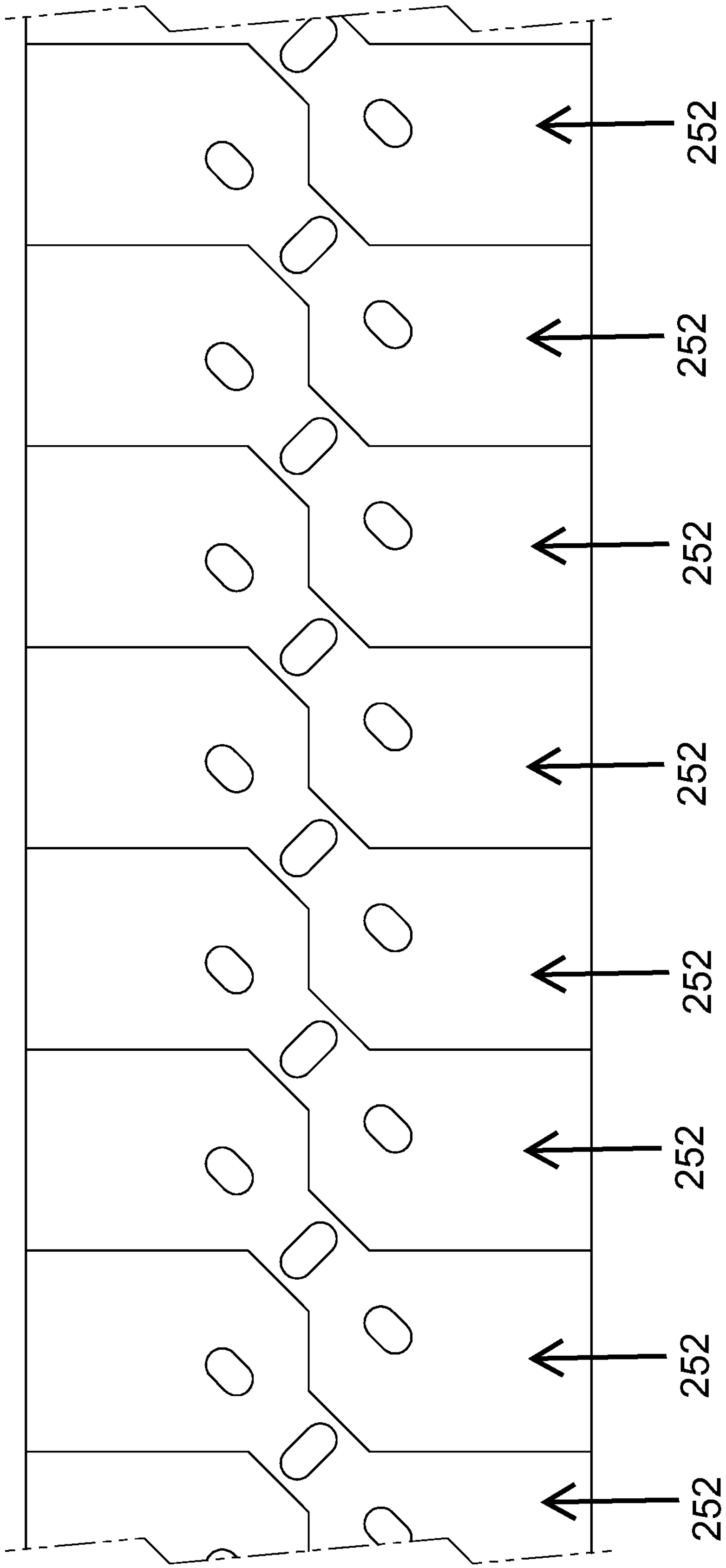
FIG. 33 is another elevation view of the primary component of the bracket assembly.
Figure 34:
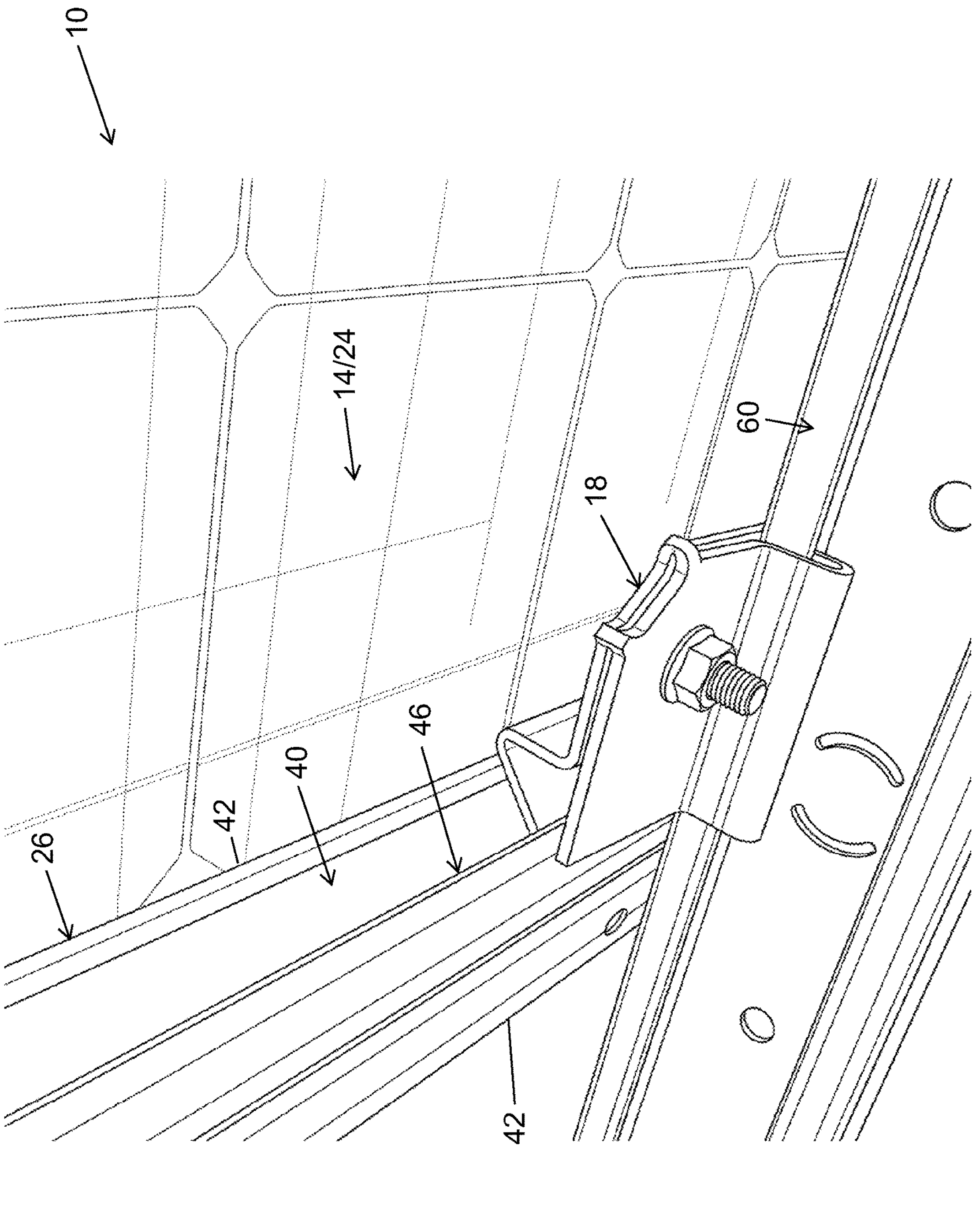
FIG. 34 is a perspective view of the photovoltaic system, the view showing the photovoltaic panel, the crossbar, the bracket assembly, and the sidewall, forward edge, and flange of the joints.
Figure 35:
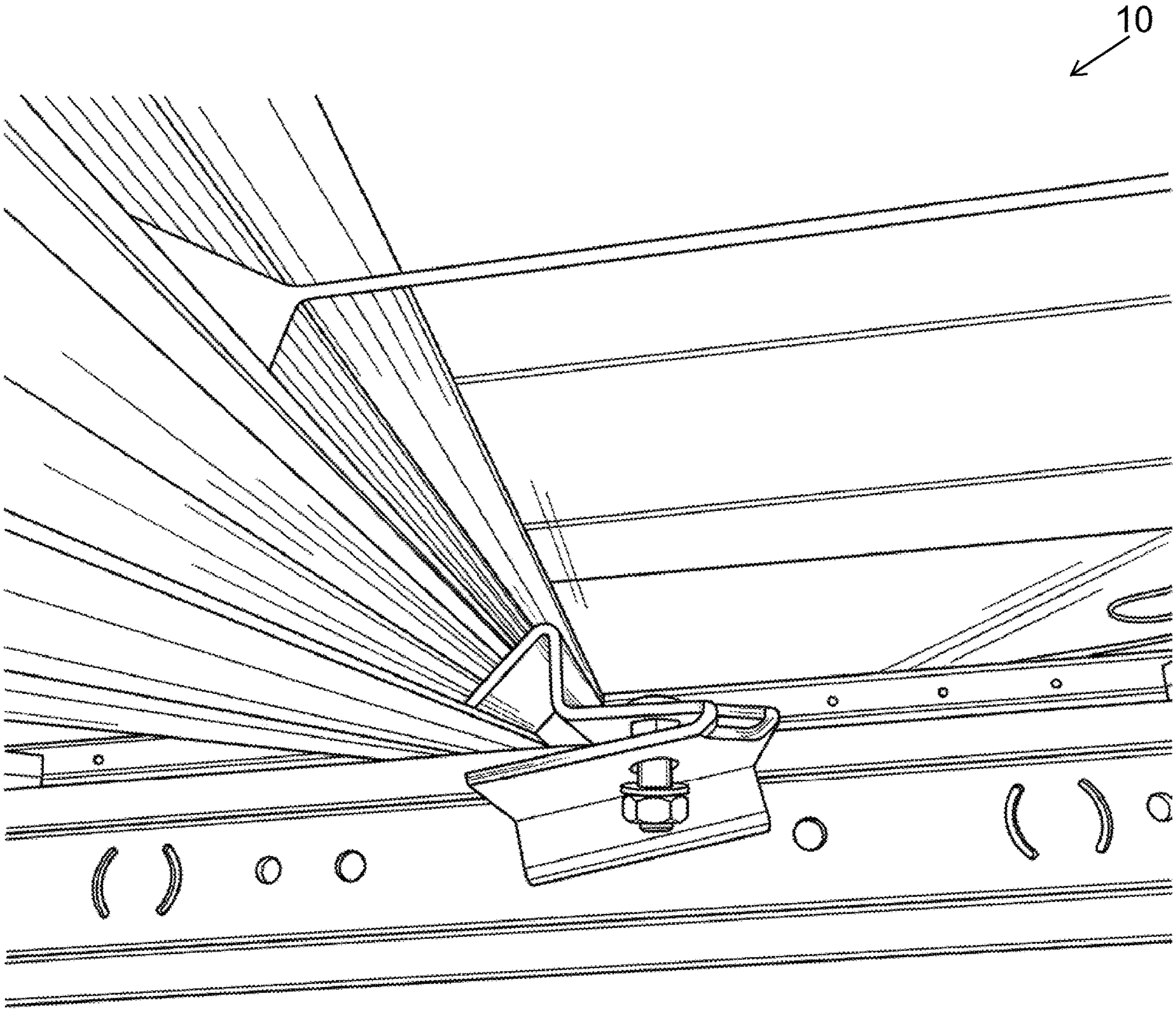
FIG. 35 is another perspective view of the photovoltaic system, the view showing the photovoltaic panel, the crossbar, and the bracket assembly in an unclamped position.
Figure 36:
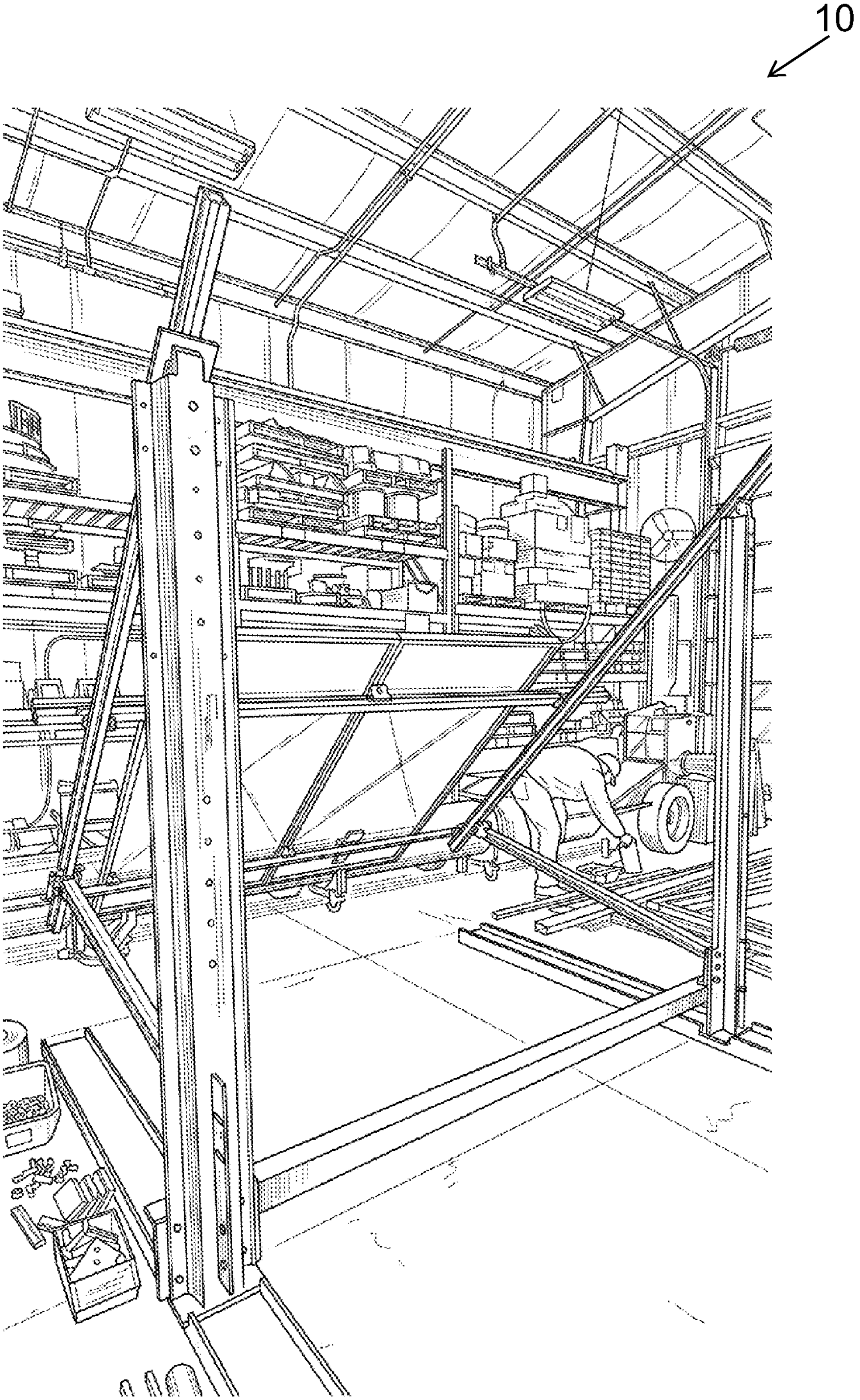
FIG. 36 is another perspective view of the photovoltaic system, the view showing the photovoltaic panels, the crossbar, and the support structure.
Figure 37:
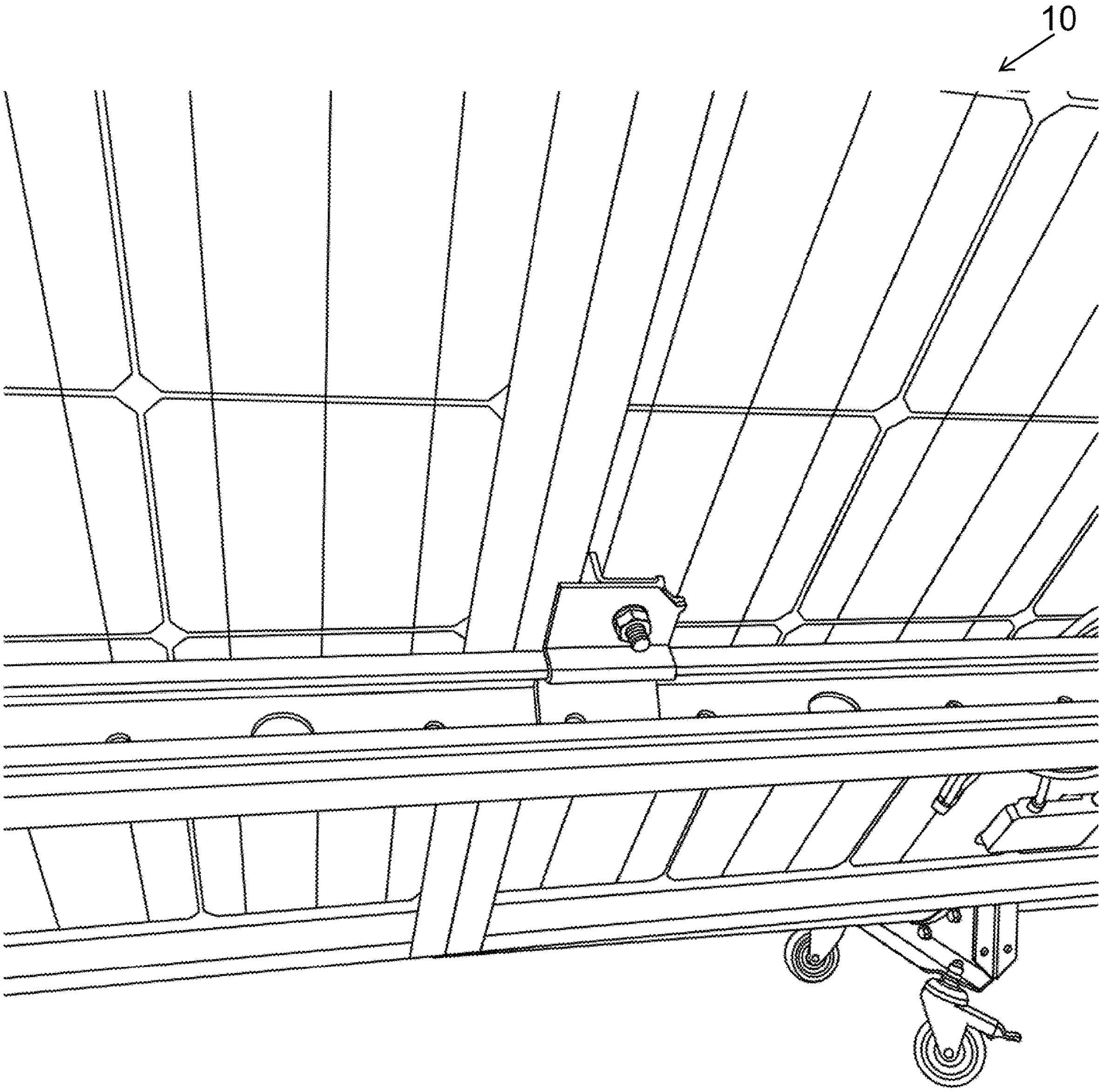
FIG. 37 is another perspective view of the photovoltaic system, the view showing the photovoltaic panel, the crossbar, and the bracket assembly.
Figure 38:
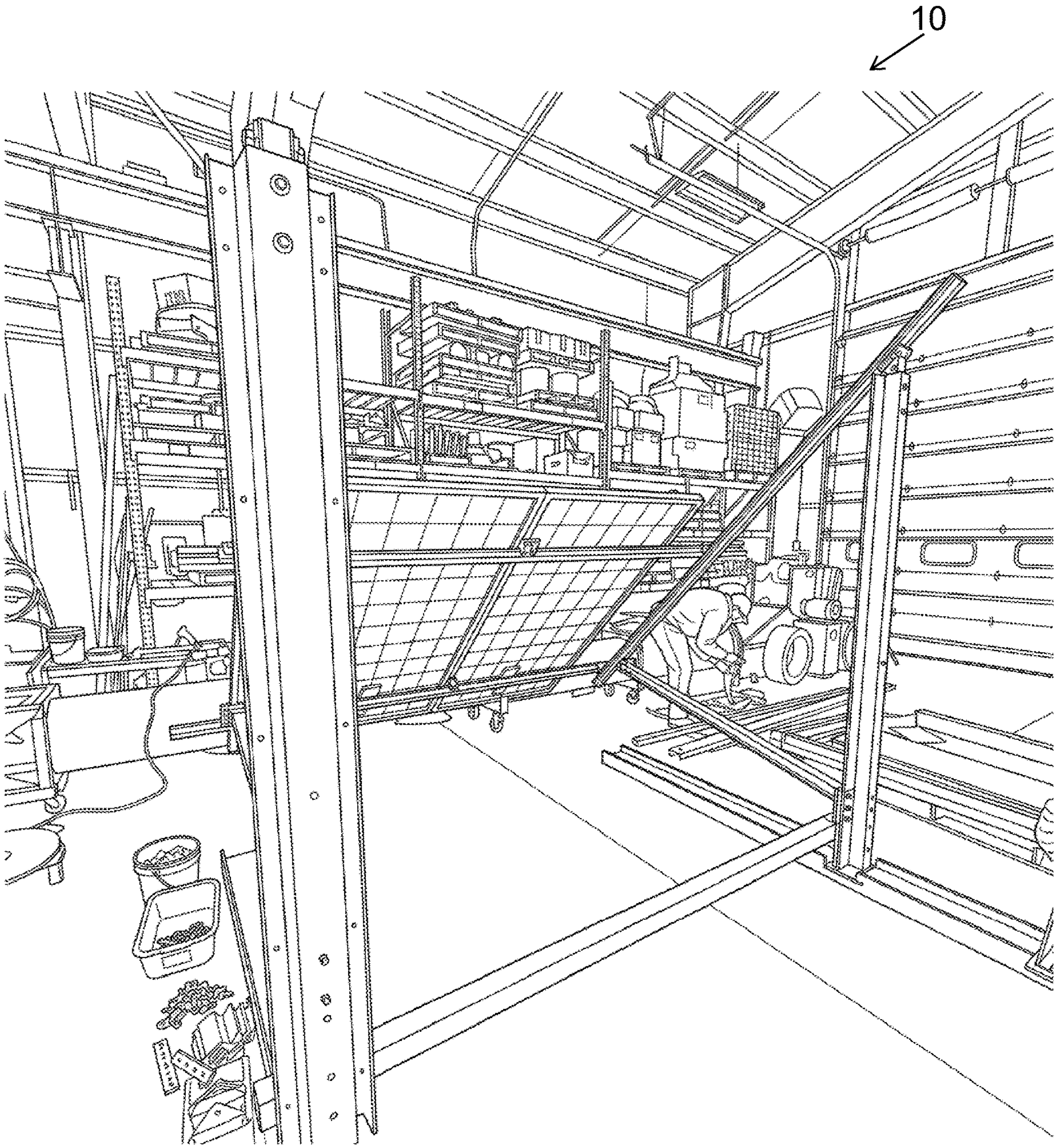
FIG. 38 is another perspective view of the photovoltaic system, the view showing the photovoltaic panels, the crossbar, and the support structure.
Figure 39:
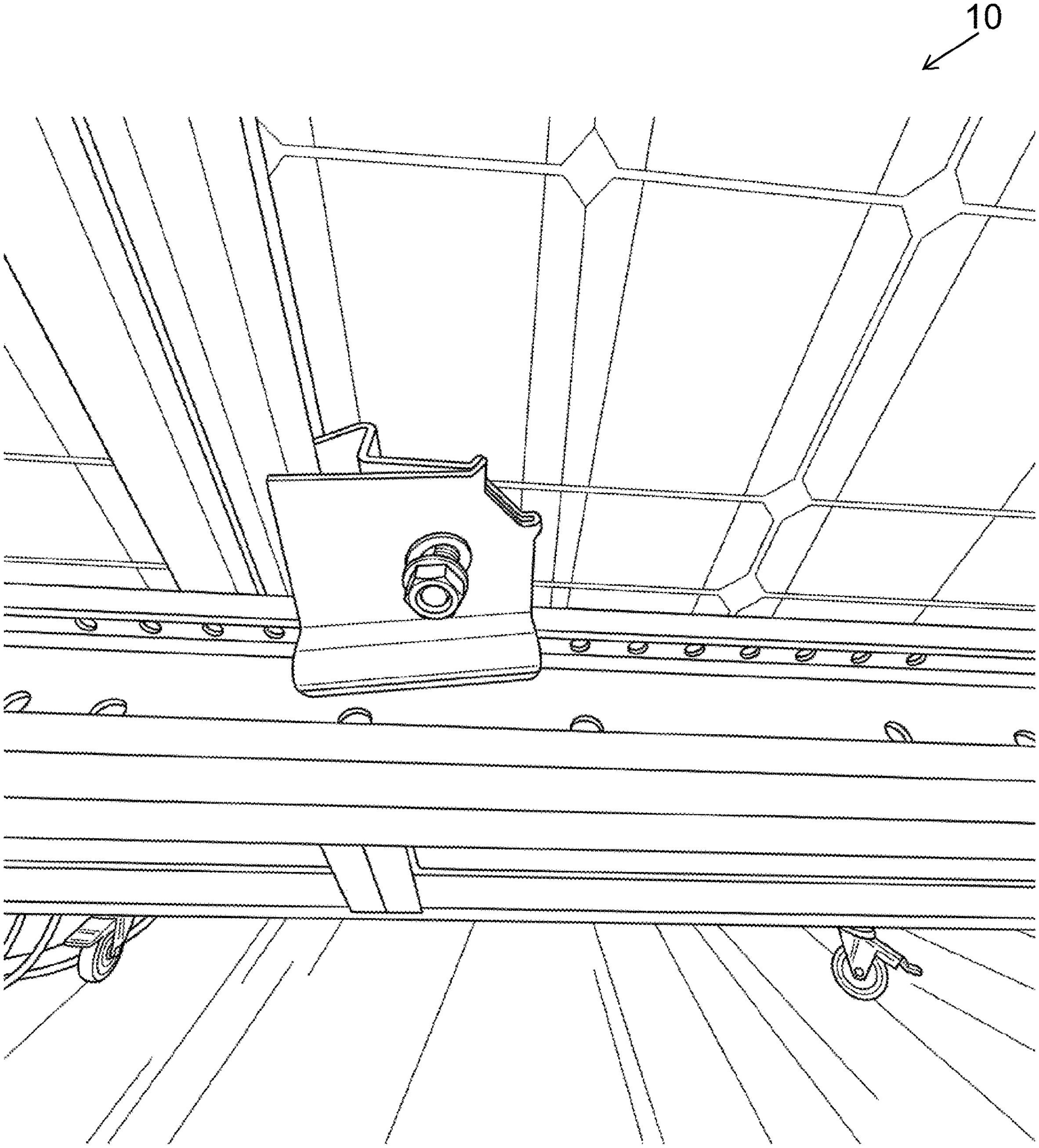
FIG. 39 is another perspective view of the photovoltaic system, the view showing the photovoltaic panel, the crossbar, and the bracket assembly in an unclamped position.
Figure 40:
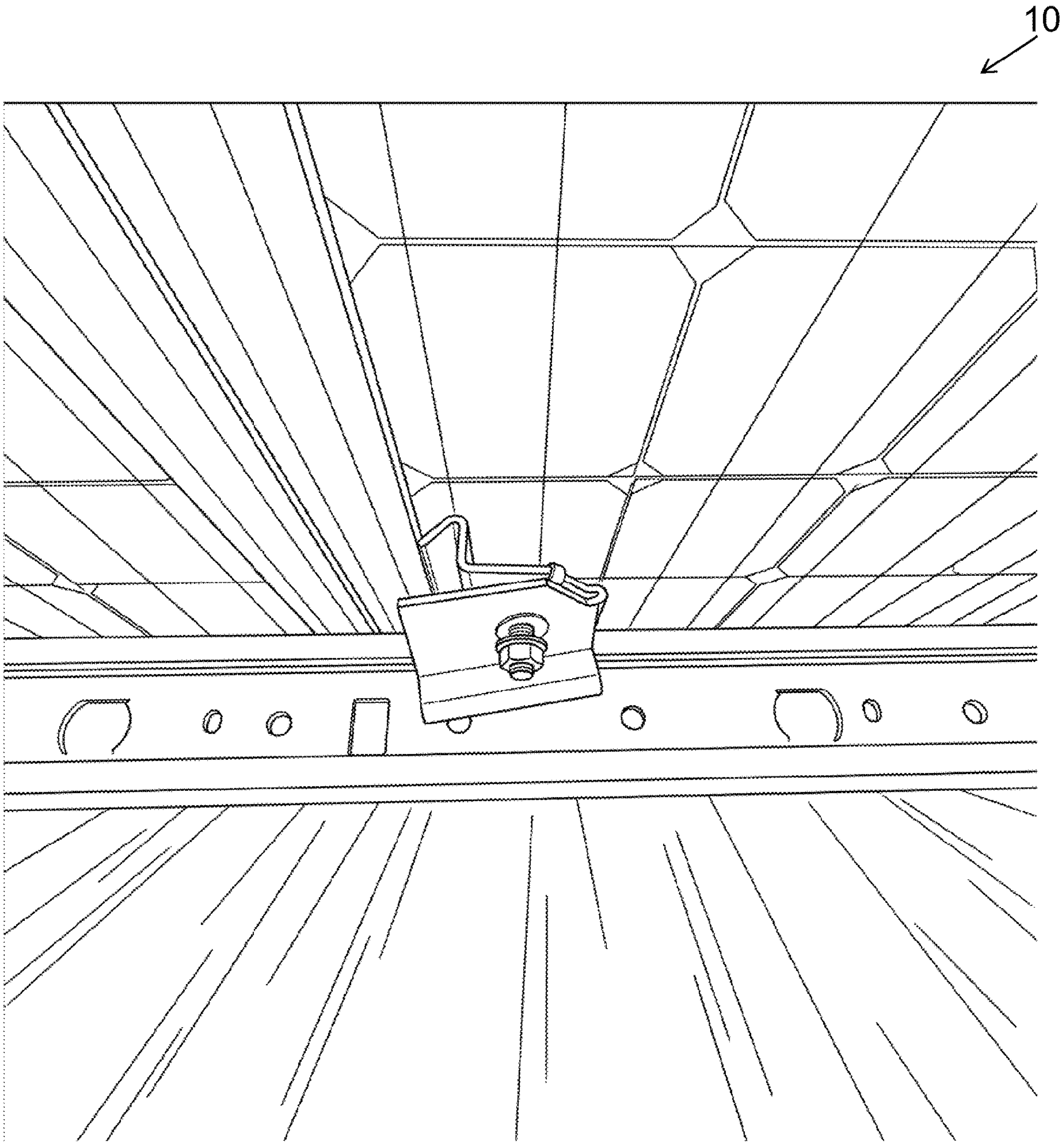
FIG. 40 is another perspective view of the photovoltaic system, the view showing the photovoltaic panel, the crossbar, and the bracket assembly in an unclamped position.
Figure 41:
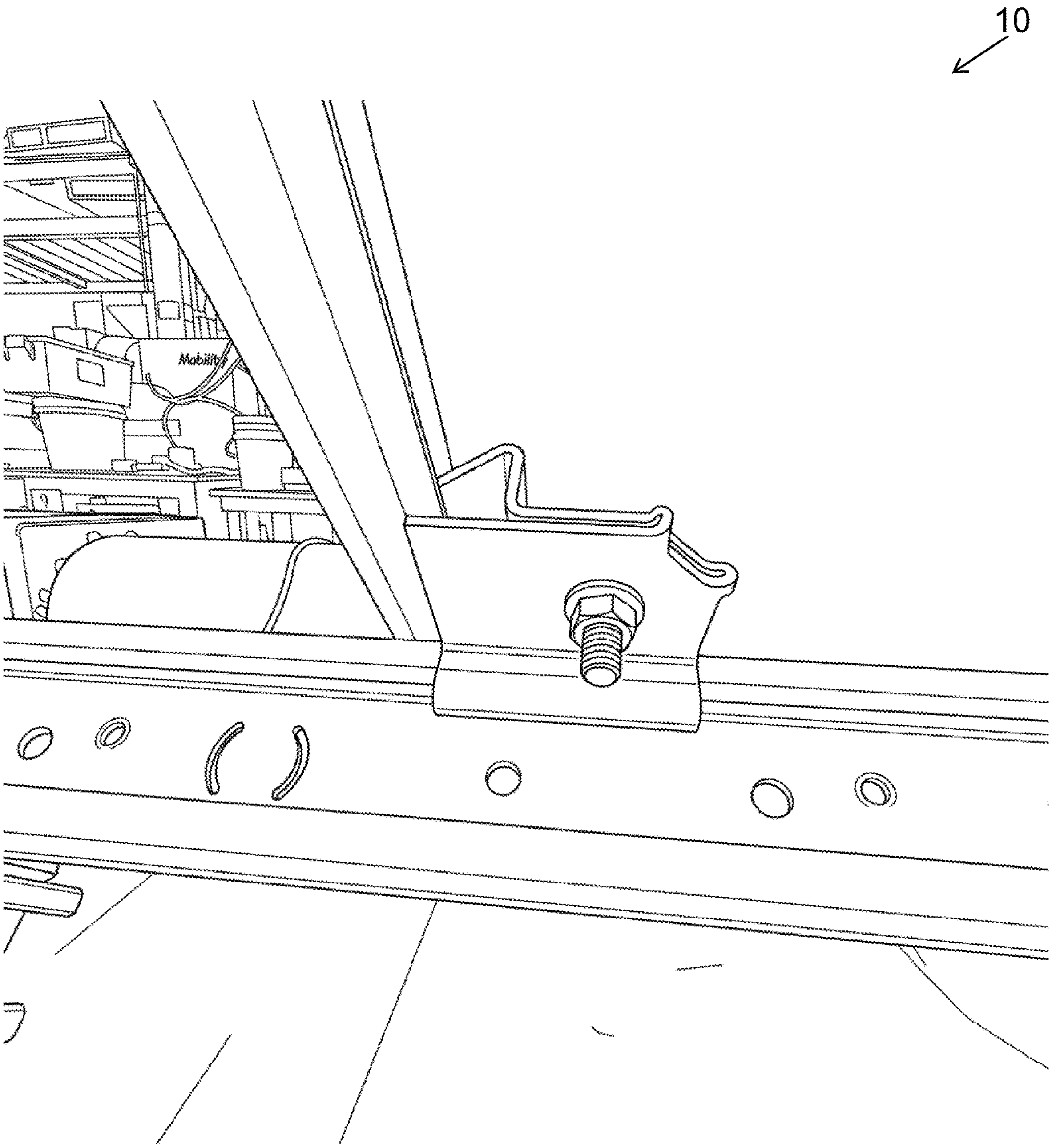
FIG. 41 is another perspective view of the photovoltaic system, the view showing the photovoltaic panel, the crossbar, and the bracket assembly in a clamped position.
Figure 42:
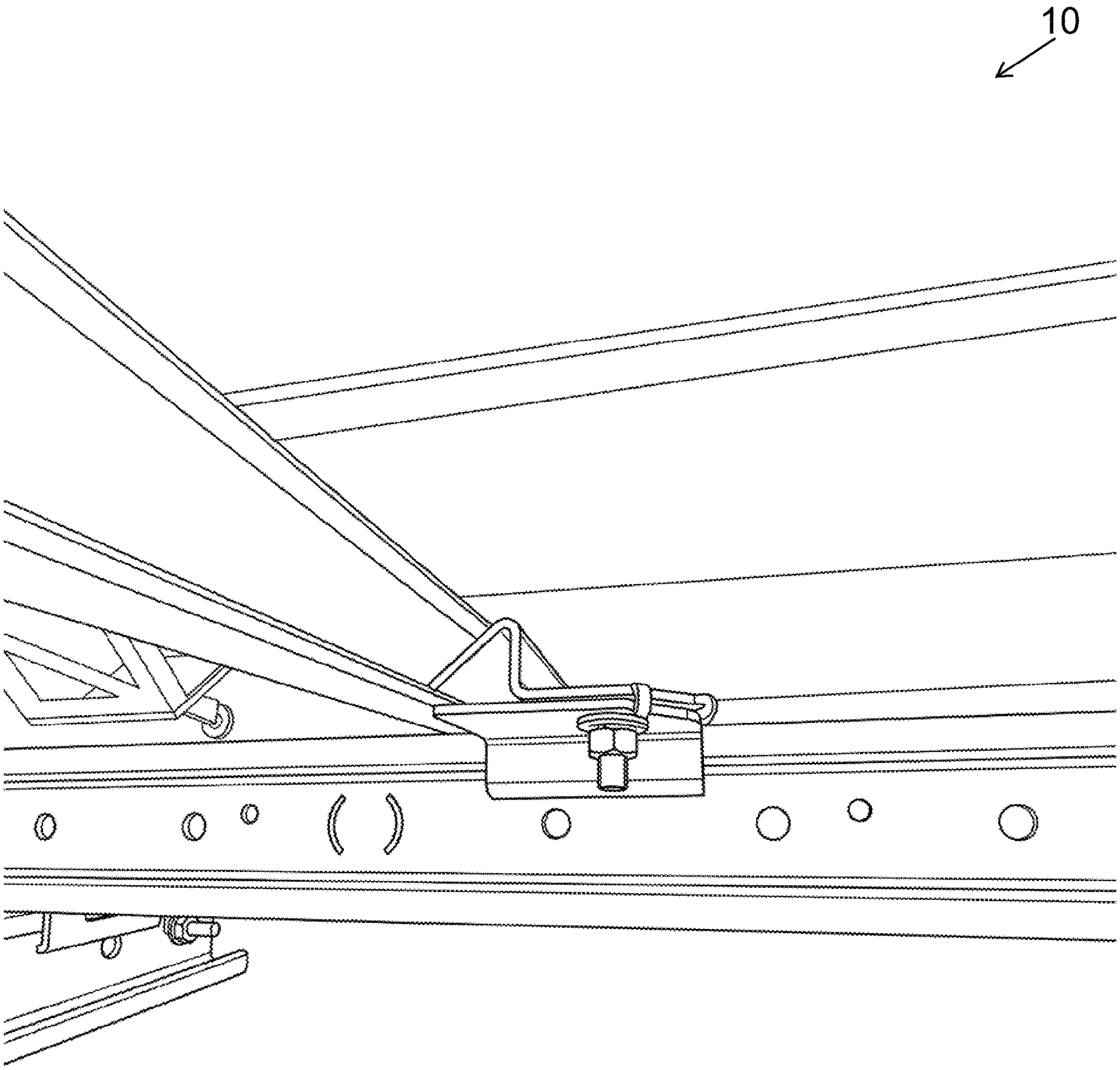
FIG. 42 is another perspective view of the photovoltaic system, the view showing the photovoltaic panel, the crossbar, and the bracket assembly in a clamped position.
Figure 43:
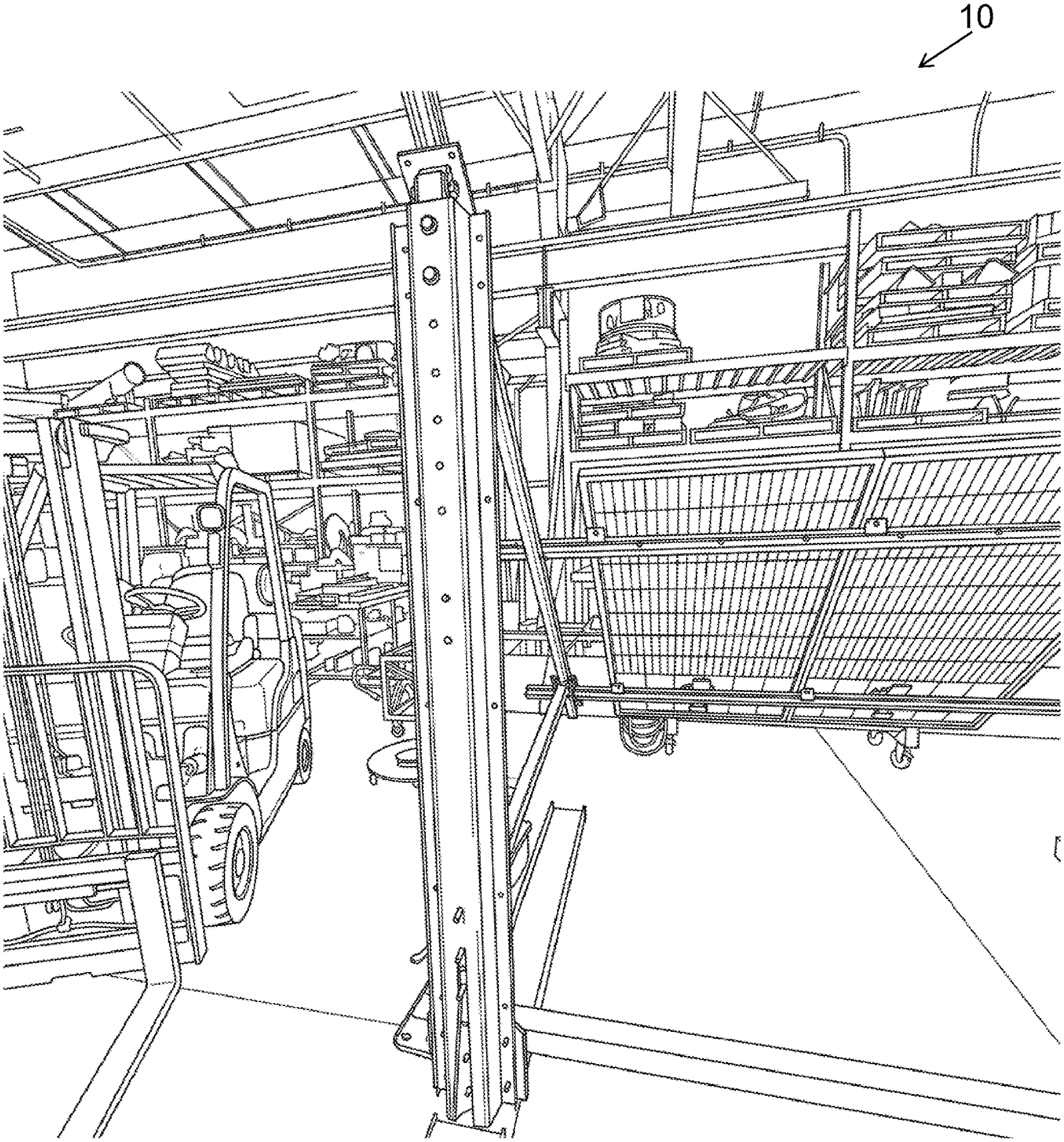
FIG. 43 is another perspective view of the photovoltaic system, the view showing the photovoltaic panels, the crossbar, and the support structure.
Figure 44:
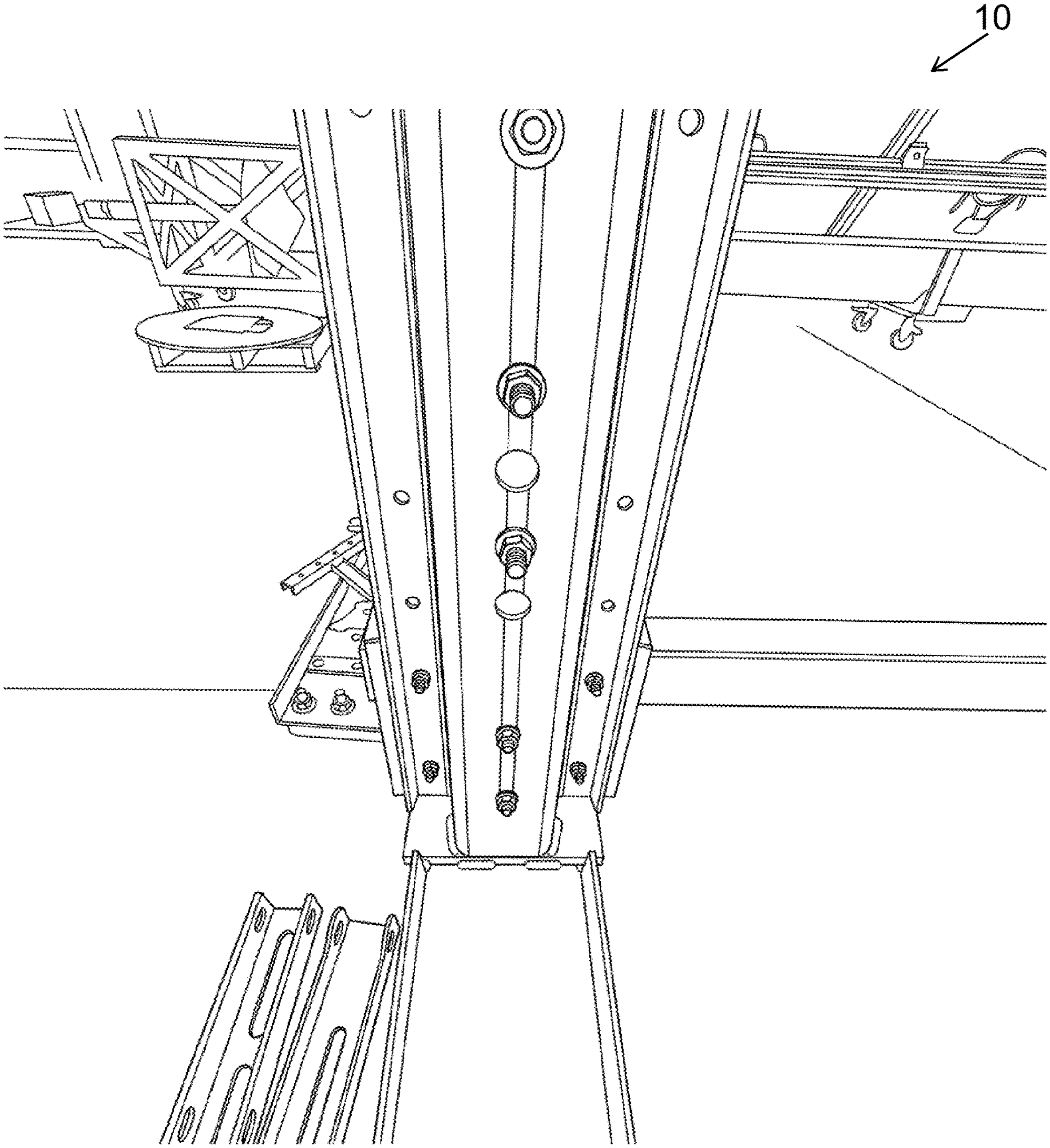
FIG. 44 is another perspective view of the photovoltaic system, the view showing the photovoltaic panels, the crossbar, and the support structure.
Figure 45:
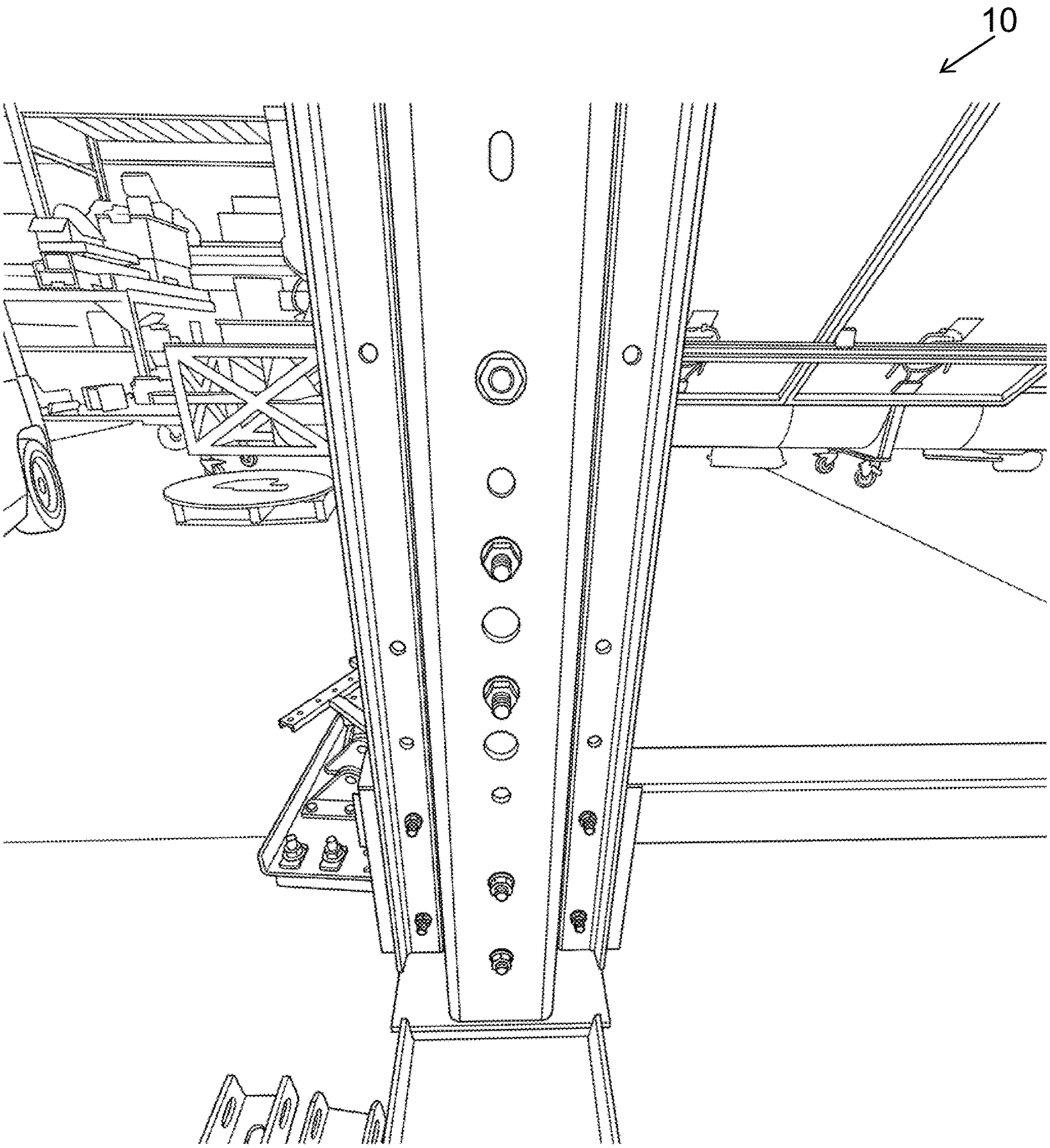
FIG. 45 is another perspective view of the photovoltaic system, the view showing the photovoltaic panels, the crossbar, and the support structure.
Figure 46:
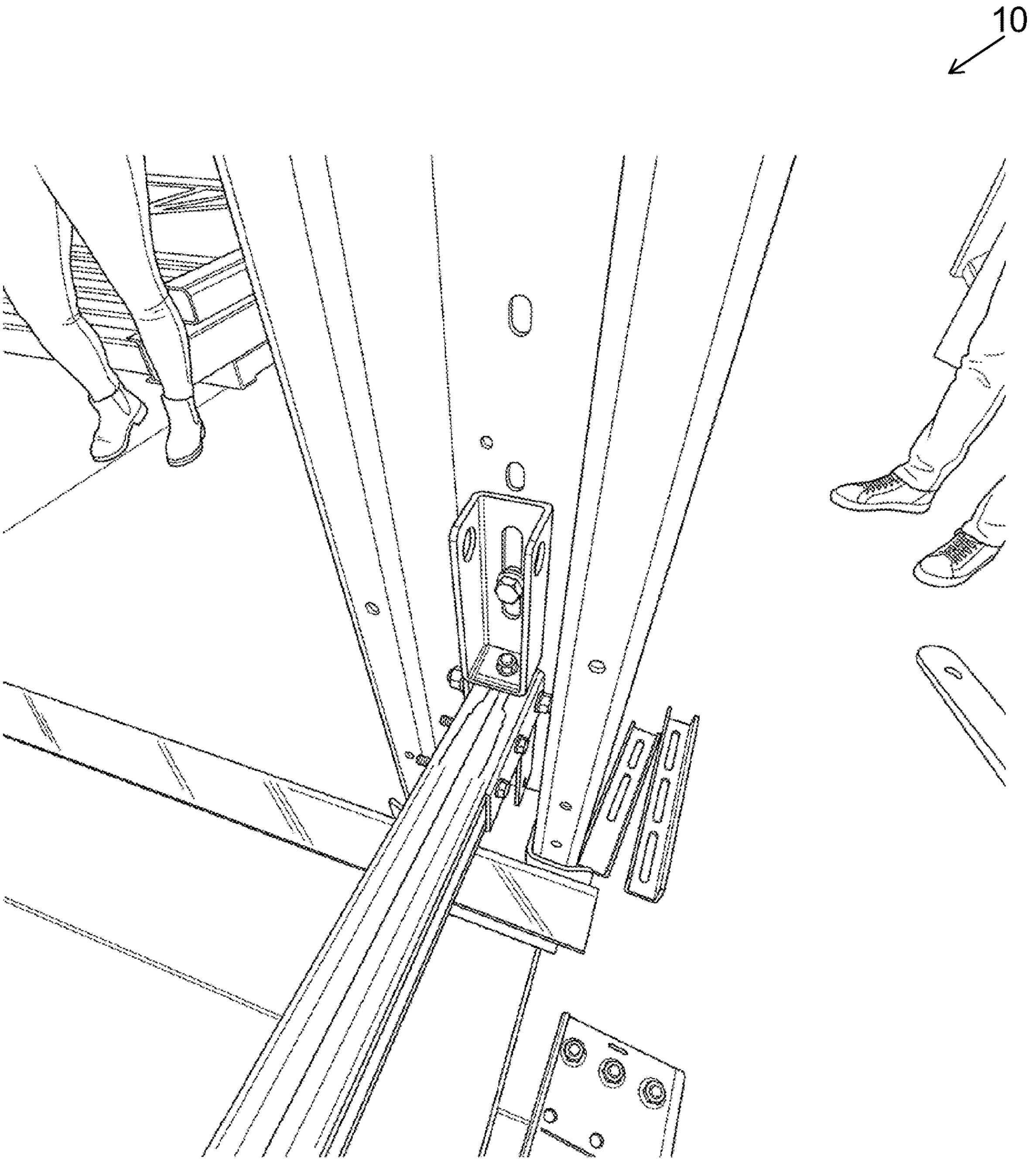
FIG. 46 is another perspective view of the photovoltaic system, the view showing the connection assemblies and the post.
Figure 47:
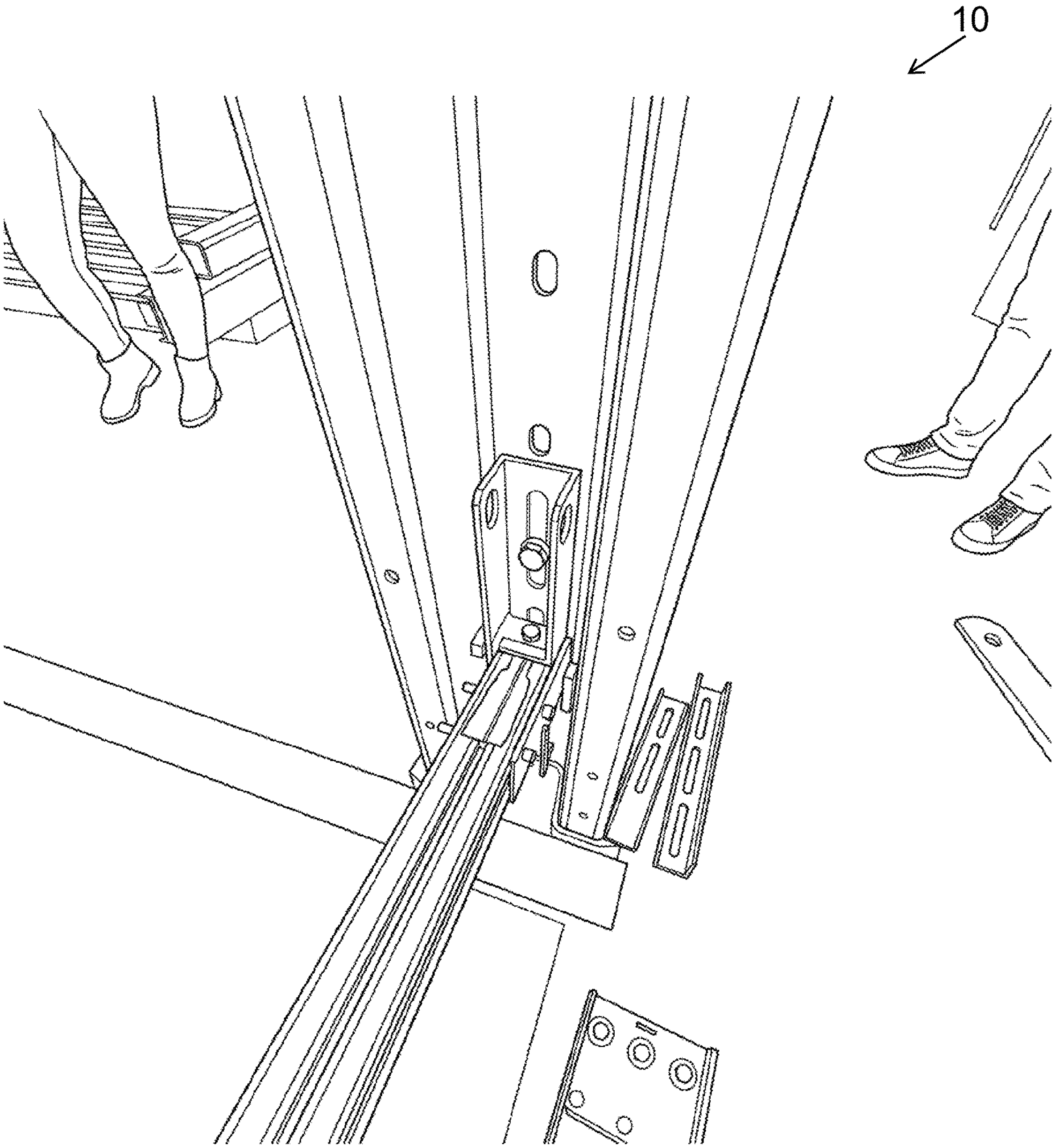
FIG. 47 is another perspective view of the photovoltaic system, the view showing the connection assemblies and the post.
Figure 48:
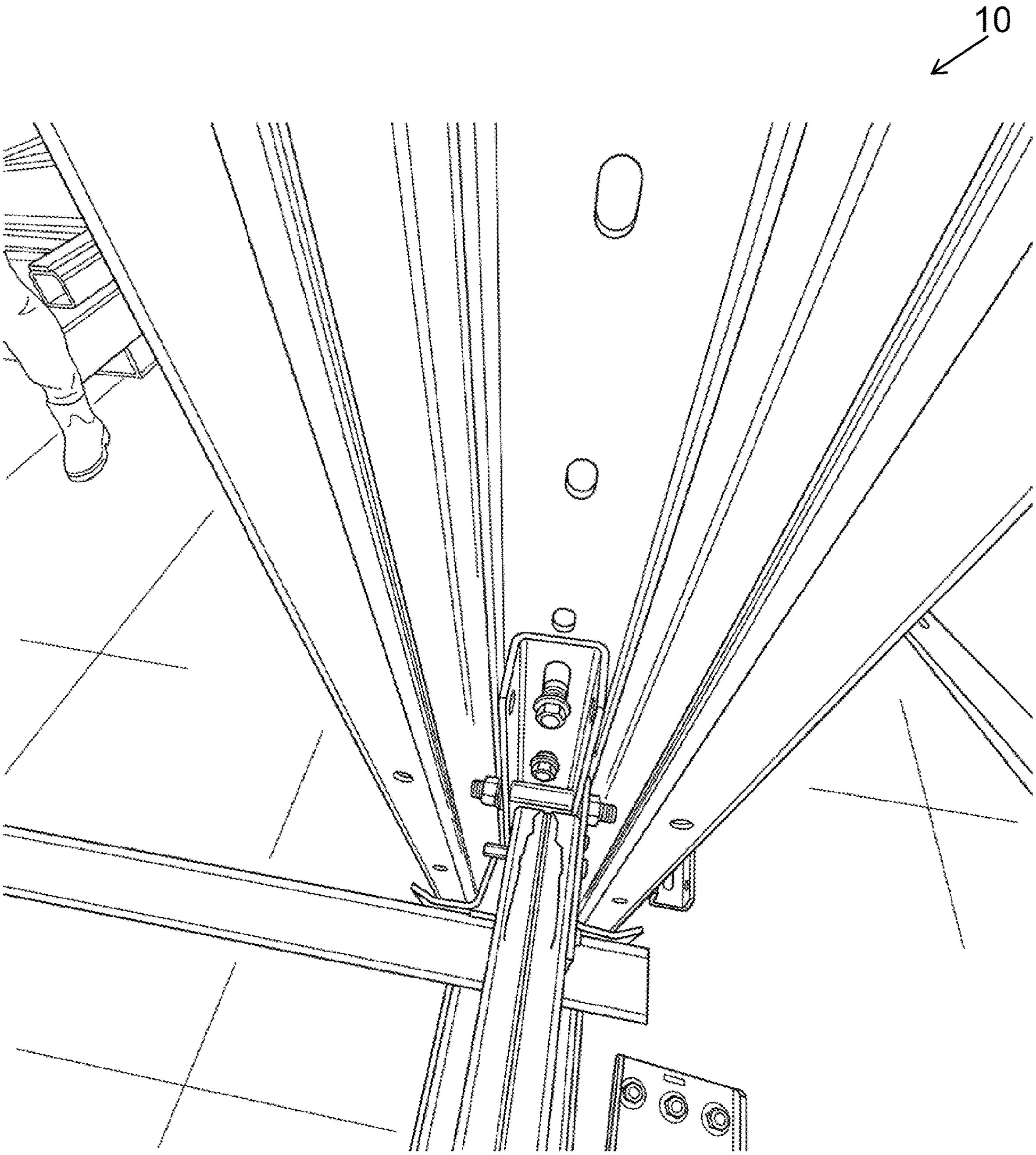
FIG. 48 is another perspective view of the photovoltaic system, the view showing the connection assemblies and the post.
Figure 49:
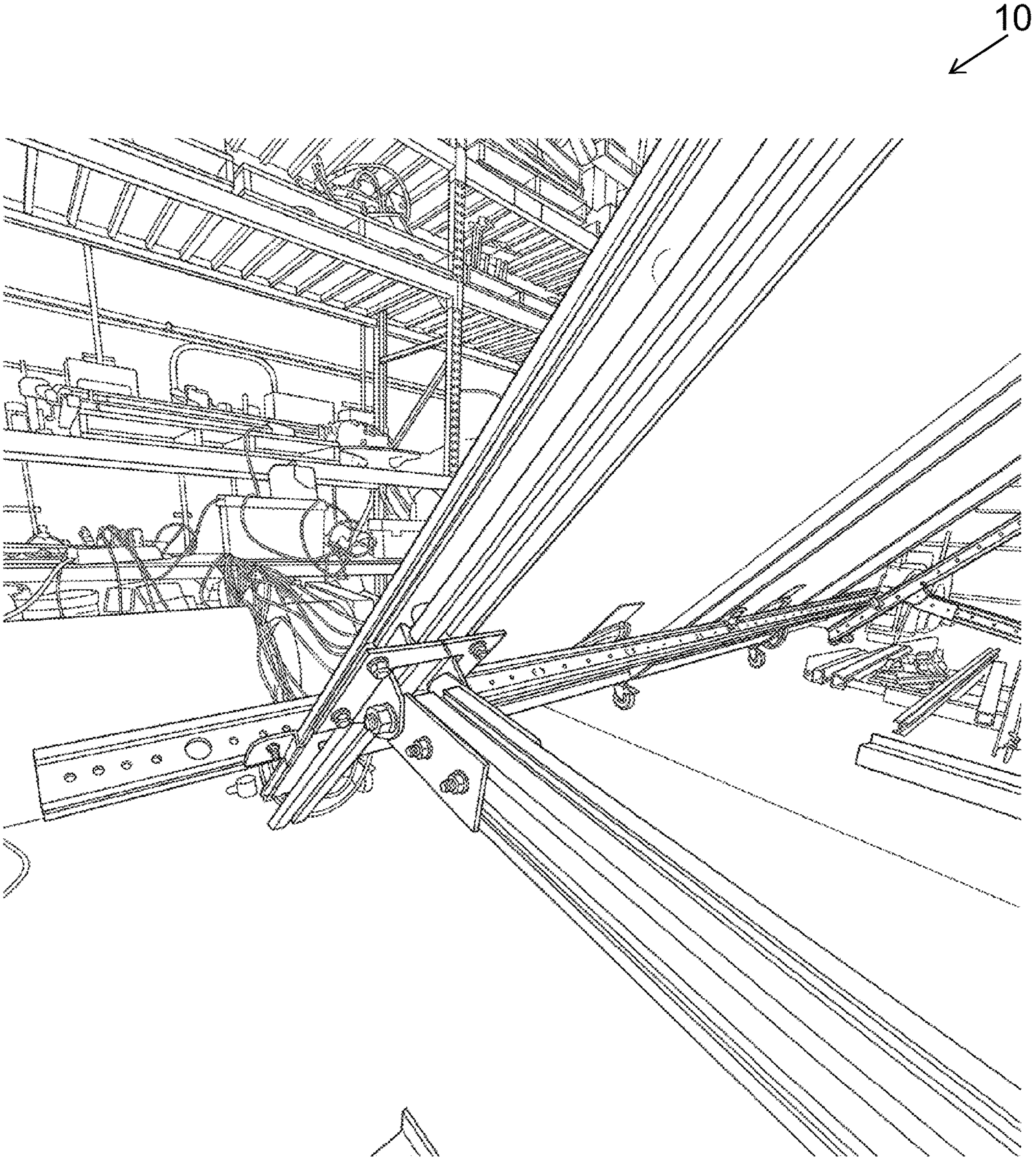
FIG. 49 is another perspective view of the photovoltaic system, the view showing the photovoltaic panels, the crossbar, and the support structure.
Figure 50:
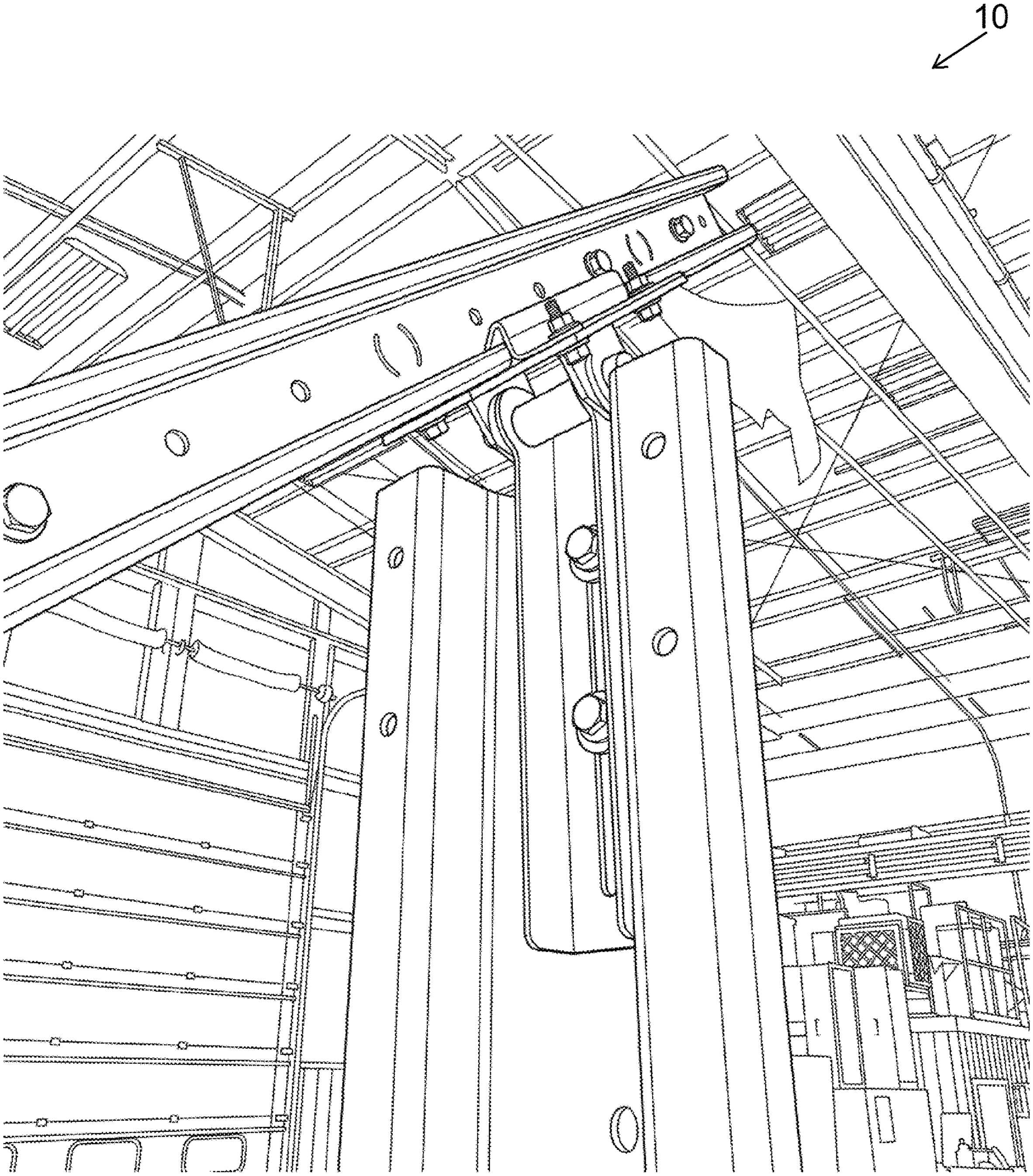
FIG. 50 is another perspective view of the photovoltaic system, the view showing the cantilever assemblies, the connection assemblies and the post.
Figure 51:
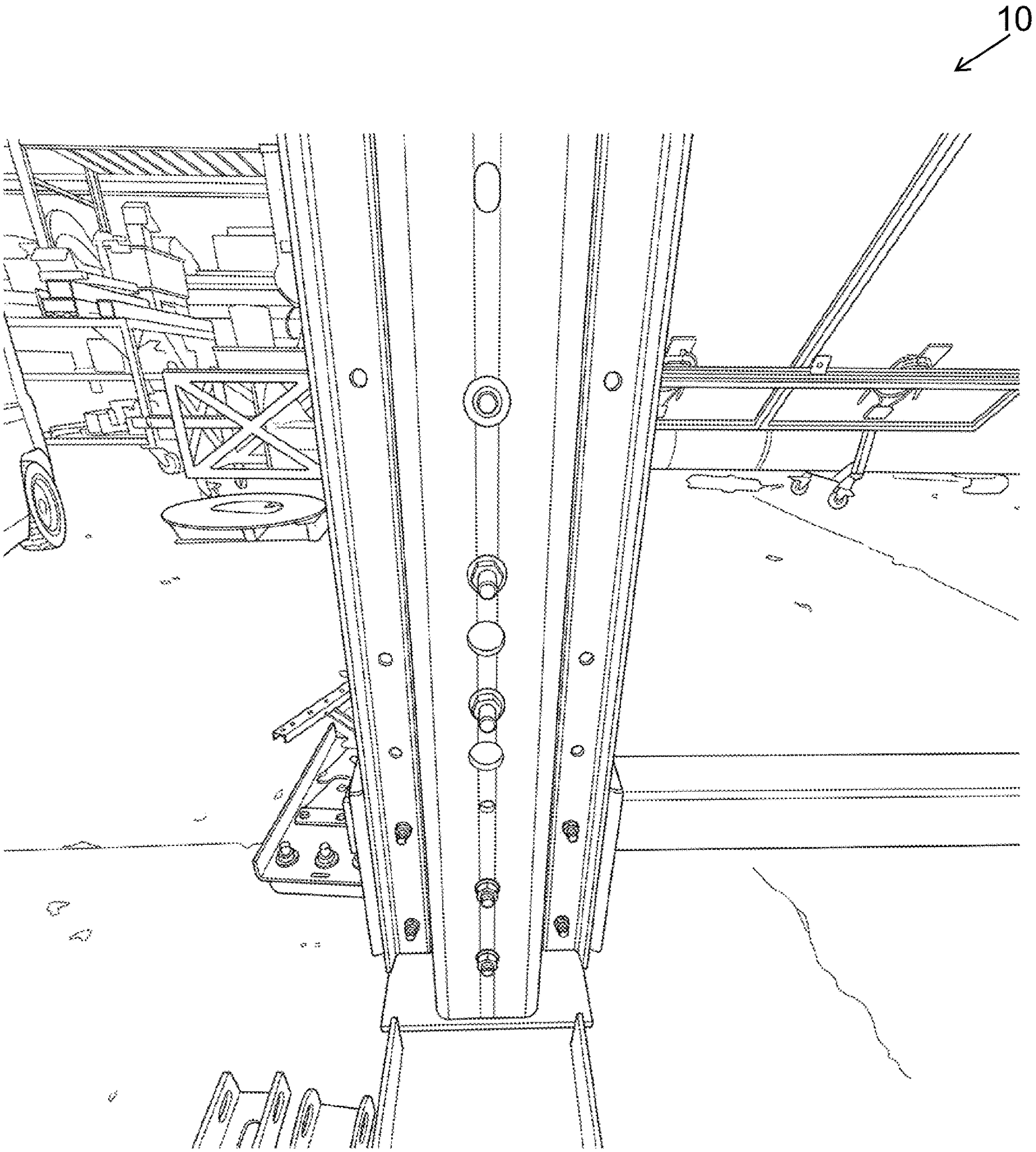
FIG. 51 is another perspective view of the photovoltaic system, the view showing the photovoltaic panels, the crossbar, and the support structure.
Figure 52:
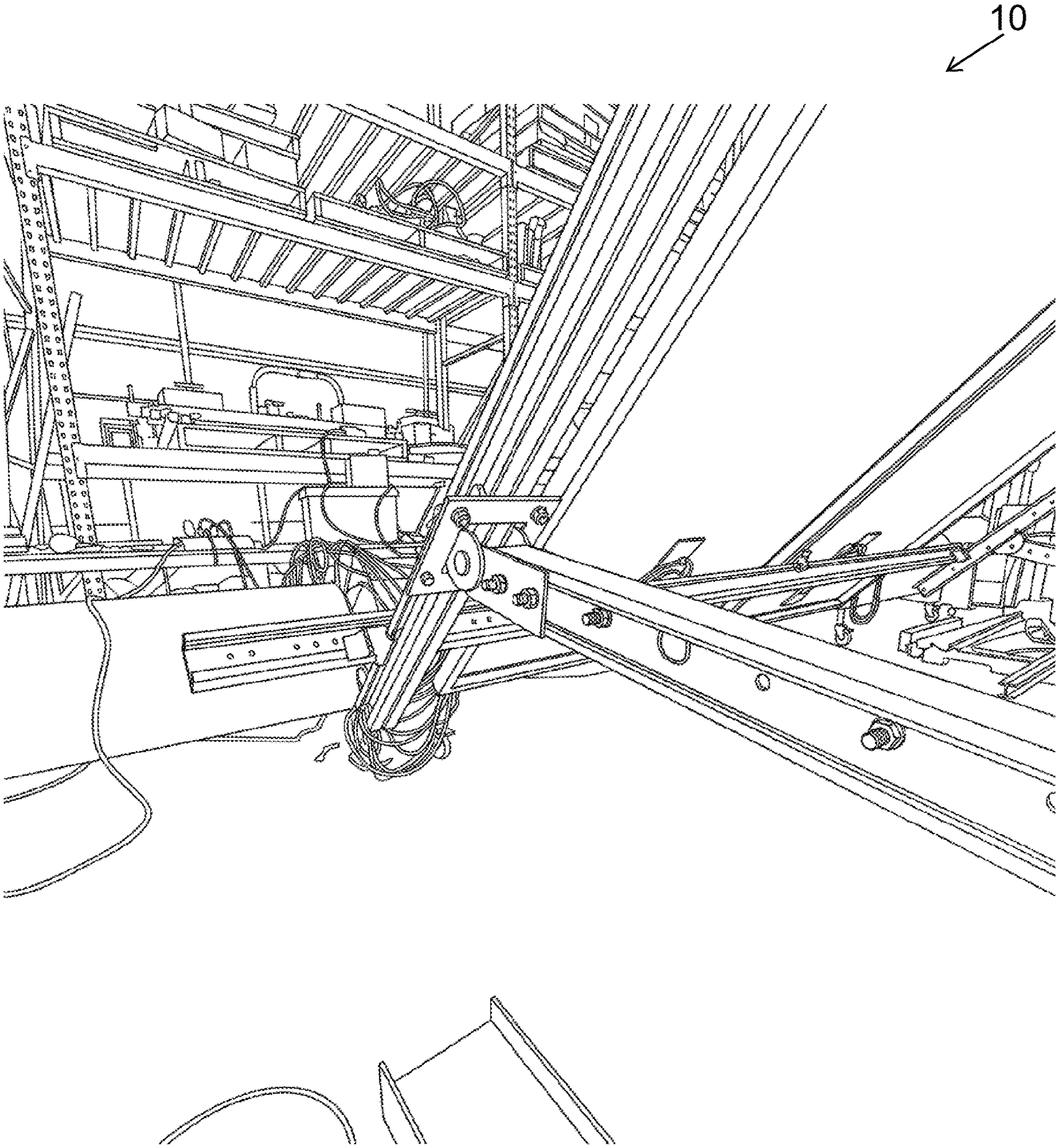
FIG. 52 is another perspective view of the photovoltaic system, the view showing the photovoltaic panels, the crossbar, and the support structure.
Figure 53:
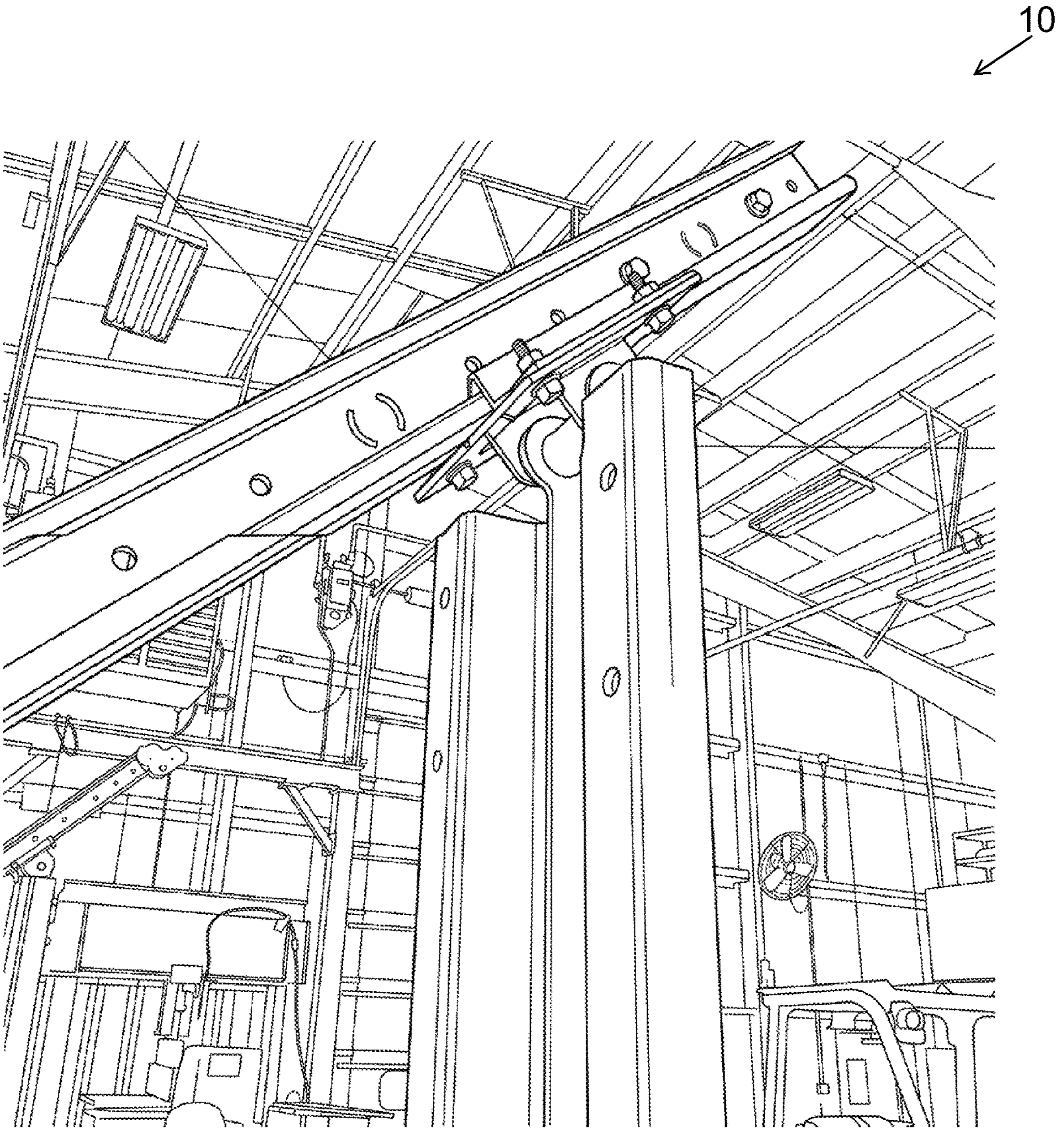
FIG. 53 is another perspective view of the photovoltaic system, the view showing the cantilever assemblies and the posts.
Figure 54:
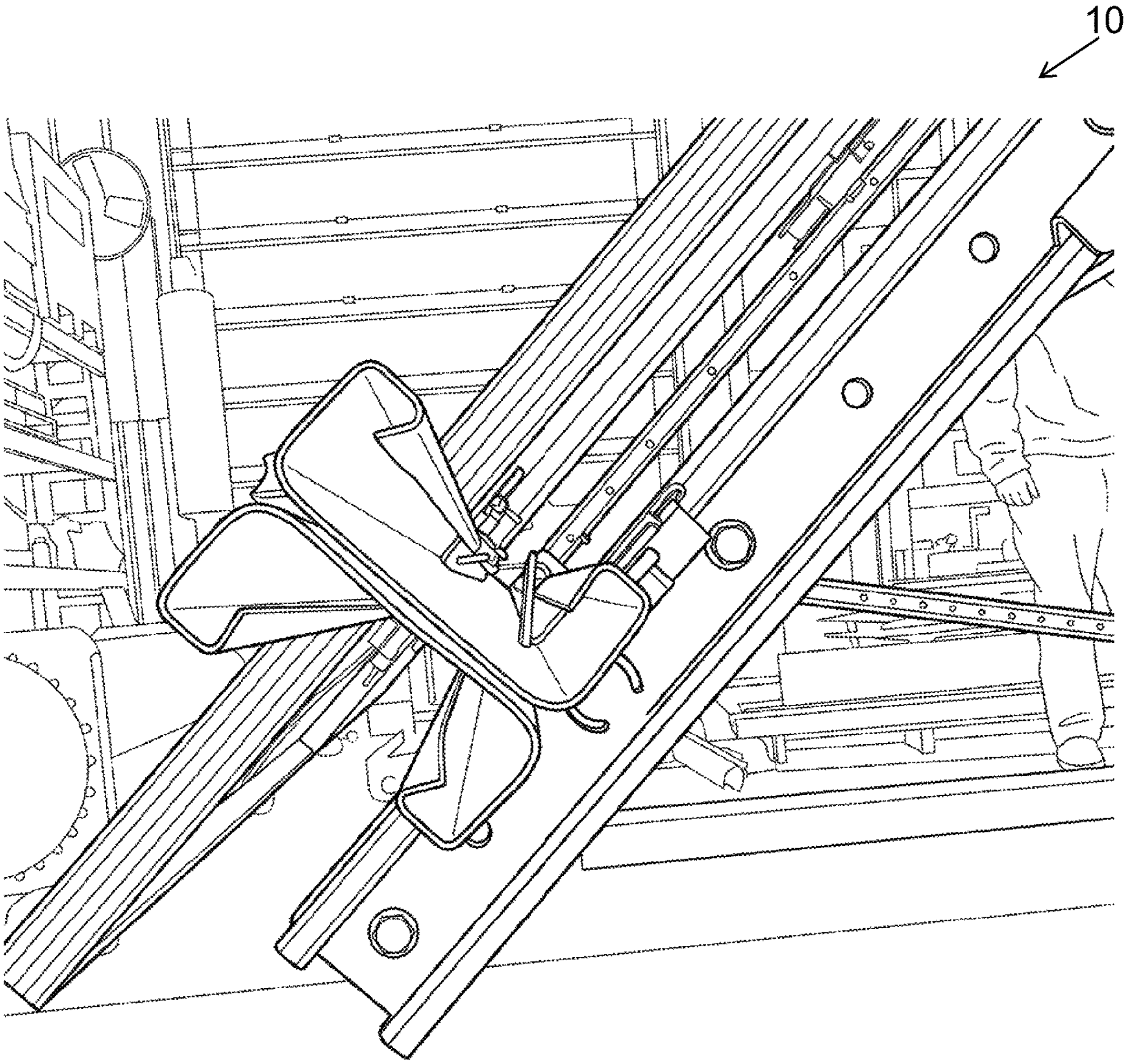
FIG. 54 is another perspective view of the photovoltaic system, the view showing the bracket assemblies, the crossbar, the photovoltaic panel, and the cantilever assemblies.
Figure 55:
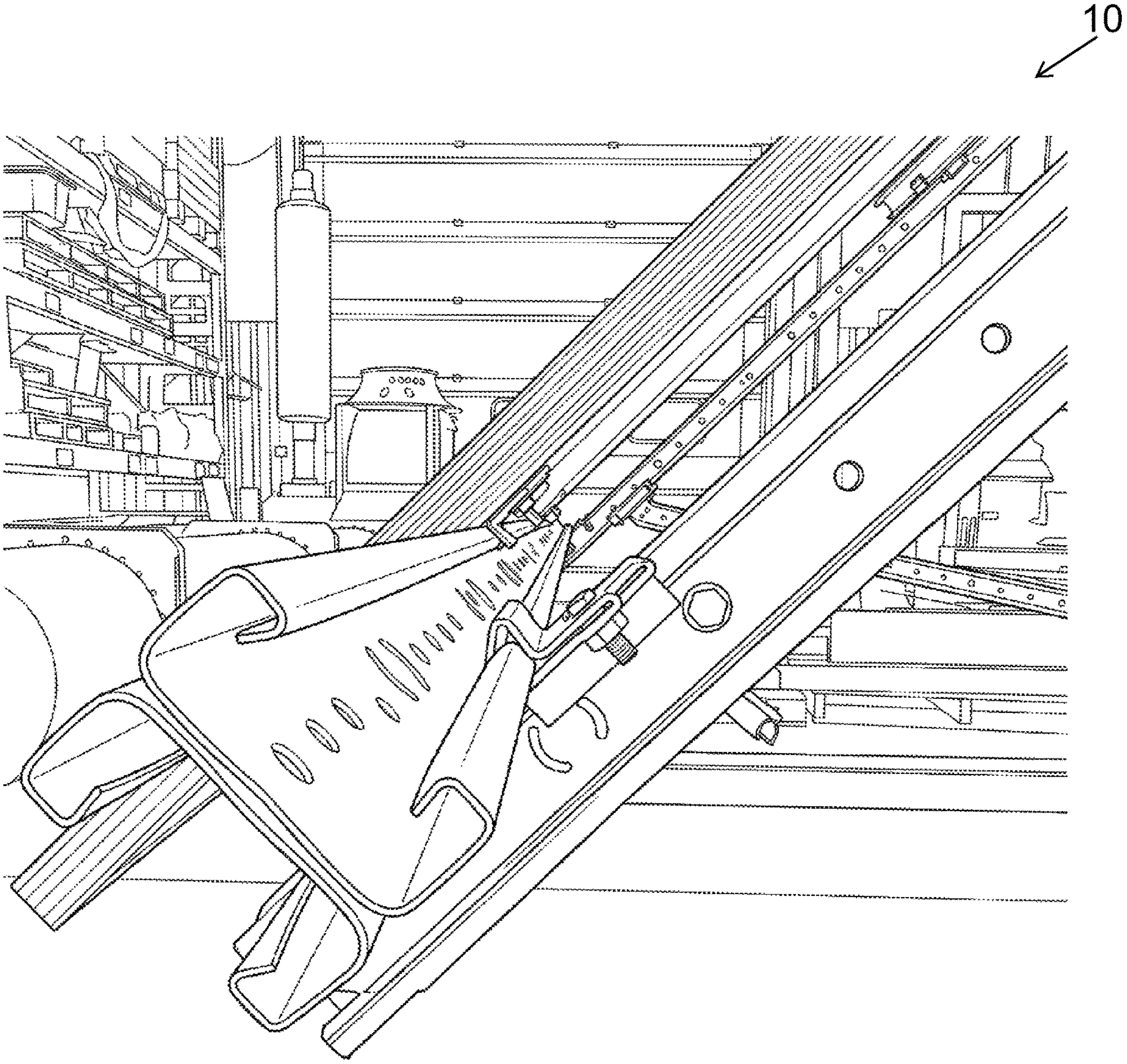
FIG. 55 is another perspective view of the photovoltaic system, the view showing the bracket assemblies, the crossbar, the photovoltaic panel, and the cantilever assemblies.
Figure 56:
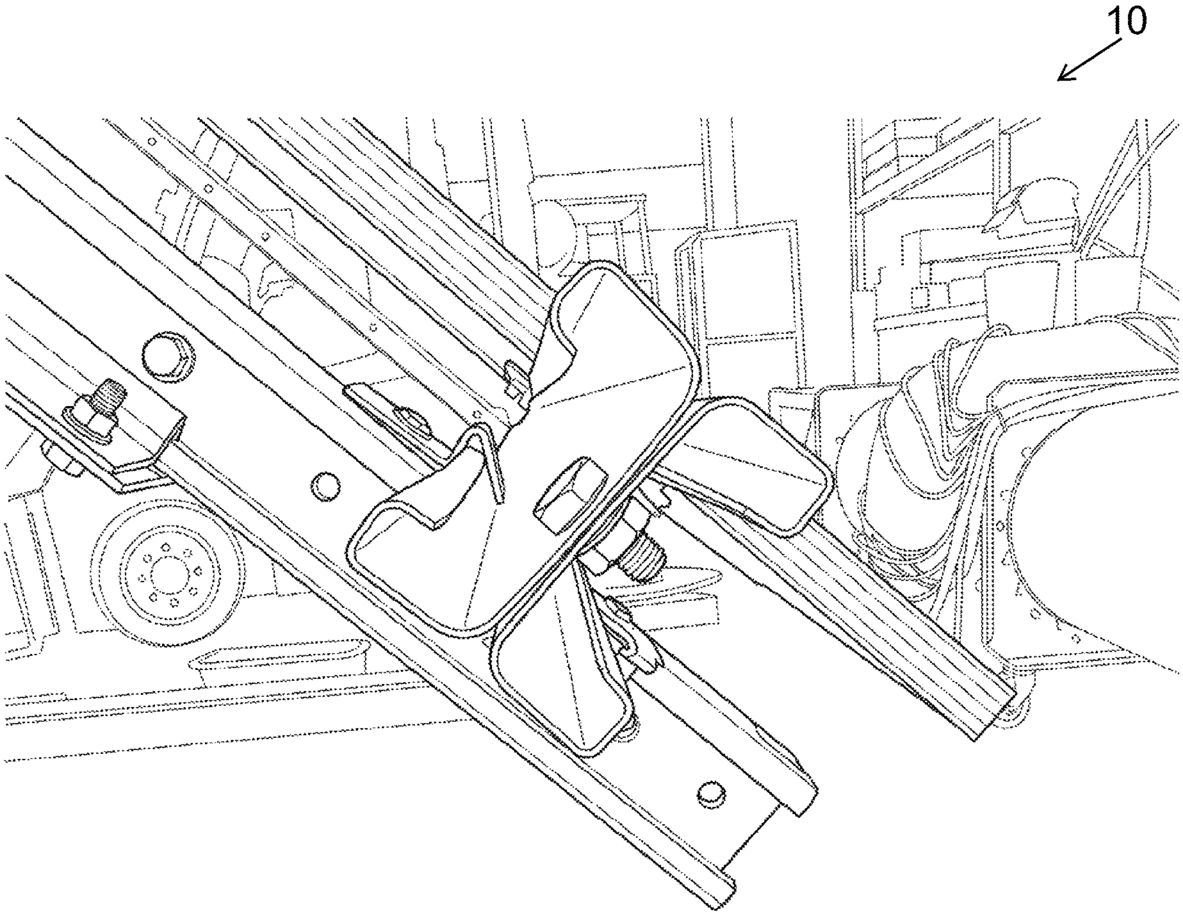
FIG. 56 is another perspective view of the photovoltaic system, the view showing the bracket assemblies, the crossbar, the photovoltaic panel, and the cantilever assemblies.
Figure 57:
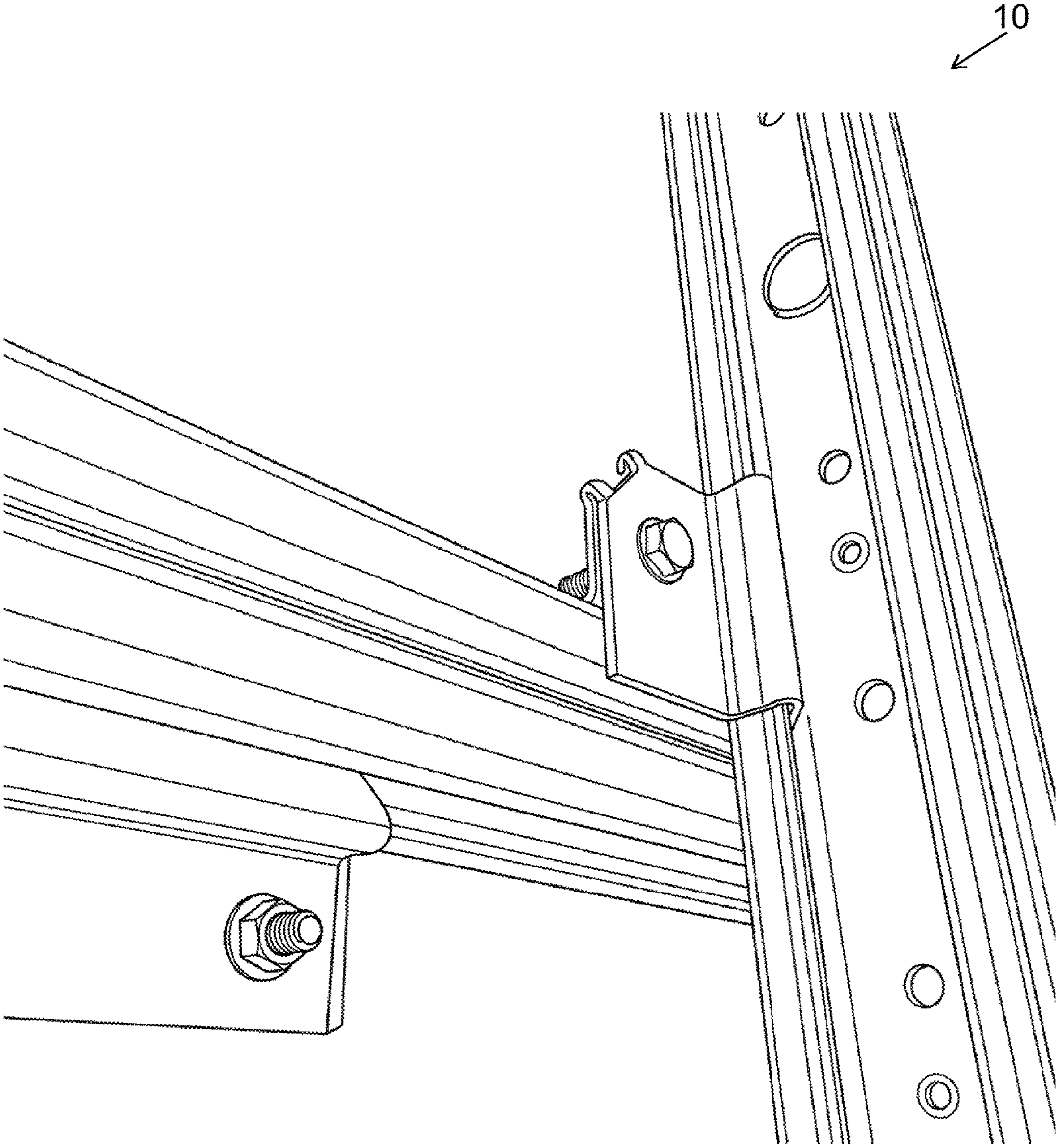
FIG. 57 is another perspective view of the photovoltaic system, the view showing the bracket assemblies, the crossbar, and the cantilever assemblies.
Figure 58:
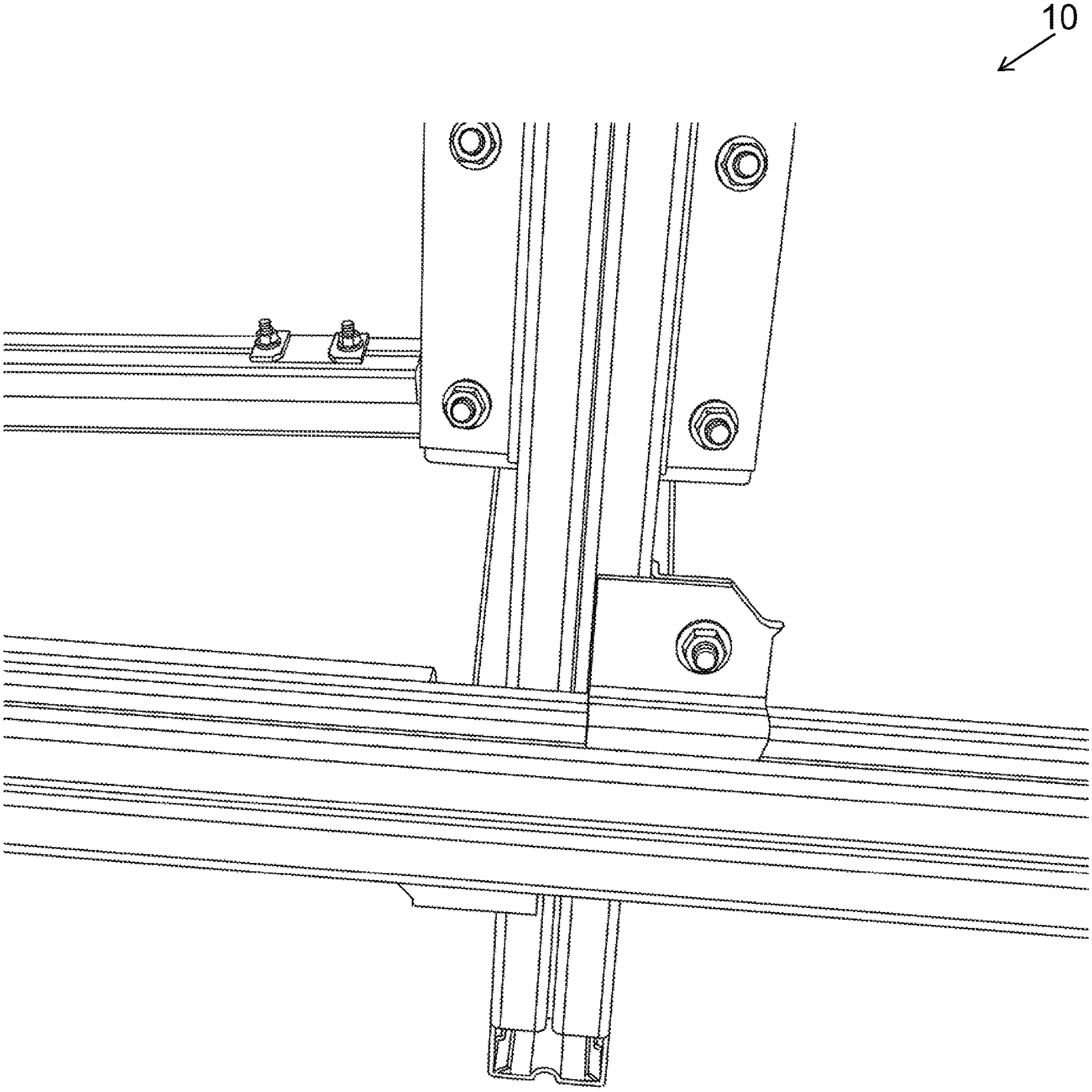
FIG. 58 is another perspective view of the photovoltaic system, the view showing the bracket assemblies and the crossbar.
Figure 59:
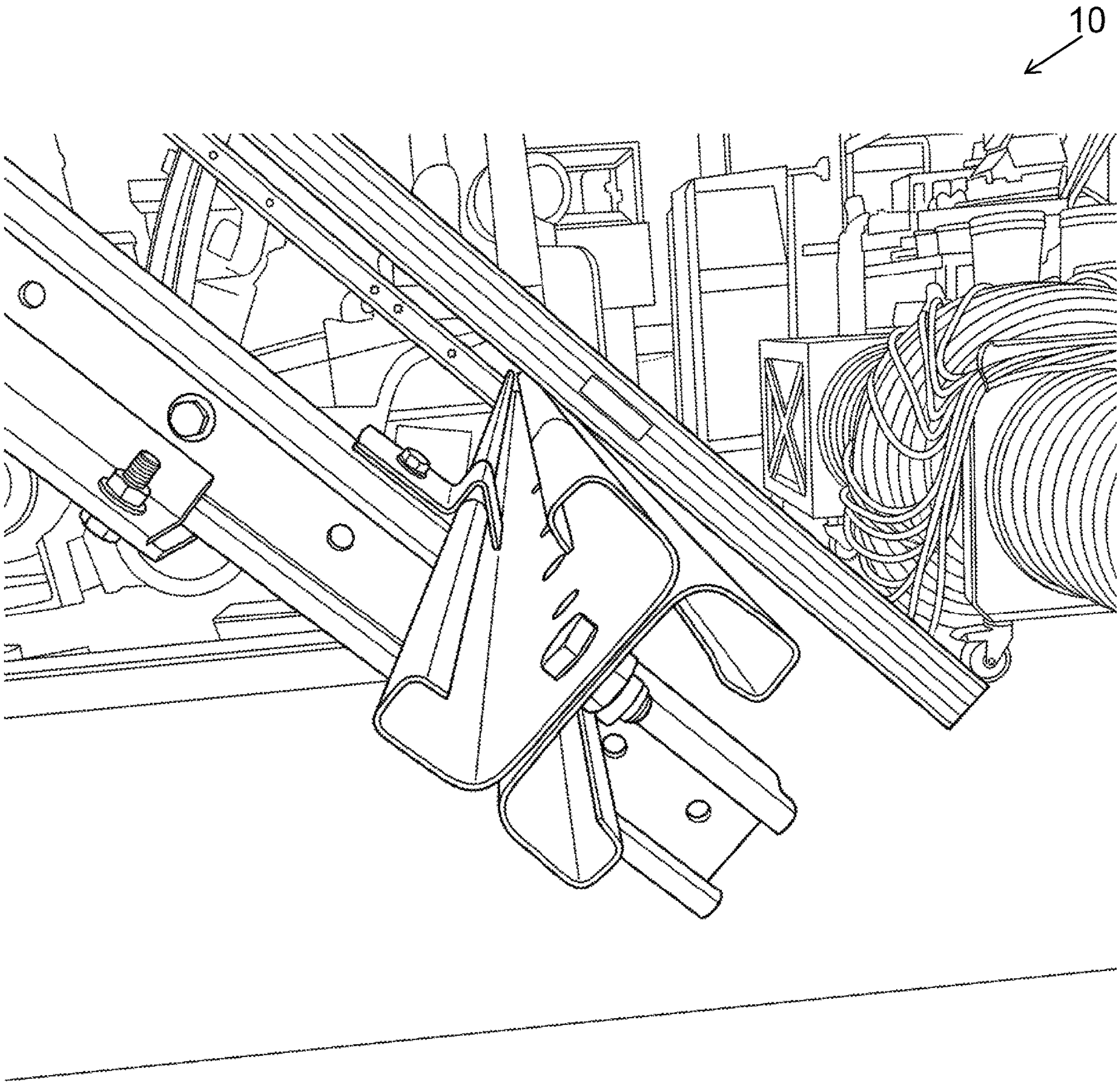
FIG. 59 is another perspective view of the photovoltaic system, the view showing the bracket assemblies and the crossbar.
Figure 60:
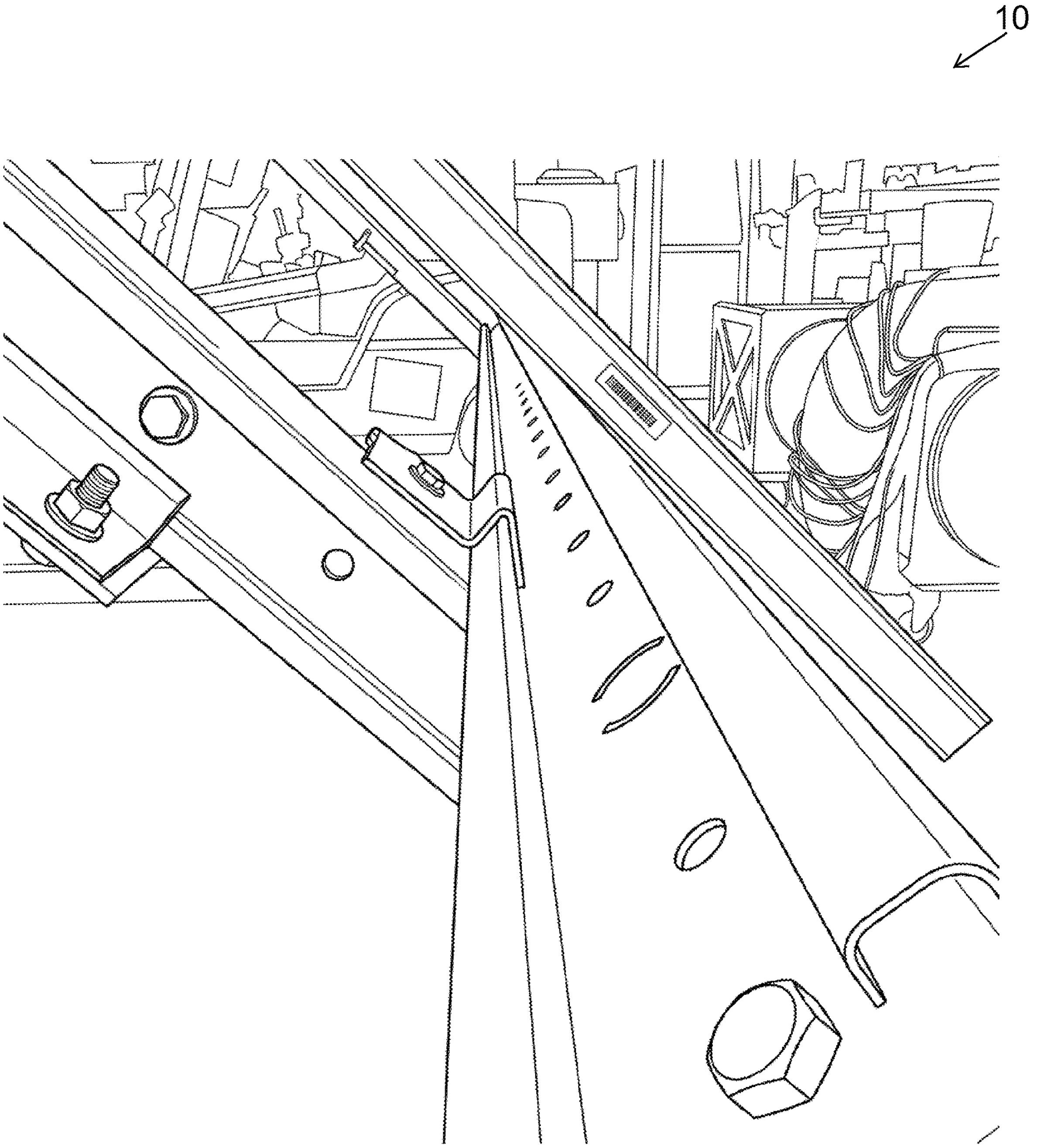
FIG. 60 is another perspective view of the photovoltaic system, the view showing the bracket assemblies and the crossbar.
Figure 61:
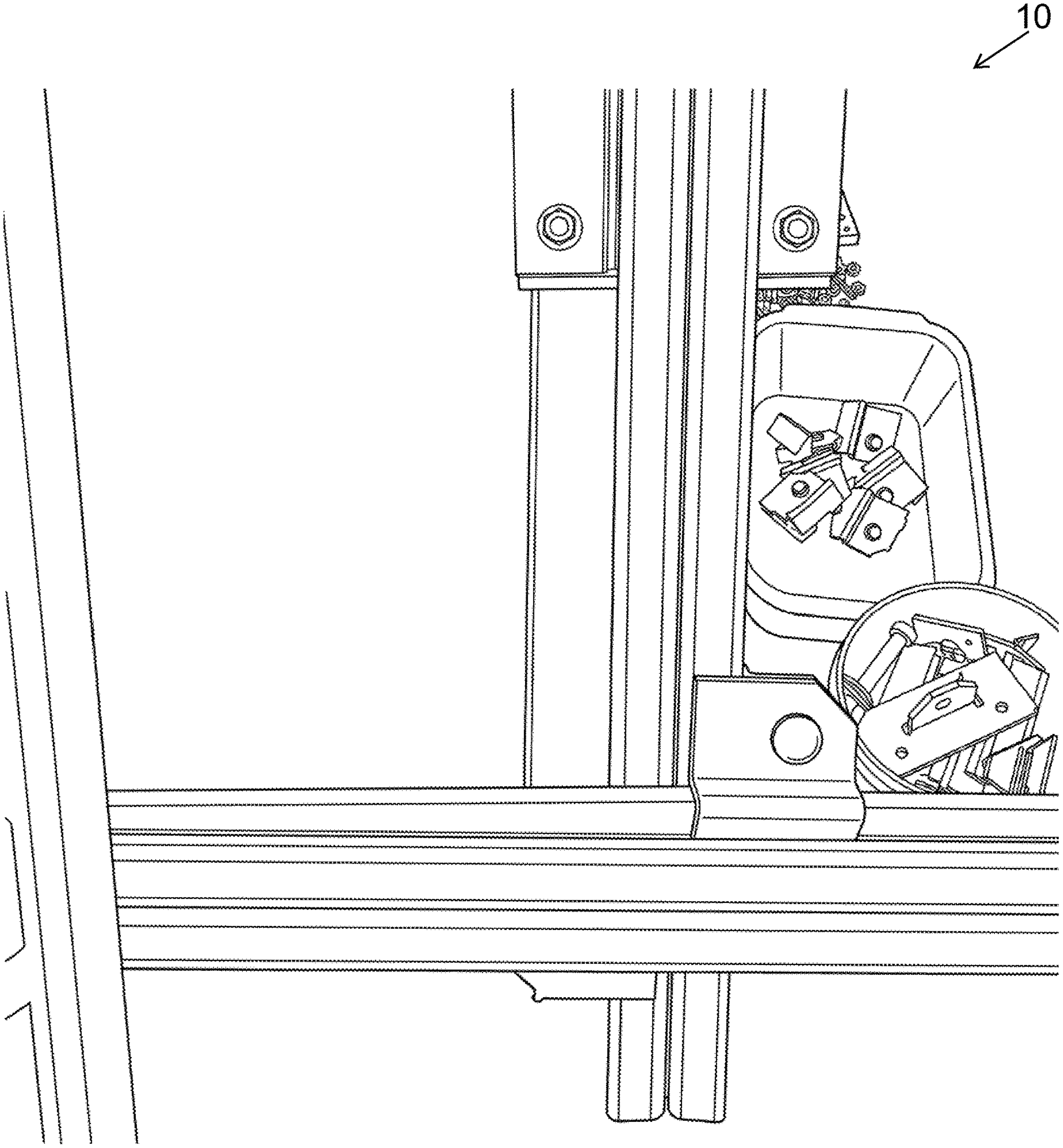
FIG. 61 is another perspective view of the photovoltaic system, the view showing the bracket assemblies.
Figure 62:
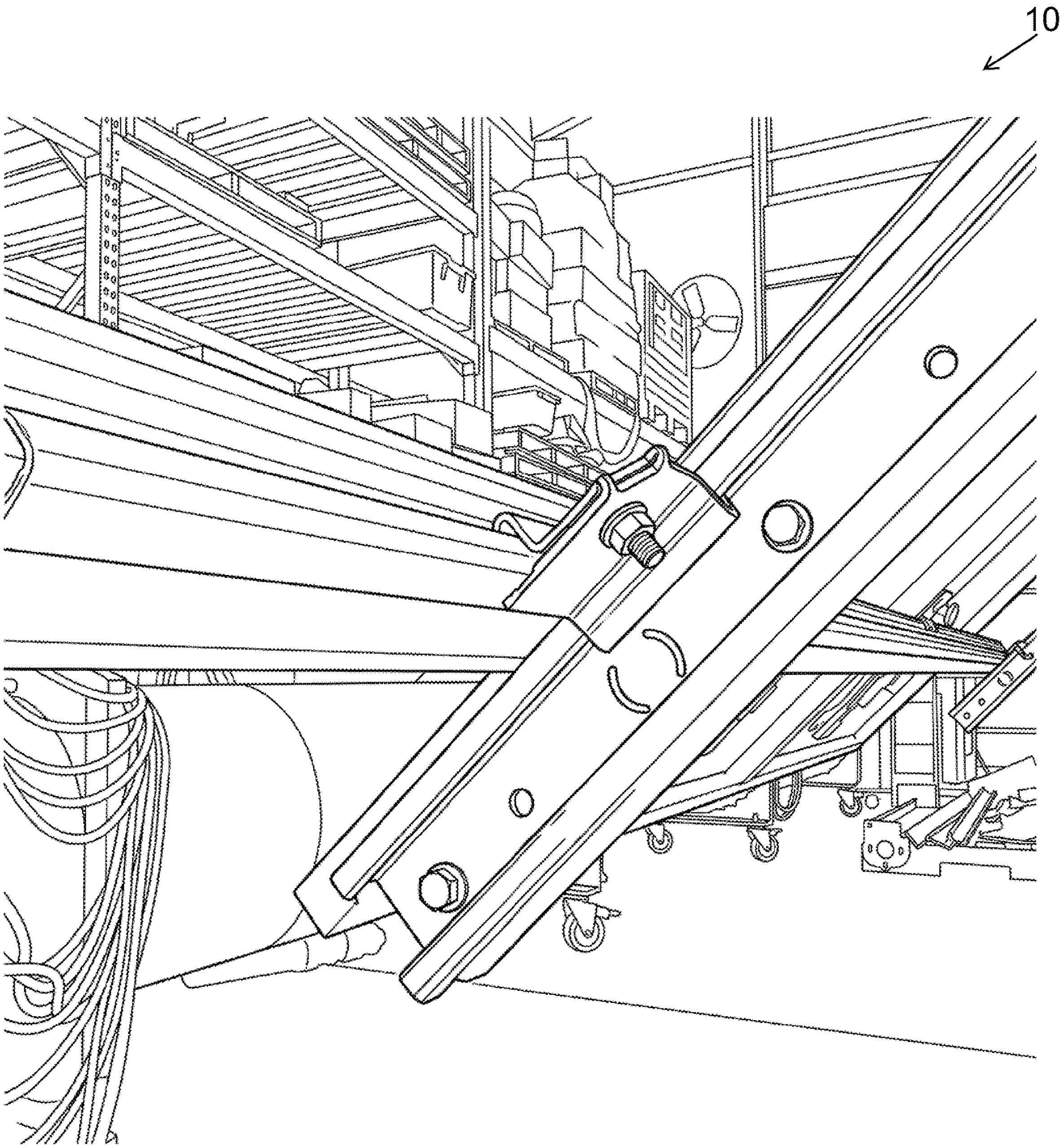
FIG. 62 is another perspective view of the photovoltaic system, the view showing the bracket assemblies.
Figure 63:
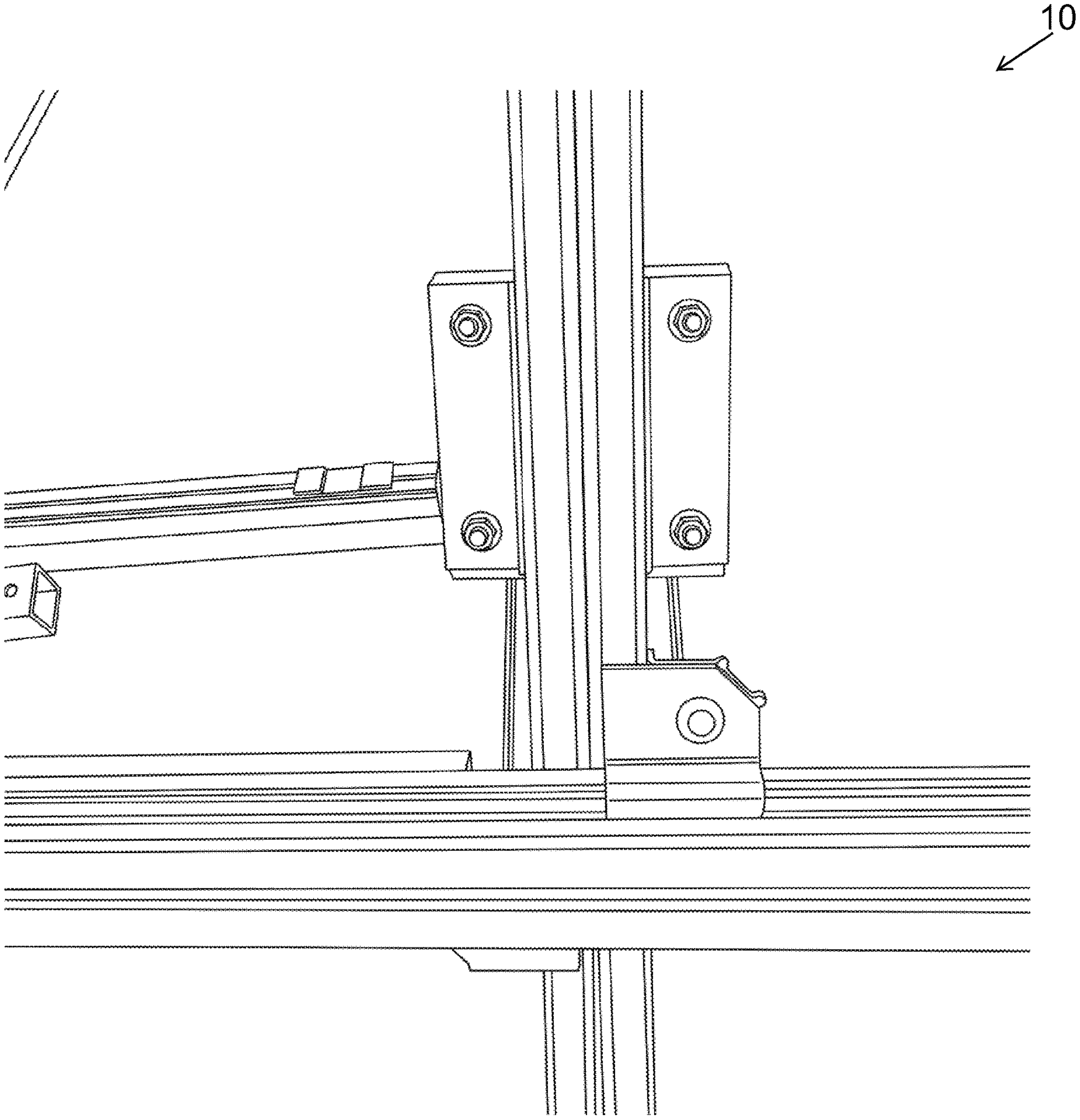
FIG. 63 is another perspective view of the photovoltaic system, the view showing the bracket assemblies.
Figure 64:
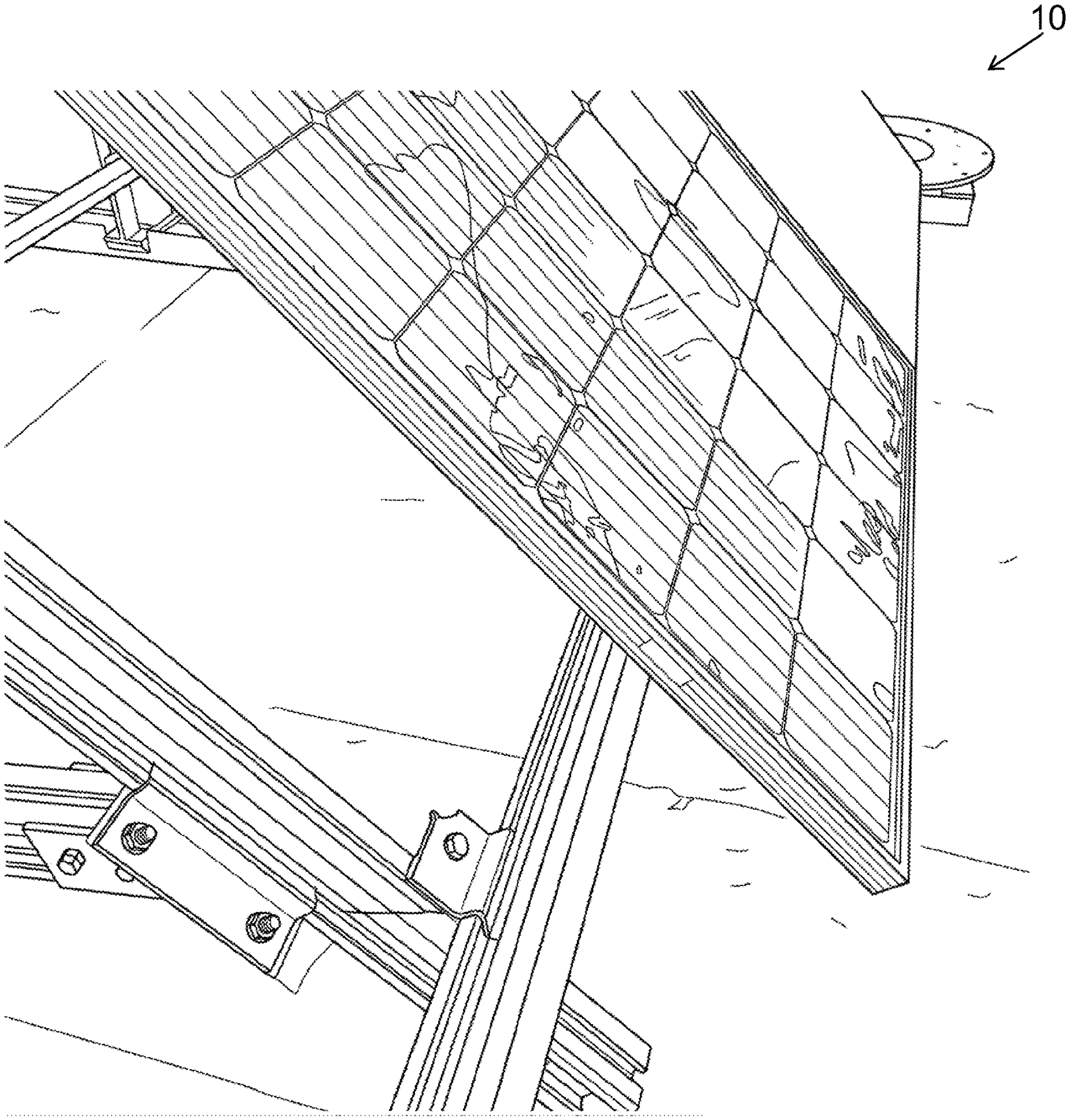
FIG. 64 is another perspective view of the photovoltaic system, the view showing the bracket assemblies, photovoltaic panel, and crossbar.
Figure 65:
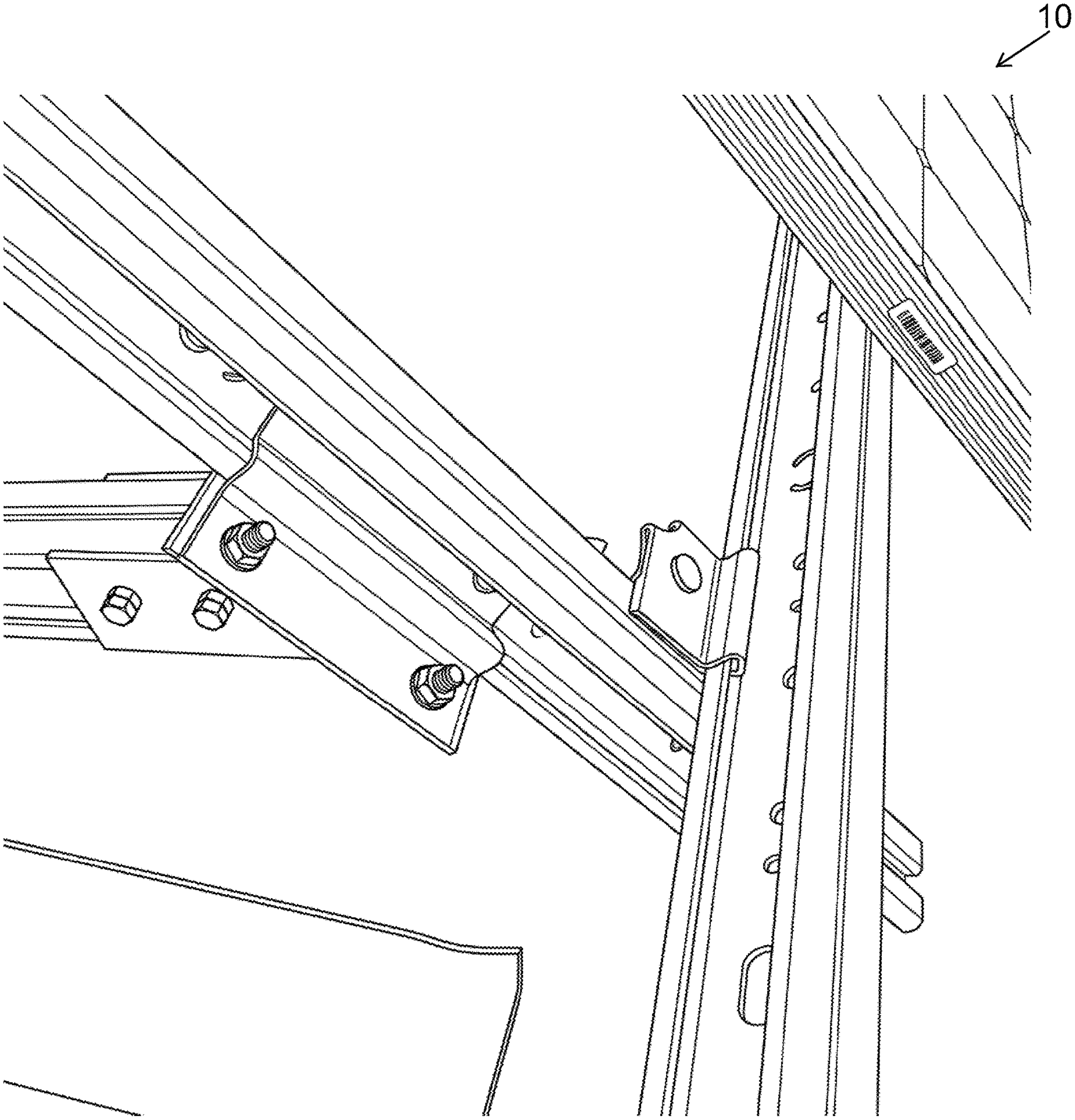
FIG. 65 is another perspective view of the photovoltaic system, the view showing the bracket assemblies, photovoltaic panel, and crossbar.
Figure 66:
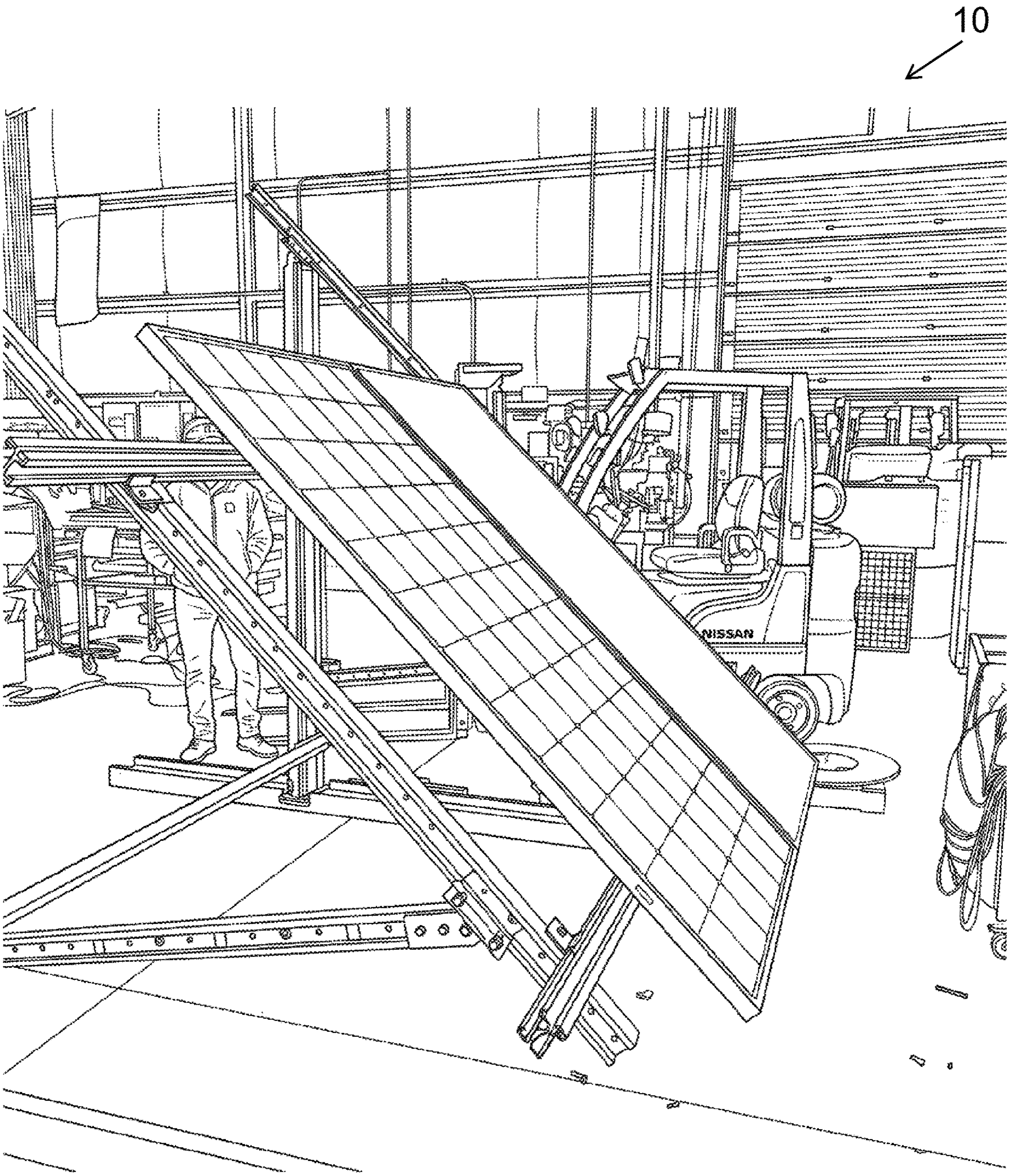
FIG. 66 is another perspective view of the photovoltaic system, the view showing the sheet of photovoltaic cells and the support structure.

FIG. 10 shows an example post 54 for a support structure 16 for a photovoltaic system 10, in accordance with one or more arrangements. The example post 54 is similar to a grain bin stiffener described in U.S. Pat. No. 10,907,373 titled "Double End Stud Bolt and Method of Use" issued Feb. 2, 2021, which is fully incorporated by reference herein. In this example, post 54 has a folded cross section that enhances the strength and/or rigidity of post 54 and facilitates easy installation of post into the ground by driving.

As one example, as is shown, posts 54 have in front surface 78, a rear surface 80, a center wall 82, opposing side members 84, forward walls 86 and tabs 88. Center wall 82 is generally flat and planar and extends from upper edge 32 to lower edge 34, or a distance thereof. Center wall 82 includes a plurality of vertically spaced holes 90 positioned approximately at its center.

As one example, as is shown, the outward edges of center wall 82 are connected to opposing side members 84. Like center wall 82, side members 84 are generally flat and planar and extend from upper edge 32 to lower edge 34, or a distance thereof. Side members 84 connect at their rearward edge 92 to the outward edge of center wall 82, and connect at their forward edge 94 to the inward edge of forward wall 86. Side members 84 extend outward at an angle away from one another (and away from center wall 82) as they extend from center wall 82 to forward wall 86.

The forward edges 94 of side members 84 are connected to the inward edges of forward walls 86. Like center wall 82, forward walls 86 are generally flat and planar and extend from upper edge 32 to lower edge 34, or a distance thereof. In the arrangement shown, as one example, opposing forward walls 86 are positioned in approximate planar spaced relation to one another, and forward walls 86 are positioned in approximate parallel spaced relation to center wall 82. Forward walls 86 connect at their outward edges 96 to the forward edge of tabs 88.

As one example, as is shown, the forward edges of tabs 88 connect to the outward edges 96 of forward wall 86 Like center wall 82, tabs 88 are generally flat and planar and extend from upper edge 32 to lower edge 34, or a distance thereof. In the example arrangement shown, tabs 88 extend outward at an angle away from one another (and away from center wall 82) as they extend from their forward edge before terminating at their rearward edge 92.

In this way, the combination of center wall 82, side members 84, forward walls 86 and tabs 88 form a structural element that provides superior strength and rigidity for the material weight. When viewed from above or below, the combination of center wall 82, side members 84, forward walls 86 and tabs 88 essentially form corrugation that provides strength and rigidity. While post 54 is shown having center wall 82, side members 84, forward walls 86 and tabs 88, this is just one of countless examples for the design of post 54, and any other features or combination of features are hereby contemplated for use with post 54. In one or more arrangements, post 54 may be formed of a plurality of layers, or "laminated" to provide additional strength and rigidity.

In one or more arrangements, posts 54 are unitary members extending from lower end 68 to upper end 66. However, the arrangements are not so limited. Rather, it is contemplated that in some various arrangement, posts 54 may be formed of multiple segments connected together. For example, in some arrangements posts 54 may be formed of a plurality of segments that are connected together in end-to-end connection and/or in overlapping condition. As an illustrative example, in some arrangements, posts 54 include a lower portion 72 that is driven into or otherwise installed in the ground and an upper portion 74 that connects with lower portion and extends upward to upper end 66. However, the arrangements are not so limited. Rather, it is contemplated that in some various arrangements, posts 54 may be formed of any number of segments.

Cantilever Assemblies 56

Cantilever assemblies 56, or diagonal supports, are formed of any suitable size, shape, and design and are configured to operably connect with post 54 and support crossbars 60 and/or other components of support structure 16. In the arrangement shown, as one example, cantilever assemblies 56 are generally elongated beam members extending from an upper end 98 to a lower end 100.

In the example arrangement shown, an upper section of cantilever assemblies 56 are operably connected to upper end 66 of posts 54. In this example arrangement, upper section of cantilever assemblies 56 are pivotally connected to upper end 66 of posts 54 so as to permit cantilever assemblies 56 to be moved to different angles for orientation of photovoltaic panels 14 connected to support structure 16. In the arrangement shown, as one example, a lower section of cantilever assemblies 56 is also operably connected to posts 54 by braces 58, which hold cantilever assemblies 56 at a desired angle.

Braces 58

Braces 58 are formed of any suitable size, shape, and design and are configured to operably connect with cantilever assemblies 56 and posts 54 and hold cantilever assemblies 56 at a desired angle for support of photovoltaic panels 14 connected to support structure 16.

In the arrangement shown, as one example, braces 58 are generally elongated beam members extending from a front end 108 to a rear end 110. In this example arrangement, front end 108 is operably connected to the lower section of cantilever assemblies 56 and rear end 110 is operably connected to the lower section of post 54.

In some arrangements, braces 58 are configured to be length adjustable to facilitate adjustment of the angle at which braces hold cantilever assemblies 56. Additionally or alternatively, in some arrangements braces 58 may be configured to connect with of cantilever assemblies 56 and/or posts 54 at a plurality of locations along braces to facilitate adjustment of the angle at which braces 58 hold cantilever assemblies 56.

Connection Assemblies 114, 116 and 118

In one or more arrangements, posts 54, cantilever assemblies 56, and braces 58 are operably connected together by connection assemblies 114, 116, and 118. Connection assemblies 114 (also referred to as upper connection assemblies 114) are formed of any suitable size, shape, and design and are configured to operably connect the upper section of cantilever assemblies 56 with posts 54. Connection assemblies 116 (also referred to as forward connection assemblies 116) are formed of any suitable size, shape, and design and are configured to operably connect the lower section of cantilever assemblies 56 with front end 108 of braces 58. Connection assemblies 118 (also referred to as rearward connection assemblies 118) are formed of any suitable size, shape, and design and are configured to operably connect the lower section of cantilever assemblies 56 with rear end 110 of braces 58.

In one or more arrangements, connection assemblies 114, 116 and 118 provide a hinged connection configured to facilitate connection of pairs of posts 54, cantilever assemblies 56, and/or braces 58 at an angle relative to each other. In the arrangement shown, as one example, connection assemblies 114, 116 and 118 each include a first bracket 122 configured to facilitate operable connection with a first component, a second bracket 122 configured to facilitate operable connection with a second component, and a hinged connection 126 between the pair of brackets 122. In the arrangement shown, as one example, hinged connection 126 is formed by a fastener 130 (e.g., a bolt, screw, pin, etc.) extending through a set of holes 128 in the two brackets 122.

In various different arrangement, brackets 122 of connection assemblies 114, 116 and 118 may operably connected with posts 54, cantilever assemblies 56, and/or braces 58 using various methods and/or means including but not limited to for example clamps, screws, bolts, threading, interlocks, latches, clips, pins, hinges, brackets, or other coupling devices, adhesive bonding, chemical bonding, welding, and/or any other means and/or method for attachment. In the arrangement shown, as one example, one bracket 122 of upper connection assemblies 114 is configured to connect with cantilever assemblies 56 with clamps 132 and the other bracket 122 of upper connection assembly 114 is configured to connect with posts 54 using fasteners 134 that extend through slots 136 in the bracket 122 and into holes 90 of posts 54. Similarly, in the example arrangement shown, one bracket 122 of forward connection assemblies 116 is configured to connect with cantilever assemblies 56 with clamps 132 and the other bracket 122 of forward connection assembly 116 is configured to connect with front end 108 of braces 58 using fasteners 134 that extend through holes 128 of bracket 122 and holes 112 of braces 58. As another example, in the arrangement shown, one bracket 122 of rearward connection assemblies 118 is configured to connect with connect with posts 54 using fasteners 134 that extend through slots 136 in the bracket 122 and into holes 90 of posts 54 and the other bracket 122 of rearward connection assemblies 118 is configured to connect with rear end 110 of braces 58 using fasteners 134 that extend through holes 128 of bracket 122 and holes 112 of braces 58.

However, the arrangements are not so limited to the described structures to operably connect cantilever assemblies 56 with posts 54 and/or other components of support structure 16. Rather, it is contemplated that in some arrangements, cantilever assemblies 56 may be attached to posts 54 at a fixed angle and/or may be operably connected to posts 54 using any number of braces 58 or other alternative structures and/or braces 58 may be omitted.

Crossbars 60

Crossbars 60, or cross supports, are formed of any suitable size, shape, and design and are configured to extend between and be operably connected with cantilever assemblies 56 and facilitate connection of photovoltaic panels 14 with support structure 16. In the arrangement shown, as one example, crossbars 60 are generally elongated beam members extending between opposing ends 140. In some arrangements, crossbars 60 may terminate at outermost cantilever assemblies 56 of support structure 16. Additionally or alternatively, in some arrangements some or all crossbars 60 may extend beyond outermost cantilever assemblies 56. In one arrangement shown, support structure 16 includes four crossbars 60 extending across five cantilever assemblies 56. However the arrangements are not so limited. Rather, it is contemplated that in various different arrangement support structure 16 may include any number of crossbars 60 and cantilever assemblies 56.

Beam Shape Crossbars 60 and Cantilever Assemblies 56

In one or more arrangements, crossbars 60 have a beamed shaped cross section with one or more flanges to facilitate mounting of photovoltaic panels 14 using bracket assemblies 18. In the arrangement shown, crossbars 60 have a cross section shape similar to an I-beam, having upper and lower flanges 146 connected by a center web 148. However, the arrangements are not so limited. Rather, it is contemplated that in some various different arrangements, crossbars 60 may have various shaped cross sections including but not limited to, for example, I-beam, H-beam, S-beam, W-beam, or any other beam shape having flanges connected by a center web (e.g., C-beam).

In the arrangement shown, flanges 146 extend outward to each side of web 148 to outer edges 150, where lips 152 extend inward toward each other. That is lips 152 on upper flanges 146 extend downward from outer edges 150 and lower flanges 146 extend upward. In one or more arrangements, lips 152 held facilitate a secure connection of bracket assemblies 18 when clamped onto flanges 146.

In one or more arrangements, the I-beam like shape of crossbars 60 is formed by a pair of C-beam shaped members 156 connected to each other with webs 148 positioned next to each other. In such arrangements, the pair of C-beam shaped members 156 may be connected using various methods and/or means including but not limited to for example clamps, screws, bolts, threading, interlocks, latches, clips, pins, hinges, brackets, or other coupling devices, adhesive bonding, chemical bonding, welding, and/or any other means and/or method for attachment.

In one or more arrangements, cantilever assemblies 56 also have a beam shaped cross section similar to that of crossbars 60 to facilitate mounting of crossbars 60 on cantilever assemblies 56 using bracket assemblies 18 to clamp onto flanges 146 of crossbars 60 on cantilever assemblies 56. Using identical bracket assemblies 18 to mount crossbars 60 on cantilever assemblies 56 and also to mount photovoltaic panels 14 on crossbars 60 may reduce manufacturing costs, simplifies installation, and/or reduce installation time.

In one or more arrangements, crossbars 60 on cantilever assemblies 56 may have an identical cross sectional shape. However, the arrangements are not so limited. Rather, it is contemplated that in some arrangements, crossbars 60 on cantilever assemblies 56 may have different cross section shapes that facilitate operable connection with bracket assemblies 18.

While some arrangements may be primarily described with reference to crossbars 60 and cantilever assemblies 56 having a beam like cross-section, the arrangements are not to limited. Rather, it is contemplated that in some arrangements, various other components of support structure may similarly be formed of elongated members with beam like cross-section. For example, in some arrangements, braces 58 may also be formed of elongated members with beam like cross-section. Using similar if not identical materials for multiple components of support structure 16 may reduce manufacturing costs, simplifies installation, and/or reduce installation time reduces cost.

Bracket Assemblies 18

Bracket assemblies 18 are formed of any suitable size, shape, and design and are configured to operably connect two components (e.g., photovoltaic panels 14, cantilever assemblies 56, braces 58, crossbars 60, or other components of system 10), by operably connecting with flanges of the two components.

In the arrangement shown, as one example, bracket assemblies 18 have a first section 170 and a second section 172 that are connected to each other by a living hinge 174 and oriented in opposition to each other. In this example arrangement, bracket assemblies 18 each include an actuator 176 that extends through holes 178 in first section 170 and second section 172 to facilitate clamping of components between first section 170 and second section 172 when actuator 176 moves first section 170 and second section 172 toward one another.

First Section 170 and Second Section 172

First section 170 and second section 172 are formed of any suitable size, shape, and design and are configured to provide a first set of clamp surfaces 184 on first section 170 and a second set of clamp surfaces 186 on second section 172 that are positioned in opposition to the first set of clamp surfaces 184.

In the arrangement shown, as one example, the first set of clamp surfaces 184 includes a first clamp channel 188 and a first clamp surface 190. In this example arrangement, the second set of clamp surfaces 184 includes a second clamp channel 192 and a second clamp surface 194. The first clamp channel 188 is positioned in opposition to second clamp surface 194, which together operate as a first clamp 198. The second clamp channel 192 is positioned in opposition to first clamp surface 190 and together operate as a second clamp 200.

In the arrangement shown, first clamp channel 188 and second clamp channel 192 extends in perpendicular directions to facilitate clamping of elongated components that are perpendicular to each other. However, the arrangements are not so limited. Rather, it is contemplated that in some various arrangements, first section 170 and second section 172 may be adapted to clamp components of various orientations to one another including but not limited to, perpendicular components, parallel components, or components in any acute or obtuse angle relative to one another.

In the example arrangement shown, first section 170 and second section 172 have complementary rotationally symmetrical shapes which form first set of clamp surfaces 184 and second set of clamp surfaces 186. In this example arrangement, first section 170 and second section 172 each have a generally rectangular shaped main body 206 having a planar inward facing surface 208 and outward facing surface 210 extending from living hinge 174 along a first inward edge 212 to a first outward edge 214 proximate to the clamp channel 188/192 of the section 170/172. In this example arrangement, inward facing surface 208 and outward facing surface 210 also extending from living hinge 174 along a second inward edge 216 to a second outward edge 218 positioned in opposition to the clamp channel 192/188 of the other second section 172/170. In the arrangement shown, the first clamp surface 190 is located on the inward facing surface 208 adjacent the second outward edge 218. In one or more arrangements, first section 170 and second section 172 have a cutaway 220 at a corner between second inward edge 216 and second outward edge 218. In another example arrangement, first section 170 and second section 172 do not have a cutaway 220 at a corner between second inward edge 216 and outward edge 218.

Clamp Channels 188/192

The first clamp channel 188 and the second clamp channel 192 are each formed of any suitable size, shape, and design and are configured to facilitate clamping of a component positioned within the respective clamp channel 188/192. In the arrangement shown, as one example, the first clamp channel 188 and the second clamp channel 192 have a generally triangular shape when viewed from the side (e.g., first outward edge 214). The triangular shape may help to orient and/or align structures (e.g., flanges 146 of crossbars 60, cantilever, assembly 56, and/or photovoltaic panels 14) held within the clamp channel 188/192 when clamped. In arrangements having perpendicular aligned clamp channels 188/192, such orientation and/or alignment within clamp channels 188/192 may operate to self-square or perpendicularly align the pair of structures that are clamped within clamp channels 188/192.

However, the arrangements are not so limited. Rather, it is contemplated that in some various arrangements, first clamp channel 188 and the second clamp channel 192 may be various different shapes including but not limited to, triangular, rectangular, semi-circular, and/or any other suitable shape.

In the example arrangement shown, each clamp channel 188/192 is formed by a first flange 226 and a second flange 230. In this example arrangement, first flange 226 extends outward from the 214 outward edge of the main body 206 to a corner edge 228. In this example arrangement, second flange 230 extends inward from the corner edge 228 toward the other section 170/172 of the bracket assembly 18 to a free edge 232.

Living Hinge 174

Living Hinge 174 is formed of any suitable size, shape, and design and is configured to operably connect first section 170 and a second section 172 of bracket assembly 18 while permitting to be repositioned relative to each other about an axis of the living hinge. In the arrangement shown living hinge is formed by a length of material 240 extending between the main bodies 206 of the first section 170 and second section 172 at a corner of the main body 206 between the first inward edge 212 and second inward edge 216. In this example arrangement, the length of material 240 is folded to position first section 170 and second section 172 at an angle with respect to each other. In this example arrangement, the length of material 240 includes a weak point 242, where length of material 240 has less material to facilitate bending at the axis of the living hinge 174. In the arrangement shown, as one example weak point 242 is formed by a hole 244 extending through the length of material 240 and positioned approximately midway between first section 170 and the second section 172. However, the arrangements are not so limited. Rather, it is envisioned that in some various arrangements, weak point 242 may be formed by various different features including but not limited to, for example, one or more holes, notches, cut aways, other features that reduce material, weakened material (e.g., softening of steel by targeted heat), or any other method or means for creating a weak point 242.

Actuator 176

Actuator 176 is formed of any suitable size, shape, and design and is configured to operably connect first section 170 and a second section 172 and move first section 170 and a second section 172 closer to each other to facilitate clamping facilitate clamping of objects, positioned within first clamp channel 188 and second clamp channel 192, between the first section 170 and the second section 172. In this example arrangement, actuator 176 is a carriage bolt 246, extending through holes 178 in the first section 170 and second section 172 of bracket assembly 18, and a nut 248. Tightening of the nut 248 on the carriage bolt 246 causes first section 170 and a second section 172 to be moved closer to one another.

In the example arrangement shown, holes 178 in first section 170 and the second section 172 have a stadium shape, which permits carriage bolt 246 to extend through holes 178 at an angle, thereby permitting carriage bolt 246 to extend through holes 178 when first section 170 and the second section 172 are positioned at an angle to each other in an unclamped position. In one or more arrangements, the stadium shape of holes 178 may be configured to engage with the head of carriage bolt 246 to prevent rotation of carriage bolt 246 when nut 248 is tightened. In this manner, the nut 248 can be tightened on carriage bolt 246 with one hand leaving a hand free to hold the bracket assembly 18 or other component of system 10 that is being installed.

In Operation

In one or more arrangements, bracket assembly 18 may be provided with living hinge 174 positioning first section 170 and second section 172 in an unclamped position and with carriage bolt 246 pre-inserted through holes 178 and held in place by nut 248. In the unclamped position, first section 170 and second section 172 are positioned at a wider angle from each other with living hinge 174 as the vertex. In this unclamped position, the first set of clamp surfaces 184 of the first section 170 are positioned as a larger distance from the second set of clamp surfaces 196 of the second section 172, thereby permitting clamps 198 and 200 to be placed over the structures to be operably connected by bracket assembly 18 (e.g., flanges 146 of crossbars 60, cantilever, assembly 56, and/or photovoltaic panels 14). That is such structures (e.g., flanges 146) are positioned in the clamp channels 188/192.

In this example arrangement, nut 248 of actuator 176 may be tightened to facilitate clamping of clamps 198 and 200 onto the structures to be operably connected by bracket assembly 18. In this example arrangement, the first section 170 and second section 172 operate as a 3$^{rd}$ class lever arms with living hinge 174 operating as the fulcrum, the sets of clamp surfaces 184/196 operating as the load ends of the leavers and the carriage bolt 246 and nut 248 or actuator 176 applying effort to the levers.

In this example arrangement, as nut 248 is tightened onto carriage bolt 246, effort is applied to levers arms formed by first section 170 and second section 172 to move first section 170 and second section 172 closer to each other and reducing the angle between the first section 170 and second section 172 until a clamped position is reached. In the clamped position, the structures (e.g., flanges 146) positioned in the clamp channels 188/192, are clamped between the clamp channels 188/192 and the clamping surfaces 190/194, thereby operably connecting the two structures to the bracket assembly 18 and operably connecting the two structures together.

Photovoltaic Installation

As previously described, in one or more arrangements, bracket assembly 18 may be used to connect various components in the installation of a photovoltaic system 10. As an illustrative example, in one or more arrangements, installation may begin with driving a set of posts 54 into the ground at an installation site. Cantilever assemblies 56 and braces 58 may then be connected to posts 54 using connection assemblies 56 as described herein. In one or more arrangements, crossbars 60 may be positioned across and connected to cantilever assemblies 56 using bracket assemblies 18 to complete assembly of support structure 16. In this example arrangement, photovoltaic panels 14 are then mounted on support structure by positioning photovoltaic panels 14 on crossbars 60, with front surface 28 facing away from crossbars 60, and operably connecting photovoltaic panels 14 to crossbars 60 using bracket assemblies 18.

Some current systems for mounting photovoltaic systems require an installer to connect photovoltaic panels 14 from the front side of the photovoltaic panels 14. Often, this requires the use of a ladder and increases risk of injury. In contrast, in one or more arrangements, bracket assemblies 18 can be installed to mount photovoltaic panels 14 in the support structure 16 entirely from the backside of the panels. As previously described, in some arrangements, actuator 176 bracket assembly 18 may be tightened using with one hand leaving a hand free to hold the bracket assembly 18 or other component of system 10 that is being installed. As previously described, in one or more arrangements, bracket assemblies 18 may also be configured to self-square crossbars 60 with cantilever assemblies 56 and photovoltaic panels 14 with crossbars 60 as bracket assemblies are clamped.

Manufacture of Bracket Assemblies 18

In one or more arrangements, the design of bracket assemblies 18 permits the majority of bracket assemblies 18 other than actuator 176 to be manufactured as a single unitary component (e.g., first section 170, second section 172, and living hinge 174). For ease of description, first section 170, second section 172, and living hinge 174 of bracket assemblies 18 without actuator 176 may be referred to as primary components 252. In one or more arrangements, primary components 252 may be cut from a sheet of metal (e.g., rolls of steel), thereby providing a quick and inexpensive method of manufacture. In one or more arrangements, primary components 252 have a planar layout that permits primary components 252 to be cut from sheets of metal without any waste or scrape other than that consumed by the cutting, drilling and/or other processes to separate primary components 252 in the sheet and produce holes 178 and weak point 242. In this manner, in one or more arrangements, materials and manufacturing costs may be reduced.

As an example process, in one or more arrangements, first and second clamp channels 188/192 are mechanically formed in opposing edges of the sheet of metal. In some various arrangements, the first and second clamp channels 188/192 may be formed using various methods or means including but not limited to, for example, bending, folding, stamping, rollers, and/or any other means or method for processing sheet metal. In this example, after first and second clamp channels 188/192 are formed, the sheet metal is processed separate the primary components 252. In some various arrangements, primary components 252 may be separated various methods or means including but not limited tom for example, sheering, punch pressing, laser cutting, water jet cutting, plasma cutting, or any other suitable method or means.

In this example process, primary components 252 are then folded at the weak point 242 of the living hinge 174 to move first section 170 and second section 172 to the unclamped position. In this example process, actuator 176 is then installed by inserting carriage bolt 246 through holes 178 and threading nut 248 onto carriage bolt 246.

However, the arrangements are not so limited to this example method of manufacture. Rather it is contemplated that bracket assemblies 18 may be manufactured with various steps in different orders, additional steps included, and/or some steps omitted. For example, in some arrangements, the sheet of metal may be processed to separate the primary components 252 prior to formation of the first and second clamp channels 188/192.

From the above discussion it will be appreciated that the system improves upon the state of the art. More specifically, and without limitation, it will be appreciated that in one or more arrangements an improved bracket assembly for connecting components in photovoltaic system is provided: that improves on the state of the art; that is efficient for installation; that may be used to assemble support structures and also to mount photovoltaic panels to the support structures; that can be installed from the rear of a photovoltaic panel; that can be installed by a single person; that can be installed by a single tool; that is easy to use; that is pre-assembled; that is inexpensive to manufacture; that can be manufacture from sheet metal; that is a single unitary piece; that is configured to connect two perpendicular elongated members; that is configured to connect components in a self-squaring manner; that allows connected components to be repositioned relative to each other while remaining connected; that works effectively; that is robust; that is durable; that has a long useful life; and/or that is high quality. These and other objects, features, or advantages of the disclosure will become apparent from the specification, figures and claims.

It will be appreciated by those skilled in the art that other various modifications could be made to the device without parting from the spirit and scope of this disclosure. All such modifications and changes fall within the scope of the claims and are intended to be covered thereby.

What is claimed is:

1. A bracket assembly, comprising:

a first section;

a second section;

a living hinge operably connecting the first section and the second section;

wherein the living hinge is configured to move the first section and the second section between an unclamped position, where the first section and the second section are positioned at a greater angle with respect to each other, and a clamped position, where the first section and the second section are positioned at a lesser angle with respect to each other;

the first section having a first clamp channel;

the second section having a second clamp channel;

wherein the first section is positioned in opposition to the second section by the living hinge, the first clamp channel is oriented perpendicular to the second clamp channel;

an actuator operably connected to the first section and the second section;

wherein the actuator is configured to move the first section closer toward the second section when actuated to facilitate clamping of objects which are positioned within the first clamp channel and the second clamp channel, between the first section and the second section;

wherein the first section and the second section are configured to operate as levers, in the clamping of the objects, with the living hinge operating as a fulcrum for the levers.

2. The bracket assembly of claim 1, wherein the first section includes:

a planar section having an inward facing surface and an outward facing surface;

the inward facing surface and the outward facing surface extending from the living hinge along a first inward edge to a first outward edge proximate to the first clamp channel;

the inward facing surface and the outward facing surface extending from the living hinge along a second inward edge to a second outward edge positioned in opposition to the second clamp channel of the second section.

3. The bracket assembly of claim 1, wherein the first section includes:

a planar section having an inward facing surface and an outward facing surface;

the inward facing surface and the outward facing surface extending from the living hinge along a first inward edge to a first outward edge proximate to the first clamp channel;

the inward facing surface and the outward facing surface extending from the living hinge along a second inward edge to a second outward edge positioned in opposition to the second clamp channel of the second section;

wherein the first clamp channel includes a first flange extending outward from the first outward edge of the planar section to a corner edge of the first flange;

wherein the first clamp channel includes a second flange extending inward from the corner edge of the first flange toward the second section.

4. The bracket assembly of claim 1, wherein the first section, the second section and the living hinge are formed of a unitary component.

5. The bracket assembly of claim 1, wherein the first section, the second section and the living hinge are formed of sheet metal.

6. The bracket assembly of claim 1, wherein the first section, the second section and the living hinge are formed of a sheet of material.

7. The bracket assembly of claim 1, wherein the first section and the second section are rotationally symmetric.

8. The bracket assembly of claim 1, wherein the actuator is a fastener.

9. The bracket assembly of claim 1, wherein the actuator is configured to be tightened with one hand.

10. The bracket assembly of claim 1, wherein the first section and the second section are symmetric to one another when the living hinge is unfolded.

11. The bracket assembly of claim 1, wherein the actuator includes a bolt and a nut; wherein the bolt extends through a first hole in the first section and a second hole in the second section.

12. A bracket assembly, comprising:

a first section;

a second section;

a living hinge operably connecting the first section and the second section;

wherein the living hinge is configured to move the first section and the second section between an unclamped position, where the first section and the second section are positioned at a greater angle with respect to each other, and a clamped position, where first section and the second section are positioned at a lesser angle with respect to each other;

the first section having a first clamp channel;

the second section having a second clamp channel;

wherein the first section is positioned in opposition to the second section by the living hinge, the first clamp channel is oriented perpendicular to the second clamp channel;

an actuator operably connected to the first section and the second section;

wherein the actuator is configured to move the first section closer toward the second section when actuated to facilitate clamping of objects which are positioned within the first clamp channel and the second clamp channel, between the first section and the second section;

wherein the first section and the second section are point symmetric to one another when rotated about a center point of the living hinge.

13. A bracket assembly, comprising:

a first section;

a second section;

a living hinge operably connecting the first section and the second section;

wherein the living hinge is configured to move the first section and the second section between an unclamped position, where the first section and the second section are positioned at a greater angle with respect to each other, and a clamped position, where the first section and the second section are positioned at a lesser angle with respect to each other;

the first section having a first clamp channel;

the second section having a second clamp channel;

wherein the first section is positioned in opposition to the second section by the living hinge, the first clamp channel is oriented perpendicular to the second clamp channel;

an actuator operably connected to the first section and the second section;

wherein the actuator is configured to move the first section closer toward the second section when actuated to facilitate clamping of objects which are positioned within the first clamp channel and the second clamp channel, between the first section and the second section;

wherein the actuator includes a carriage bolt and a nut;

wherein the carriage bolt extends through a first hole in the first section and a second hole in the second section.

14. The bracket assembly of claim 13, wherein the first section and the second section are shaped to permit the carriage bolt to extend through the first hole and the second hole when the first section and second section are in the unclamped position.

15. The bracket assembly of claim 13, wherein the first section and the second section are shaped to prevent rotation of the carriage bolt when the nut is tightened.

16. The bracket assembly of claim 13, wherein the first hole and the second hole are stadium shaped.

17. A bracket assembly, comprising:

a first section;

a second section;

a living hinge operably connecting the first section and the second section;

wherein the living hinge is configured to move the first section and the second section between an unclamped position, where the first section and the second section are positioned at a greater angle with respect to each other, and a clamped position, where the first section and the second section are positioned at a lesser angle with respect to each other;

the first section having a first clamp channel;

the second section having a second clamp channel;

wherein the first section is positioned in opposition to the second section by the living hinge, the first clamp channel is oriented perpendicular to the second clamp channel;

an actuator operably connected to the first section and the second section;

wherein the actuator is configured to move the first section closer toward the second section when actuated to facilitate clamping of objects which are positioned within the first clamp channel and the second clamp channel, between the first section and the second section;

wherein the first section and the second section are symmetric to one another when the living hinge is unfolded.

18. The bracket assembly of claim 17, wherein the first section includes:

a planar section having an inward facing surface and an outward facing surface;

the inward facing surface and the outward facing surface extending from the living hinge along a first inward edge to a first outward edge proximate to the first clamp channel;

the inward facing surface and the outward facing surface extending from the living hinge along a second inward edge to a second outward edge positioned in opposition to the second clamp channel of the second section.

19. The bracket assembly of claim 17, wherein the first section includes:

a planar section having an inward facing surface and an outward facing surface;

the inward facing surface and the outward facing surface extending from the living hinge along a first inward edge to a first outward edge proximate to the first clamp channel;

the inward facing surface and the outward facing surface extending from the living hinge along a second inward edge to a second outward edge positioned in opposition to the second clamp channel of the second section;

wherein the first clamp channel includes a first flange extending outward from the first outward edge of the planar section to a corner edge of the first flange;

wherein the first clamp channel includes a second flange extending inward from the corner edge of the first flange toward the second section.

20. The bracket assembly of claim 17, wherein the first section and the second section are configured to operate as levers, in the clamping of the objects, with the living hinge operating as a fulcrum for the levers.

21. The bracket assembly of claim 17, wherein the first section, the second section and the living hinge are formed of a unitary component.

22. The bracket assembly of claim 17, wherein the first section, the second section and the living hinge are formed of sheet metal.

23. The bracket assembly of claim 17, wherein the first section, the second section and the living hinge are formed of a sheet of material.

24. The bracket assembly of claim 17, wherein the first section and the second section are rotationally symmetric.

25. The bracket assembly of claim 17, wherein the actuator includes a bolt and a nut; wherein the bolt extends through a first hole in the first section and a second hole in the second section.

* * * * *